United States Patent
Iwaki et al.

(10) Patent No.: US 6,937,820 B2
(45) Date of Patent: Aug. 30, 2005

(54) OPTICAL LEVEL CONTROL METHOD

(75) Inventors: Hiroyuki Iwaki, Osaka (JP); Tetsuo Wada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 670 days.

(21) Appl. No.: 09/791,915

(22) Filed: Feb. 26, 2001

(65) Prior Publication Data

US 2002/0024690 A1 Feb. 28, 2002

(30) Foreign Application Priority Data

Aug. 29, 2000 (JP) ........................................ 2000-259627

(51) Int. Cl.[7] .............................................. H04B 10/00
(52) U.S. Cl. .............................. 398/6; 398/11; 398/18; 398/177; 398/181
(58) Field of Search ................................ 398/6, 11, 18, 398/37, 177, 181

(56) References Cited

U.S. PATENT DOCUMENTS 5,943,146 A * 8/1999 Harano .................... 398/31

FOREIGN PATENT DOCUMENTS

JP HEI 9-46297 2/1997

* cited by examiner

Primary Examiner—Jason Chan
Assistant Examiner—Christina Y Leung
(74) Attorney, Agent, or Firm—Staas & Halsey LLP

(57) ABSTRACT

The present invention relates to an optical level control method for use in an optical transmission system. In the system, a WDM terminal comprises a multiplexing/demultiplexing unit, an amplifier, an up-direction OSC light transmitting/receiving unit, an up-direction multiplexer, an up-direction branching unit, an amplifier and an APR control unit, and a repeater comprises an up-direction branching unit, an OSC light transmitting/receiving unit, an amplifier, an up-direction multiplexer, a down-direction branching unit, an amplifier, a down-direction multiplexer and an APR control unit. In this configuration, a flexible optical output level control in connection with variation in WDM light level, a selective value irrespective of occurrence of an error stemming from the passage of time and avoidable malfunctions are respectively capable. In addition, a trouble retrieving operator can eliminate the possibility of being exposed to the WDM light.

24 Claims, 28 Drawing Sheets

OPTICAL LEVEL CONTROL METHOD

BACKGROUND OF THE INVENTION (1) Field of the Invention

The present invention relates to an optical level control method suitable, for example, for use in a wavelength multiplexing optical transmission system.

(2) Description of the Related Art

In the recent years, high-speed data communications have encountered a striking increase in communication traffic, and for long-distance transmission, a wavelength multiplexing optical transmission network system (which will sometimes be referred to hereinafter as an "optical transmission system") employing the wavelength division multiplexing (WDM) has been in increasing demand. In this optical transmission system, the distance between stations (offices), such as from a starting-point station to a repeater station, from a repeater station to a repeater station or from a repeater station to an end-point station, has frequently exceeded 600 km. For this reason, the optical transmission system has been put in operation by amplifying the optical output level considerably in view of the attenuation stemming from a loss in optical transmission lines.

In this long-distance optical transmission system, in a case in which a trouble or damage occurs in an optical transmission line such as an optical fiber (which will sometimes be referred to herein after simply as a "fiber", a large optical output level can cause light leaking from the trouble occurrence place to undesirably affect workers involved in the correction of the trouble. A control system or method for eliminating this undesirable situation is called laser safety.

This laser safety is for the purpose of minimizing the influence on human body stemming from the fiber troubles, and as the approaches to realization of such laser safety, there have been known three types of methods of APR (Automatic Power Reduction), ALS (Automatic Laser Shutdown) and APSD (Automatic Power Shutdown). These approaches will be described hereinbelow with reference to FIGS. 25 to 28.

FIG. 25 is an illustration of a configuration of an optical transmission system. In FIG. 25, the optical transmission system, designated generally at reference numeral 200a, is for transmitting wavelength-multiplexed light, and is made up of WDM terminal stations 100a and 100d, repeater stations 100b and 100c, optical transmission lines 110, 112 and 114, and optical transmission lines 111, 113 and 115.

In the following description, let it be assumed that the term "up-direction" signifies a direction from the left side to the right side in illustrations while the term "down-direction" means a direction from the right side to the left side in the illustrations. In addition, let it be assumed that transmission of two kinds of light: main signal light (wavelength-multiplexed light, which will sometimes be referred to hereinafter as "WDM light" and OSC light Optical Supervisory Channel: sub-signal light) takes place in this optical transmission system 200a.

The OSC light functions as a monitor control channel or pilot light. In addition, this OSC light is transmitted so as not to have influence on the transmission of the WDM light and is transmitted without passing through an optical amplifier (which will sometimes be referred to simply as an "amplifier") thus resulting in extremely small output (optical power) as compared with the output level of the WDM light.

In this configuration, the WDM terminal station 100a wavelength-multiplexes light having a plurality of different wavelengths ($\lambda_1$ to $\lambda_n$) for outputting the resultant WDM light to the optical transmission line 110, and further demultiplexes down-direction light outputted from the repeater station 100b for outputting the demultiplexed light having wavelengths ($\lambda_1$ to $\lambda_n$).

Furthermore, the repeater station 100b repeats and amplifies WDM light from the optical transmission line 110 for sending out it to the optical transmission line 112, and further repeats and amplifies WDM light from the optical transmission line 113 for sending out it to the optical transmission line 111. The repeater station 100c conducts the repeating and amplification similar to those of the repeater station 100b.

Still furthermore, the WDM terminal station 100d, as in the case of the WDM terminals station 100a, demultiplexes up-direction WDM light for outputting the demultiplexed light having wavelengths ($\lambda_1$ to $\lambda_n$) and further wavelength-multiplexes light having a plurality of different wavelengths ($\lambda_1$ to $\lambda_n$) for outputting the resultant WDM light to the optical transmission line 115.

Thus, on the upstream side of the WDM terminal station 100a, the WDM light obtained by wavelength-multiplexing light with the wavelengths ($\lambda_1$ to $\lambda_n$) from the left side in FIG. 25 in a multiplexer (MUX) 20 is amplified in an amplifier (TA-1; Transmission Amplifier-1) 30, while OSC light is outputted from an OSC optical transmitting unit 10. In addition, the amplified WDM light and the OSC light are multiplexed with each other in a multiplexer 12 and outputted to the optical transmission line 110.

Meanwhile, on the downstream side of the WDM terminal station 100a, down-direction light (WDM light and OSC light) outputted from the repeater station 100b in FIG. 25 is branched in a branching unit 13 so that the branched OSC light is inputted to an OSC light receiving unit 15, while the other light, i.e., WDM light, is amplified in an amplifier 31 (RA-1; Receiving Amplifier-1). The amplified WDM light is demultiplexed in a demultiplexing unit (DMUX) 21 to output the respective wavelengths ($\lambda_1$ to $\lambda_n$).

Referring to FIGS. 26 to 28, a description will first be given hereinbelow of a method of, when a damage or trouble occurs in an optical transmission line, detecting the place of the damage occurrence, then followed by a description about three types of methods for restoring the operations of optical transmission systems 200a to 200c after the retrieval of the damage.

In addition, a description will be given of the restoration (recovery) based on the three types of methods shown in FIGS. 26 to 28. In the optical transmission systems, if cutting-off of the optical out put or reduction of the optical output level is made through the use of laser safety other than the foregoing three types, then a restoration operation would be required to bring (restore) the optical output level back to the normal value after the recovery from the damage.

FIG. 26 is an illustration for explaining the APR method. In FIG. 26, let it be assumed that a fiber trouble has occurred at a place indicated by character A between the WDM terminal station 100a and the repeater station 100b. In a case in which this trouble results from fiber disconnection or break, since the repeater station 100b lies on the downstream side of the trouble occurrence place A, both of an amplifier (ILA1; In-Line Amplifier1) 32 and an OSC light receiving unit 11 in the repeater station 100b cannot receive the WDM light and the OSC light from the WDM terminal station 100a.

In this case, the laser safety employing the APR method is conducted as follows. First, the amplifier 32 of the repeater station 100b receives WDM-LOL (Wavelength Division Multiplexing-Loss of Light) indicative of failure or impossibility of reception of the WDM light. Upon receipt of this WDM-LOL, the amplifier 32 outputs a control signal (APR Control, LOL-Detect) to lower the optical output level of an amplifier (ILA2; In-Line Amplifier2) 33 connected to the down-direction fiber. Thus, an amplifier 31 connected to the down-direction fiber in the WDM terminal station 100a receives a lowered input level of the down-direction WDM light.

In addition, the amplifier 31 detects the lowering of the downstream side WDM light level (WDM-ILD [Input Level Down or Inputted-light Level Down]) for dropping the WDM-signal light output level of an amplifier 30, connected to the up-direction fiber, on the basis of the WDM-ILD detection. In consequence, the level of the optical output leaking from the trouble occurrence place A also drops. Moreover, the level of the optical output leaking from the trouble occurrence place A is controllable through a series of operations based on the APR method.

On the other hand, two kinds of APR control restoration are taken after the retrieval of the fiber: one involves automatic restoration and the other involves manual restoration in which an operator forces that station to output WDM light from an amplifier 30.

In the case of the automatic restoration, the amplifier 30 tentatively outputs WDM light after the elapse of a predetermined period of time, and upon the retrieval of the fiber, an amplifier 32 of the second station detects WDM-LOL restoration and puts a control signal in an amplifier 33 so that the WDM light output level goes back to the normal level. Likewise, upon the WDM-ILD restoration by the amplifier 31 in the first station, a control signal comes in the amplifier 30 so that the WDM light output level goes back to the normal level. Furthermore, if the fiber trouble does not come to recovery yet, the tentative light outputted from the amplifier 30 does not arrive at the latter-stage amplifier 32 and the amplifier 30 continuously receives the APR signal from the amplifier 31 even after the elapse of a predetermined period of time; therefore, the amplifier 30 recognizes that the fiber trouble does not come to retrieval yet, thereby restraining the transmission optical level.

FIG. 27 is an illustration for explaining the ALS method. Let it be assumed that a fiber trouble occurs at a place indicated by A in FIG. 27 and the trouble at the place A is due to fiber break as in the case of the above-described APR method.

In this case, the laser safety based on the ALS method is as follows. First, an amplifier 32 connected to the up-direction fiber in a repeater station 110b standing on the downstream side of the trouble occurrence place A detects the failure of reception of the WDM light (WDM-LOL) and stops the WDM light output from the station to which it pertains. In addition, upon the WDM-LOL detection, the amplifier 32 in the repeater station 110b stops the WDM light output to the next repeater station 110c.

Furthermore, an amplifier (ILA3; In-Line Amplifier3) 34 in the downstream side repeater station 110c, when detecting the failure of reception of WDM light from an optical transmission line 112 (WDM-LOL), also stop the up-direction WDM light output of the station it pertains to. In addition, when detecting the failure of the up-direction WDM light (WDM-LOL), an amplifier (RA-2; Receiving Amplifier-2) 36 in a WDM terminal station 110d standing at the last position in the down-direction stops the output of an amplifier (TA-2; Transmission Amplifier-2) 37 connected to an optical transmission line (down-direction fiber) 115 which is in opposed relation thereto.

Thus, the WDM-LOL is made to be detected by each of the stations and conveyed stepwise to the downstream side stations.

Moreover, also for the down-direction optical transmission line, as in the up-direction optical transmission line, each of the amplifier 35 in the repeater station 110c and the amplifier 33 in the repeater station 110b ceases the output of the down-direction WDM light from the state it pertains to in response to the WDM-LOL detection. In addition, the amplifier 31 of a WDM terminal station 110a lying at the last position of the down-direction optical transmission line ceases the output of the amplifier 30 on the optical transmission line.

The optical output leaking from the trouble occurrence place A is cut off in this way. In addition, the WDM light output leaking from the trouble occurrence place A is cut off through a series of operations according to the ALS method.

Furthermore, there are two kinds of ALS control restoration owing to the fiber retrieval: one is automatic restoration and the other is manual restoration in which an operator forces that station to output WDM light from the amplifier 30.

In the case of the automatic restoration, WDM light is tentatively outputted from the amplifier 30, and when the fiber is in a retrieved condition, the amplifier 32 in the repeater station 110b brings the WDM light back to the normal level on the basis of the WDM-LOL restoration and outputs it to the repeater station 110c. Moreover, the amplifier 36 in the WDM terminal station 110d issues a control signal to the amplifier 37 on the basis of the WDM-LOL restoration, thereby bringing the WDM-light level back to the normal level.

Likewise, each of the repeater station 110c, the repeater station 100b and the WDM terminal station 110a outputs WDM light in the regular condition so that the WDM light of the amplifier 30 in the WDM terminal station 110a returns to the normal level. In addition, after the elapse of a predetermined period of time, the WDM light output level from the amplifier 30 lowers, and if the fiber trouble does not reach retrieval yet, the ALS control restoration is not made in this case.

In this way, according to the automatic restoration, the WDM light output level lowered is once brought back to the normal value on trial after the elapse of a predetermined period of time. Moreover, when the trouble occurrence place reaches restoration, the amplifier 32 of the downstream side repeater station 110b receives WDM light so that the amplifier 32 releases the amplifier 33 of the repeater station 110b from the WDM light output level lowered condition.

Owing to this release, the amplifier 31 of the WDM terminal station 110a can receive the WDM light with the normal output level so that the optical output level of the amplifier 30 in the WDM terminal station 110a is brought back to the normal level.

FIG. 28 is an illustration for explaining the APSD method. Also in FIG. 28, a fiber trouble occurrence place is indicated at A, and that trouble stems from a fiber break.

In the APSD method, when an amplifier 32 existing in a repeater station 120b on the up-direction downstream side of the trouble occurrence place A and connected to an up-direction fiber detects WDM-LOL, the same amplifier 32 is made to stop the WDM light output of an amplifier 33 connected to the down-direction fiber.

Thus, unlike the ALS method, this APSD method stops the WDM light output only in a zone in which a fiber trouble has occurred, without spreading to the next station.

For achieving this, an amplifier 31 connected to an down-direction fiber in a WDM terminal station 120a detects WDM-LOL and stops an amplifier 30 connected to the up-direction fiber on the basis of the WDM-LOL detection, this cutting off the WDM light output leaking from the trouble occurrence place A.

The WDM light output leaking from the trouble occurrence place A can also be cut off through a series of operations according to the APSD method.

Incidentally, the APSD control restoration resulting from the fiber retrieval is the same as the APR control restoration.

As described above, both the automatic restoration and manual restoration are applicable to the above-mentioned three kinds of laser safety (APR, ALS and APSD method).

In addition, Japanese Patent Laid-Open (Kokai) No. HEI 9-46297 (which will be referred to hereinafter as "document") discloses an optical output cutoff system designed to cut off output light for securing safety when disconnection or the like arises in an optical cable, which is suitable for long distance optical transmission with a repeater station.

However, in the case of APR method, when an output level of WDM light outputted from each amplifier is lowered or when an input level drop of WDM light is detected by a reception side amplifier, the WDM light level varies in accordance with the distance between stations, the number of wavelengths, or the like. For this reason, there is a problem in that it is difficult for an operator of the optical transmission systems 200a to 200c to set an appropriate level-down threshold value of WDM light.

In addition, although a transmission side amplifier lowers the level of WDM light to output the level-lowered WDM light, there is a possibility that the reception side fails to detect ILD, and in this case, the control according to the APR method becomes impossible.

Thus, in case in which the control based on the APR method does not take place normally due to fiber trouble, this creates a problem in that there is a probability that the APR control begins to execute while a fiber trouble doesn't occur.

Still additionally, an operator needs to visit a location of each station for measuring the WDM light output level to set a threshold value. However, in this case, there is a need to take into consideration an error stemming from the passage of time or the like, and the selection of a set value is extremely difficult.

Moreover, when a trouble has occurred in an optical transmission line, an operator may be exposed directly to light when the operation for the automatic restoration starts. Thus, difficulty is experienced in maintaining the laser safety. This comes about in common to the above-mentioned three types of methods. Still moreover, the optical transmission systems 200a to 200c are basically required to be put in operation without stopping the WDM light output. In other words, there is a need to avoid easy cease of the operations of the optical transmission systems 200a to 200c.

Furthermore, in the conventional restoration, since WDM light is outputted compulsorily at a time interval, also at this time there is a probability that an operator, who tries to remove a fiber trouble, receives WDM light.

Still furthermore, in the case of the technique disclosed in the aforesaid cited reference, since the output of an amplifier stops even if a fiber connector or the like comes out in an intra-station unit, no fiber break occurs actually in an optical transmission line while still reacting to a pseudo-fiber-disconnection such as the coming-out of a connector in an intra-station unit, which can stop the WDM light transmission.

SUMMARY OF THE INVENTION

The present invention has been developed in consideration of such problems, and it is therefore a first object of the invention to provide an optical level control method capable of not only controlling an optical output level flexibly with respect to variation in WDM light level, but also selecting a set value irrespective of an error stemming from the passage of time or the like, and even avoiding malfunction.

A second object of the invention is to, when a trouble occurs in an optical transmission line, eliminate the possibility that an operator who recovers the trouble to continue the operation without stopping the WDM light output is exposed to WDM light.

For this purpose, in accordance with the present invention, there is provided an optical level control method of handling up-direction light including up-direction main signal light and up-direction sub-signal light and down-direction light including down-direction main signal light and down-direction sub-signal light in first and second stations existing on both sides of a trouble occurrence zone in an optical transmission line, comprising: a second-station up-direction light reception step in which the second station receives an output of the up-direction sub-signal light, a feedback step in which the second station adjusts the down-direction sub-signal light to output the adjusted down-direction sub-signal light, a first-station restoration step in which the first station detects restoration on the basis of the down-direction sub-signal light adjusted in the feedback step to start an output of the up-direction main signal light, a second-station restoration determination step in which the second station determines on restoration of the up-direction main signal light on the basis of the up-direction sub-signal light and the up-direction main signal light obtained in the first-station restoration step, and a second-station restoration step in which the second station brings the down-direction main signal light back to a predetermined level when the determination in the second-station restoration determination step shows the restoration and outputs the down-direction main signal light brought back to the predetermined level, and continues a stop of an output of the down-direction main signal light when the decision in the second-station restoration determination step shows no restoration.

This can eliminate the need for setting of WDM light input level-down, and enables safe automatic restoration without troubling a person when fiber restoration reaches completion.

Furthermore, in accordance with the present invention, there is provided an optical level control method comprising: a second-station up-direction light reception step in which the second station receives an output of the up-direction sub-signal light, an up-direction downstream station up-direction light detection step in which an up-direction downstream station existing on the up-direction downstream side of the second station detects restoration on the basis of an output of the up-direction sub-signal light from a previous-stage station, an up-direction downstream station return step in which the up-direction downstream station adjusts and outputs at least one of the up-direction main signal light, the up-direction sub-signal light, the down-direction main signal light and the down-direction sub-signal light on the basis of the detection in the up-direction downstream station up-direction light detection step, a second-station down-direction main signal light output step in which the second station detects the restoration on the basis of the adjustment in the up-direction downstream station return step for bringing the down-direction main signal light back to a predetermined level to output the down-direction main signal light with the predetermined level and further adds a control signal on an optical level included in the down-direction sub-signal light for producing a control signal added output, and a first-station restoration step in which the first station detects the restoration on the basis of the down-direction sub-signal light adjusted in the second-station down-direction main signal light output step to start an output of the up-direction main signal light.

Thus, in a case in which a fiber trouble has occurred at two or more places, even if only one place has reached restoration, this configuration can achieve safe automatic restoration.

Still furthermore, in accordance with the present invention, there is provided an optical level control method comprising a second-station trouble detection step in which the second station recognizes at least an up-direction sub-signal light level and a control signal included in the up-direction sub-signal light to detect a trouble in an optical transmission line, a second feedback step in which the second station adjusts at least one of the down-direction sub-signal light and the down-direction main signal light on the basis of the detection in the second-station trouble detection step to output the adjusted light, and a first-station up-direction light adjustment step in which the first station adjusts the up-direction main signal light on the basis of at least one of the down-direction sub-signal light and the down-direction main signal light adjusted in the second feedback step to output the adjusted up-direction main signal light.

Thus, this achieves surely cease of optical output of an transmission amplifier developing a fiber trouble or optical output level down.

In addition, it is also appropriate that the first-station restoration step is made so that the first station detects the restoration on the basis of the control signal on an optical level included in the down-direction sub-signal light and an output of the down-direction sub-signal light.

Still additionally, it is also possible that the second-station trouble detection step is designed so that the second station makes the detection by recognizing at least one of reception cutoff (disconnection) of the down-direction sub-signal light outputted from an up-direction downstream station provided on the up-direction downstream side of the second station and a down-direction control signal included in the down-direction sub-signal light.

Thus, this can improve the certainty of the system operation.

Moreover, it is also appropriate that, in the first-station restoration step, the first station employs, as the control signal, an automatic power cutoff signal for a notice of optical output cutoff, included in the down-direction sub-signal light, or that, in the first-station restoration step, the first station detects the restoration on the basis of removal of an automatic level drop signal serving as a control signal indicative of a drop of an optical level and a threshold signal indicative of a level of the down-direction main signal light being a predetermined level.

Still moreover, it is also appropriate that, in the first-station restoration step, the first station detects the restoration on the basis of removal of an automatic light cutoff signal serving as a control signal indicative of cutoff of an optical output and an output of the down-direction main signal light, and further removes the automatic light cutoff signal to bring the up-direction main signal light back to a predetermined level for outputting the up-direction main signal light with the predetermined level, or that, in the first-station restoration step, the first station detects the restoration on the basis of a threshold signal indicative of a level of the down-direction main signal light being a predetermined level and the restoration of the down-direction sub-signal light.

In addition, it is also acceptable that the up-direction downstream station up-direction light detection step is made such that the up-direction downstream station detects the restoration on the basis of an output of the up-direction main signal light and an output of the up-direction sub-signal light.

Furthermore, it is also appropriate that, in the up-direction downstream station up-direction light detection step, the up-direction downstream station detects the restoration on the basis of the output of the up-direction main signal light and an automatic light cutoff signal indicative of cutoff of an optical output, included in the down-direction sub-signal light outputted from the up-direction downstream side, or that, in the up-direction downstream station return step, the up-direction downstream station brings each of levels of the down-direction main signal light and the down-direction sub-signal light back to the predetermined levels to output each of the down-direction main signal light with the predetermined level and the down-direction sub-signal light with the predetermined level after the execution of the up-direction downstream station detection step.

Still furthermore, it is also appropriate that, in the up-direction downstream station up-direction light detection step, the up-direction downstream station detects the restoration on the basis of an output of the up-direction main signal light and removal of an automatic light cutoff signal for a notice of cutoff of an optical output, from the up-direction sub-signal light, or that, in the up-direction downstream station return step, the up-direction downstream station removes the automatic light cutoff signal and outputs the down-direction sub-signal light.

In addition, it is also acceptable that the up-direction downstream station return step is made such that the up-direction downstream station detects the restoration on the basis of an output of the down-direction main signal light and a control signal on an optical level included in the down-direction sub-signal light and outputs the down-direction sub-signal light.

Furthermore, in accordance with the present invention, there is provided an optical level control method comprising a second-station restoration step in which the second station receives at least an output of the up-direction sub-signal light to output the down-direction main signal light, a second feedback step in which the second station adjusts the down-direction sub-signal light to output the adjusted down-direction sub-signal light, and a first-station restoration step in which the first station detects the restoration on the basis of the down-direction sub-signal light adjusted in the second feedback step to start an output of the up-direction main signal light.

In addition, it is also appropriate that, in the second-station restoration step, the second station detects the restoration on the basis of the restoration of the down-direction sub-signal light included in the outputted down-direction sub-signal light and an output of the up-direction main signal light in the first station, while the second station removes an automatic power cutoff signal included in the down-direction sub-signal light.

Still additionally, it is also appropriate that the first-station restoration step is made such that the first station detects the restoration on the basis of a threshold signal indicative of a level of the down-direction main signal light being a predetermined level and the removal of an automatic power cutoff signal.

Moreover, it is also appropriate that the first-station up-direction light adjustment step is made such that the first station makes the detection through the use of at least two of an up-direction control signal, an up-direction main signal light output level and an up-direction sub-signal light output level.

Furthermore, in accordance with the present invention, there is provided an optical level control method comprising a second-station restoration step in which the second station detects one of a control signal on an optical level included in the up-direction sub-signal light and cutoff of the up-direction sub-signal light to bring at least the up-direction main signal light back to a predetermined level for outputting the up-direction main signal light with the predetermined level, a feedback step in which the second station adjusts the down-direction sub-signal light to output the adjusted down-direction sub-signal light, and a first-station restoration step in which the first station detects the restoration on the basis of the down-direction sub-signal light adjusted in the feedback step for starting an output of the up-direction main signal light.

DESCRIPTION OF THE PREFERRED EMBODIMENTS

Embodiments of the present invention will be described hereinbelow with reference to the drawings.

(A) Description of First Embodiment of the Invention

Figure 1:
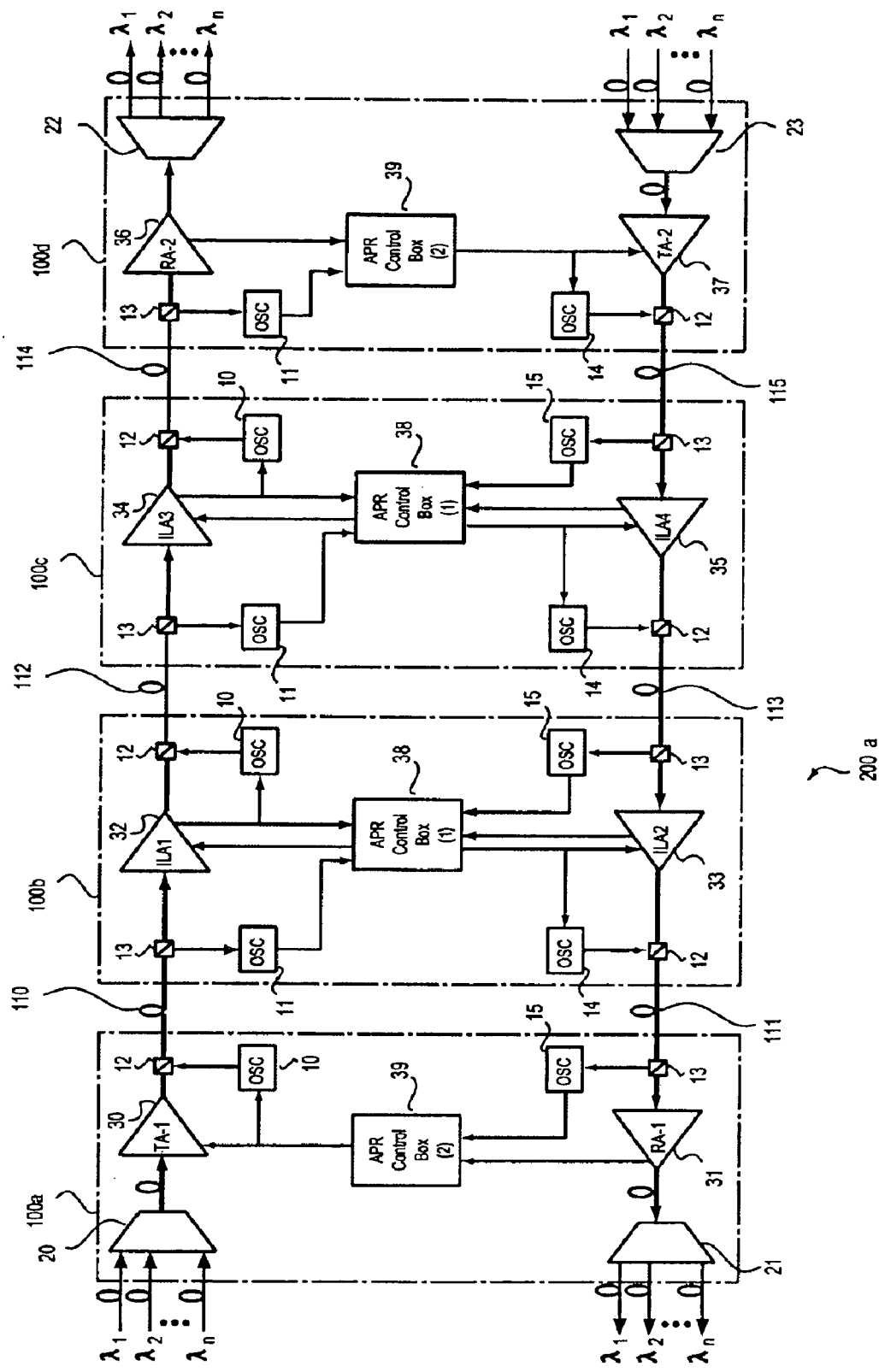
FIG. 1 is a configuration of an optical transmission system according to a first embodiment of the present invention.

FIG. 1 is an illustration of a configuration of an optical transmission system according to a first embodiment of the present invention. In FIG. 1, an optical transmission system, designated at reference numeral 200a, is for transmitting wavelength-multiplexed light, and is made up of WDM terminal stations 100a and 100d, repeater stations 100b and 100c, optical transmission lines 110, 112 and 114, and optical transmission lines 111, 13 and 115. In this optical transmission system 200a, two kinds of light: main signal light (WDM light) and sub-signal light (OSC light) are transmitted in a state multiplexed with each other.

The optical transmission lines (up-direction optical transmission lines) 110, 112 and 114 are for up-direction transmission, while the optical transmission lines (down-direction optical transmission lines) 111, 113 and 115 are for down-direction transmission. Moreover, each of these lines is composed of a fiber which is connected to amplifiers placed in each station, thus accomplishing transmission and reception of light amplified.

In addition, the WDM light is linearly transmitted through repeaters between the WDM terminal stations 100a and 100d, and comprises light respectively having a plurality of different wavelengths multiplexed. The magnitude of the output (optical power) of the WDM light is extremely larger as compared with that of the OSC light.

The OSC light is terminated between the WDM terminal station 100a and the repeater station 100b, between the repeater station 100b and the repeater station 100c, and between the repeater station 100c and the WDM terminal station 100d, and comprises single light or two-wave light (for the OSC light and the WDM light, optical wavelengths indifferent regions are selected and allocated thereto). This OSC light does not exert influence on the transmission of the main signal light and does not undergo optical amplification, and is used as control or pilot light, with the control formats there for being the same in each station.

In the following description, the up-direction signifies a direction from the left side to the right side in FIG. 1, while the down-direction signifies a direction from the right side to the left side in FIG. 1. The up-direction and the down-direction are the same in the other illustrations. In addition, these transmission modes are the same as those in a second embodiment, a third embodiment and each of modifications thereof which will be described later.

In FIG. 1, the WDM terminal station 100a wavelength-multiplexes light respectively having a plurality of different wavelengths ($\lambda_1$ to $\lambda_n$) to output the wavelength-multiplexed WDM light and the OSC light to the optical transmission line 110, and further branches the down-direction light outputted from the repeater station 100b to demultiplex one branched WDM light for outputting light respectively having the wavelengths ($\lambda_1$ to $\lambda_n$), and still further demodulates the other branched OSC light.

In addition, this WDM terminal station 100a includes, for the up-direction transmission, a multiplexing unit 20, an optical amplifier (TA-1) 30, an OSC light transmitting section (OSC) 10 and a multiplexer (multiplexing coupler) 12, and further includes, for the down-direction transmission, an OSC light receiving section 15, a branching unit (branching coupler) 13, an optical amplifier (RA-1) 31 and a demultiplexing unit 21, and additionally includes an APR control unit (APR control box (2)) 39.

Furthermore, the repeater station 100b is connected through a fiber to the WDM terminal station 100a for receiving up-direction light outputted from the WDM terminal station 100a to linear-amplifies the up-direction light and then to output the amplified up-direction light to the optical transmission line 112, while receiving and linear-amplifying down-direction light outputted from the repeater station 100c to output the amplified down-direction light to the optical transmission line 111.

In addition, the repeater station 100b includes, for the up-direction transmission, a branching unit 13, an OSC light receiving unit 11, an optical amplifier (ILA1) 32 and a multiplexer 12, and further includes, for the down-direction transmission, a branching unit 13, an OSC light receiving unit (OSC) 15, an optical amplifier (ILA2) 33, an OSC light transmitting unit (OSC) 14 and a multiplexer 12, and additionally includes an APR control unit (APR control box (1)) 38.

Figure 2:
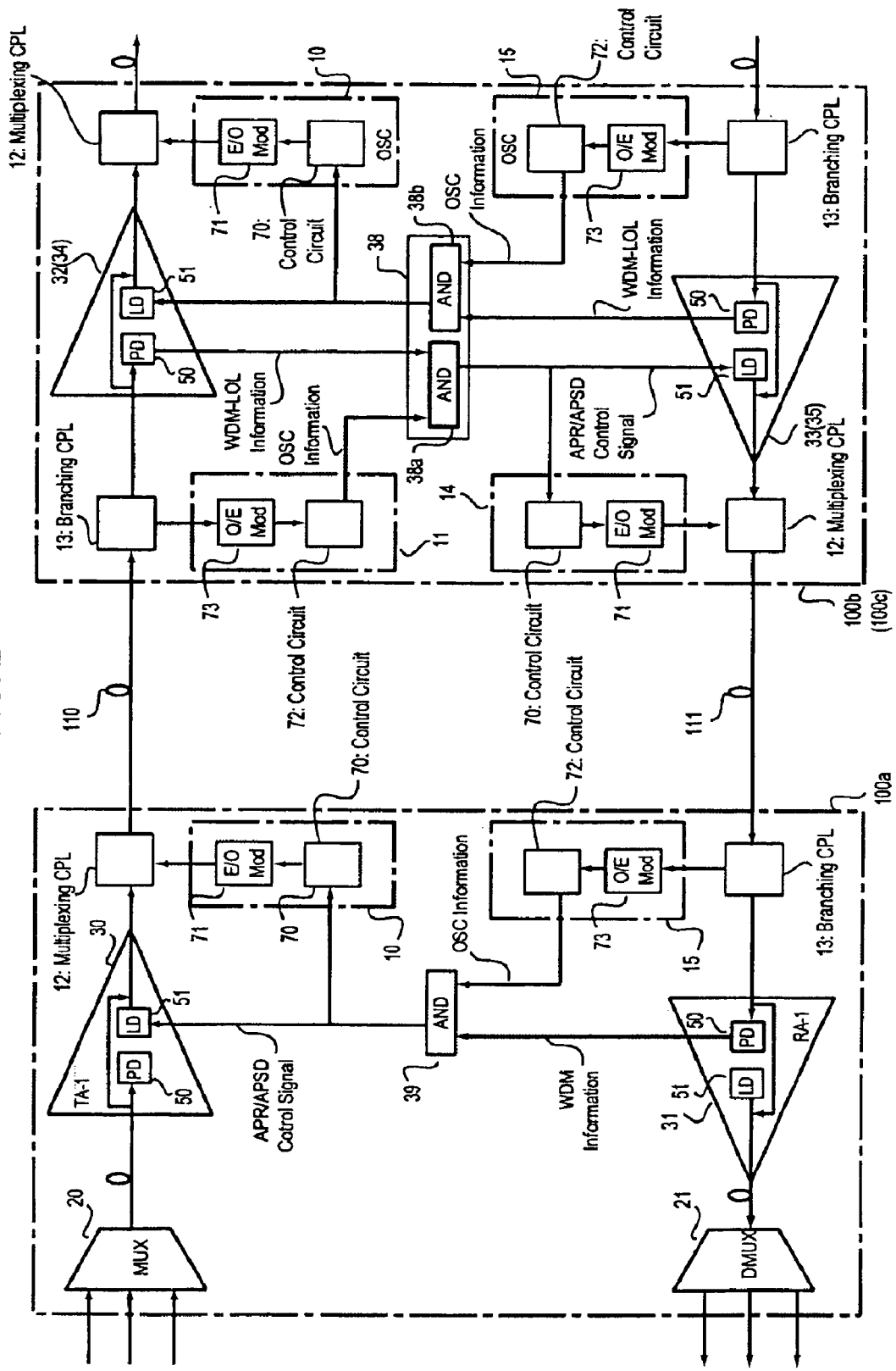
FIG. 2 is a block diagram showing two stations according to the first embodiment of the invention.

The details of the WDM terminal station 100a and the repeater station 100b will be described hereinbelow with reference to FIG. 2. FIG. 2 is a block diagram showing two stations according to the first embodiment of the present invention. In FIG. 2, the units or device marked with the same reference numerals as those in FIG. 1 exhibit the same or corresponding functions, respectively.

The APR control unit (AND) 39 of the WDM terminal station 100a is connected to the OSC light receiving unit 15, the amplifier 31, the OSC light transmitting unit 10 and the amplifier 30 for adding a predetermined control signal to up-direction light on the basis of a control signal included in down-direction light.

In this case, an APR control signal is a pilot signal representative of the fact that some abnormality has occurred in the optical transmission system 200a, and while this APR control signal is on the output from the APR control unit 39, the WDM light level in the optical transmission line 110 is maintained in a lowered condition.

In addition, the addition of the APR control signal to the normal OSC light constitutes OSC-APR signal light.

Furthermore, the APR control unit 39 receives two types of signals of an OSC-APR detection signal outputted from the OSC light receiving unit 15 and a WDM-ILD detection signal outputted from the amplifier 31 to detect a break of an optical transmission line, for example, by computing the AND of these signals.

The multiplexing unit 20 is for wavelength-multiplexing light having a plurality of different wavelengths ($\lambda_1$ to $\lambda_n$). The optical amplifier (which will hereinafter be referred to simply as the "amplifier") 30 is for optically amplifying the WDM light outputted from the multiplexing unit 20, and for example, its function is achievable by an EDFA (Erbium-Doped Fiber Amplifier). In addition, this amplifier 30 includes a photodetection photodiode (PD) 50 for detecting WDM light and an optical output laser diode (LD) 51 for emitting WDM light. The up-direction light outputted from the multiplexing unit 20 is detected by the PD 50, and further is outputted in a state coupled with WDM light emitted from the LD 51. Still additionally, the output of this LD 51 is variable in level in accordance with the APR control signal outputted from the APR control section 39. Incidentally, a control signal denoted at APSD is another control signal which will be described later in a third embodiment.

Furthermore, the OSC light transmitting unit 10 receives the APR control signal from the APR control unit 39 to add this control signal to the OSC light for transmitting the control signal added OSC light. This function is realized by a control circuit 70 also capable of detecting optical reception cutoff and an electrical-optical converter (E/O Mod) 71 connected to the control circuit 70 for converting an electric signal from the control circuit 70 into an optical signal. That is, the OSC light transmitting unit 10 is made to transmit optical signal information, various overhead (OH) information, or intra-unit information.

The multiplexer (multiplexing CPL) 12 is for multiplexing the WDM light outputted from the amplifier 30 and the OSC light outputted from the OSC light transmitting unit 10 to output the multiplexed WDM light to the optical transmission line 110.

On the other hand, on the down-direction transmission side, the branching unit (branching CPL) 13 is for branching WDM light and OSC light different in wavelength from down-direction light traveling in the optical transmission line 111 to output them.

The OSC light receiving unit 15 receives the OSC light outputted from the branching unit 13 to extract a control signal from this OSC light for inputting information (OSC information) on the OSC light to the APR control unit 39. In this embodiment, the OSC information signifies an OSC- APR detection signal (OSC-APR Detect), and in other embodiments and modifications thereof which will be described later, it will be inputted as another control signal.

The realization of this function is by an optical-electrical converter (O/E Mod) 73 for converting an optical signal into an electric signal and further for detecting optical input cutoff, and a control circuit 72, connected to the optical-electrical converter 73, for extracting a control signal from the electric signal obtained by the conversion in the optical-electrical converter 73 to input the extracted control signal to the APR control unit 39.

The amplifier 31 is for amplifying and outputting the WDM light obtained by the branching in the branching unit 13, and further for inputting information (WDM information) on a reception level of the WDM light to the APR control unit 39, and includes a PD 50 and an LD 51. In this embodiment, this WDM information signifies a WDM-ILD detection signal (WDM-ILD Detect), while in other embodiments and modifications thereof which will be described later, it will sometimes be inputted as another control signal.

In this case, the WDM-ILD (Wavelength Division Multiplexing-ILD) denotes a state in which the WDM light level exceeds a predetermined value, and in this embodiment, the WDM-ILD is made when the WDM light level lowers to the extent that it has no influence on a worker.

Concretely, the amplifier 31 inputs the WDM-ILD detection signal to the APR control section 39 for informing of the detection of the WDM-ILD when the reception level of the WDM light becomes lower than a normal level. That is, the measurement of the reception level is made by the reception level detected in the PD 50. In addition, the output of the branching unit 13 is branched into two, one of which is multiplexed with the WDM light outputted from the LD 51 and outputted.

Thus, in the WDM terminal station 100a, the WDM light to be transmitted is amplified in each of the amplifiers 30 and 31 and outputted. In addition, also in the other stations located on the optical transmission lines, the WDM light is amplified and outputted individually.

Not until both the WDM information from the amplifier 31 and OSC information from the OSC light receiving unit 10 are inputted to the APR control unit 39 that the output of the amplifier 30 stops. In other words, the operation of the amplifier 30 does not stop only on the basis of one information (any one of the WDM information and the OSC information), which offers protection by inhibiting easy stop of the optical transmission system 200a.

Moreover, the demultiplexing unit 21 is for demultiplexing the WDM light outputted from the amplifier 31 to output light respectively having a plurality of different wavelengths ($\lambda_1$ to $\lambda_n$).

Accordingly, in FIG. 1, the light respectively having the wavelengths ($\lambda_1$ to $\lambda_n$), inputted to the WDM terminal station 100a, are wavelength-multiplexed in the multiplexing unit 20, and the wavelength-multiplexed WDM light is amplified in the amplifier 30. In addition, the amplified WDM light and the OSC light outputted from the OSC light transmitting unit 10 are multiplexed in the multiplexer 12, with the multiplexed light being outputted to the optical transmission line 110. Still additionally, the output level of the amplifier 30 is controlled in accordance with the APR control signal from the APR control unit 39, and the OSC light transmitting unit 10 adds the APR control signal from the APR control unit 39 to the OSC light.

On the other hand, for the down-direction light, the WDM light and the OSC light are branched from the down-direction light traveling in the optical transmission line 111, and the WDM light is amplified in the amplifier 31 and, when the output level thereof becomes lower than a normal level, a WDM-ILD detection signal is outputted therefrom. In addition, in the demultiplexing unit 21, the WDM light is demultiplexed to output light respectively having wavelengths ($\lambda_1$ to $\lambda_n$).

Furthermore, when receiving OSC-APR signal light from the down-direction OSC light, the OSC light receiving unit 15 transmits an OSC-APR detection signal to the APR control unit 39 for informing of the reception thereof.

Still furthermore, the APR control unit 39 outputs an APR control signal to the up-direction fiber side amplifier 30 and further to the up-direction side OSC light transmitting unit 10 on the basis of the OSC-APR detection signal from the OSC light receiving unit 11 and the WDM-ILD detection signal from the amplifier 31.

Secondly, a description will be given hereinbelow of the repeater station 100b on the right side of FIG. 2. In the repeater station 100b, members marked with the same reference numerals as those used above exhibit the same or similar functions, respectively, and the repeated description thereof will be omitted for brevity.

The APR control unit 38 of the repeater station 100b is connected to the up-direction OSC light receiving unit 11, the amplifier 32, the OSC light transmitting unit 10, the down-direction OSC light receiving unit 15, the amplifier 33 and the OSC light transmitting unit 14. This APR control unit 38 is for controlling the output level of each of the amplifiers 32 and 33 on the basis of a control signal included in up-direction light, and further for outputting a control signal to be supplied to the OSC light transmitting unit 10 and the OSC light transmitting unit 14. That is, the APR control unit 38 is made to control both the up-direction and down-direction WDM light output levels and to add both the OSC light control signals through the use of the incoming light from both the up-direction and down-direction transmission lines.

Concretely, for the up-direction operation, the APR control unit 38 includes a logic gate (AND) 38a which receives the OSC information out putted from the OSC light receiving unit 11 and the WDM information outputted from the amplifier 32 to,for example, AND signals having these information, thereby inputting a control signal to each of the OSC light transmitting unit 14 and the amplifier 33.

In addition, for the down-direction operation, the APR control unit 38 includes a logic gate (AND) 38b which receives the OSC information outputted from the OSC light receiving unit 15 and the WDM information outputted from the amplifier 33 to, for example, AND signals retaining these information, thereby inputting a control signal to each of the OSC light transmitting unit 10 and the amplifier 32.

Incidentally, in this embodiment, each of these control signals is an APR control signal, while in other embodiments and modifications thereof which will be described later, another control signal is outputted.

Therefore, the WDM terminal station 100a is composed of the multiplexing unit 20, the amplifier 30, the up-direction OSC light transmitting unit 10, the up-direction multiplexer 12, the OSC light receiving unit 15, the up-direction branching unit 13, the amplifier 31, the demultiplexing unit 21 and the APR control section 39, while the repeater station 100b is composed of the up-direction branching unit 13, the OSC light receiving unit 11, the amplifier 32, the up-direction multiplexer 12, the down-direction branching unit 13, the OSC light receiving unit 15, the amplifier 33, the OSC light transmitting unit 14, the down-direction multiplexer 12 and the APR control unit 38.

Furthermore, the amplifier 32 is for amplifying and outputs the WDM light branched in the branching unit 13 and further for inputting information (WDM information) on a reception level of the WDM light to the APR control unit 38, and includes a PD 50 and an LD 51. In this embodiment, this WDM information signifies a WDM-LOL detection signal (WDM-LOL Detect), while it will be inputted as another control signal in other embodiments and modifications thereof which will be described later.

This WDM-LOL signal represents a state of the failure of detection of the WDM light, and this detection-failure state means a case in which the light is completely impossible or a case in which the reception level reaches almost zero.

Still furthermore, the OSC light receiving unit 11 receives the OSC light outputted from the branching unit 13 to extract a control signal from this OSC light, and inputs the information (OSC information) on the OSC light to the APR control unit 38. In this embodiment, this OSC information signifies an OSC-LOL detection signal (OSC-LOL Detect), while it is inputted as another control signal in other embodiments and modifications thereof which will be described later.

This OSC-LOL (Optical Supervisory Channel-Loss of Light) represents a state of the failure of detection of the OSC light, and this detection-failure state signifies a case in which the light is completely impossible or a case in which the reception level reaches almost zero.

On the other hand, the down-direction transmission side OSC light transmitting unit 14 is for receiving the APR control signal from the APR control unit 38 to add that control signal to the OSC light for transmitting the control signal added OSC light, and includes a control circuit 70 and an electrical-optical converter (E/O Mod) 71.

The OSC light receiving unit 15 is for receiving the OSC light outputted from the branching unit 13 to extract the control signal from the OSC light so that the information (OSC information) on the OSC light is inputted to the APR control unit 38, and includes an optical-electrical converter 73 and a control circuit 72.

The amplifier 33 is for amplifying and outputting the WDM light branched by the branching unit 13, and further for inputting the information (WDM information) on a reception level of the WDM light to the APR control unit 38, and includes a PD 50 and an LD 51. In this embodiment, the WDM information signifies a WDM-LOL detection signal, with it being sometimes inputted as another control signal in other embodiments and modifications thereof which will be described later.

The amplifiers 32 and 33 represent a repeating function and a control function in the up-direction and a repeating function and a control function in the down-direction, respectively. That is, in FIG. 1, of the up-direction light inputted to the repeater station 100b, the WDM light is amplified in the amplifier 32, while of the down-direction light, the WDM light is amplified in the amplifier 33. In addition, in each of the up-direction and down-direction multiplexers 12, the amplified WDM light and the OSC light outputted from each of the OSC light transmitting units 10 and 14 are multiplexed with each other, with the multiplexed light being outputted to each of the optical transmission lines 112 and 110. Still additionally, each of the up-direction amplifier 32 and the down-direction amplifier 33 puts a WDM-LOL detection signal in the APR control unit 39 when it cannot receive the WDM light.

Likewise, the OSC light and the WDM light included in the down-direction light are controlled in the amplifier 33.

In addition, the amplifiers 32, 33 and the OSC light receiving units 11, 15 are in corporation with each other, thereby representing the up-direction and down-direction light level control functions. That is, not until both the WDM-LOL detection signal outputted from the amplifier 32 and OSC-LOL detection signal outputted from the OSC light receiving unit 11 are inputted to the APR control unit 39 that the output level of the down-direction amplifier 33 is controlled and the APR control signal is given to the OSC light transmitting unit 12.

In a similar way, when both the WDM-LOL detection signal from the amplifier 33 and the OSC-LOL detection signal from the OSC light receiving unit 15 are inputted to the APR control unit 39, the output level of the up-direction amplifier 32 is controlled and the APR control signal is given to the OSC light transmitting unit 10.

Accordingly, in the case of no occurrence of input of both the WDM-LOL detection signal and OSC-LOL detection signal, the stopping of the output of the amplifier 33 does not arise, which establishes a protection in that the optical transmission system 200a stops easily.

In this way, each of the WDM terminal station 100a and the repeater station 100b branches the received WDM light into WDM light and OSC light in the branching unit 13, and monitors the optical level of each of them. In addition, the transmission amplifier to the opposite station side is controlled to perform the optical output cease or the optical output level-down, and the OSC light transmitting units 10 and 14 are controlled to accomplish the optical output cease or the communication of information, which can ensure the cease of the optical output of the transmission amplifier making a fiber trouble or the optical output level-down.

Furthermore, the repeater station 100c shown in FIG. 1 has a configuration almost similar to that of the repeater station 100b. The repeater station 100c is connected through fibers to the repeater station 100b for receiving and linearly amplifying the up-direction light outputted from the repeater station 100b to output the amplified up-direction light to the optical transmission line 114, and further for receiving and linearly amplifying the down-direction light outputted from the WDM terminal station 100d to output the amplified down-direction light to the optical transmission line 113.

Still furthermore, the repeater station 100c includes, for the up-direction transmission, a branching unit 13, an OSC light receiving unit 11, an optical amplifier (ILA3) 34 and a multiplexer 12, and includes, for the down-direction transmission, a branching unit 13, an OSC light receiving unit (OSC) 15, an optical amplifier (ILA4; In-Line Amplifier4) 35, an OSC light transmitting unit (OSC) 14 and a multiplexer 12, and additionally includes an APR control unit 39.

The amplifier 34 is similar to the amplifier 32 in the repeater station 100b, and the amplifier 35 is also similar to that amplifier 33 in the repeater station 100b, and the repeated description thereof will be omitted for brevity. The members marked with the same reference numerals as those used above exhibit the same or corresponding functions, respectively, and the repeated description thereof will be omitted for simplicity.

The WDM terminal station 100d is for wavelength-multiplexing light respectively having a plurality of different wavelengths ($\lambda_1$ to $\lambda_n$) to output the wavelength-multiplexed WDM light and OSC light to the optical transmission line 115, and further for separating the up-direction light outputted from the repeater station 100c to demultiplex one separated WDM light for outputting light respectively having the wavelengths ($\lambda_1$ to $\lambda_n$) and to demodulate the other separated OSC light.

Furthermore, this WDM terminal station 100d includes, for the up-direction transmission, an OSC light receiving unit 11, a branching unit 13, an optical amplifier (RA-2, which will be referred to hereinafter as an "amplifier") 36 and a demultiplexing unit 22, and further includes, for the down-direction transmission, a multiplexing unit 23, an optical amplifier (TA-2) 37, an OSC light transmitting unit (OSC) 14 and a multiplexer 12, and even includes an APR control unit 39.

The amplifier 36 is similar to the amplifier 31 in the WDM terminal station 100a and the amplifier 37 is also similar to the amplifier 30 in the WDM terminal station 100a, and the repeated description thereof will be omitted for simplicity. In addition, the members marked with the same reference numerals as those used above exhibit the same or corresponding functions, respectively, and the repeated description thereof will be omitted for brevity.

Figure 3:
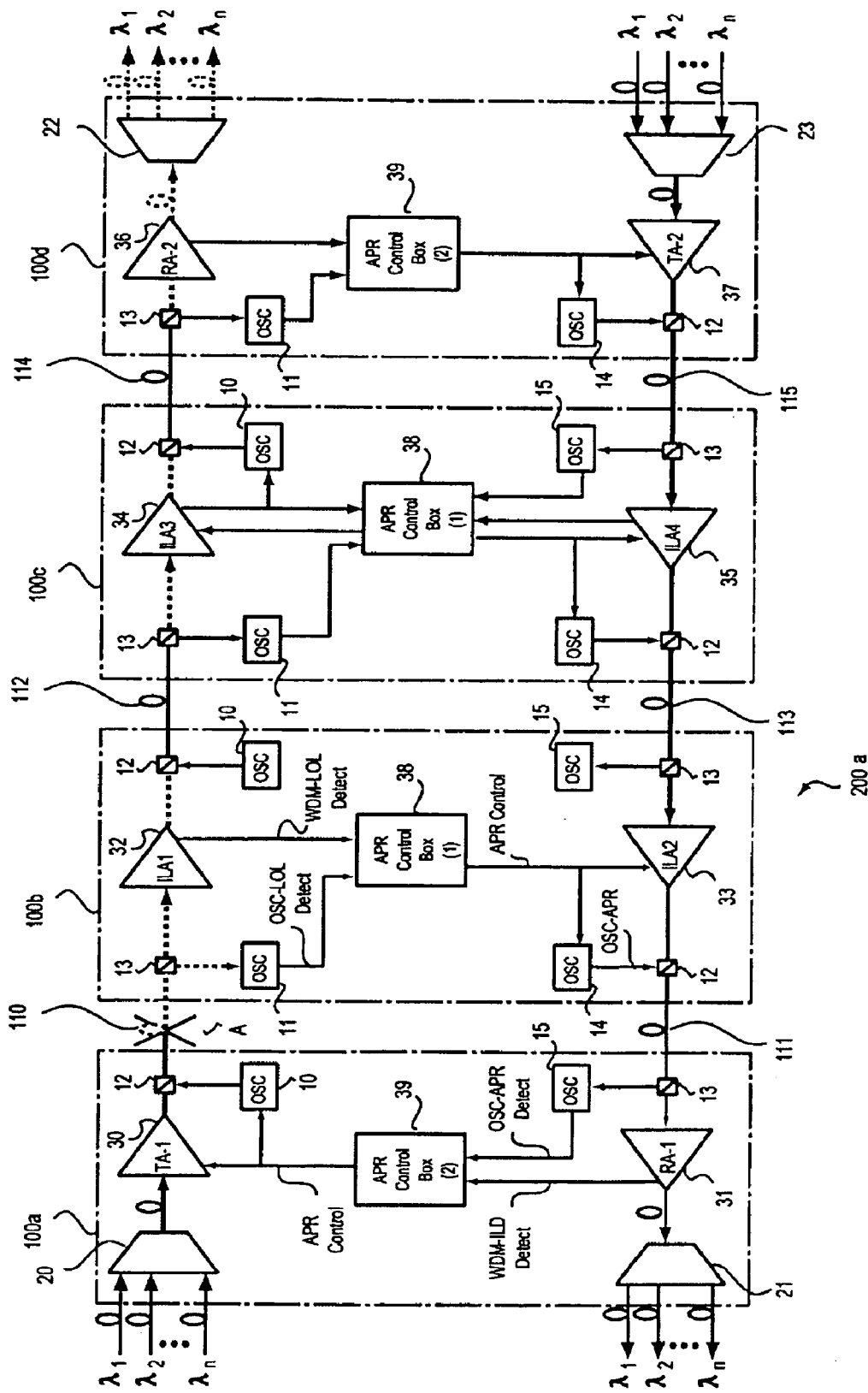
FIG. 3 is an illustration useful for explaining an operation at the occurrence of a trouble according to the first embodiment of the invention.
Figure 4:
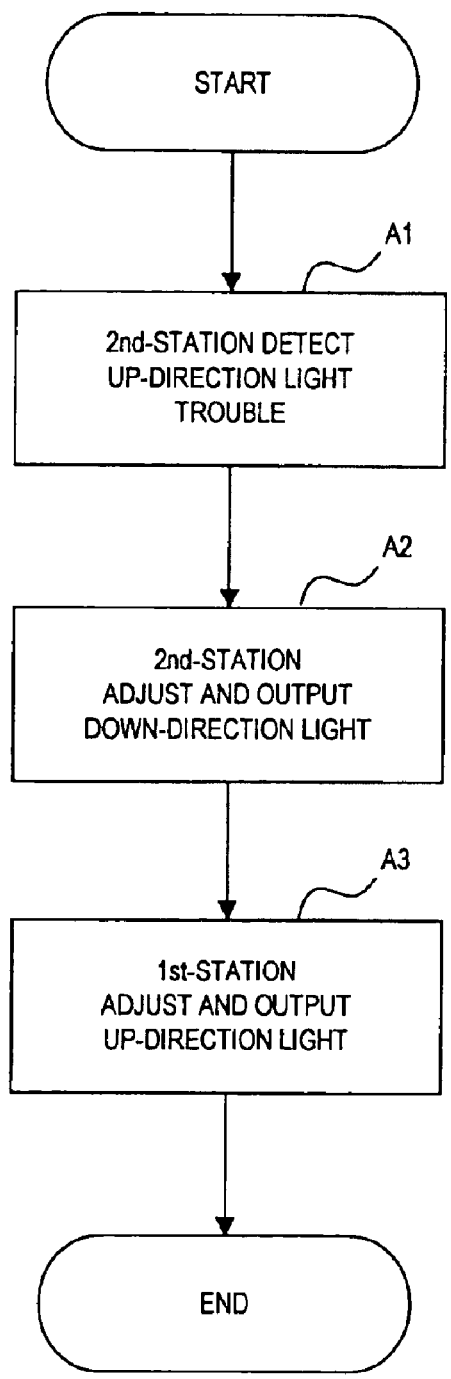
FIG. 4 is a flow chart useful for explaining trouble detection according to the first embodiment of the invention.

Referring to FIGS. 1, 3 and 4, a description will be given in detail hereinbelow of a trouble detection method and a restoration method pertaining to an optical level control method according to this embodiment with the above-mentioned configuration. For convenience of the following description only, sometimes, the WDM terminal station 100a is referred to as a "first station", the repeater station 100b is referred to as a "second station", the repeater station 100c is called a "third station", and the WDM terminal station 100d is called a "fourth station".

First, in FIG. 1, in a normal condition (time), up-direction light is transmitted from the uppermost first station and repeated through the second and third stations to reach the lowermost fourth station. In like manner, down-direction light from the fourth station is transmitted through the second and third stations to the first station.

Figure 5:
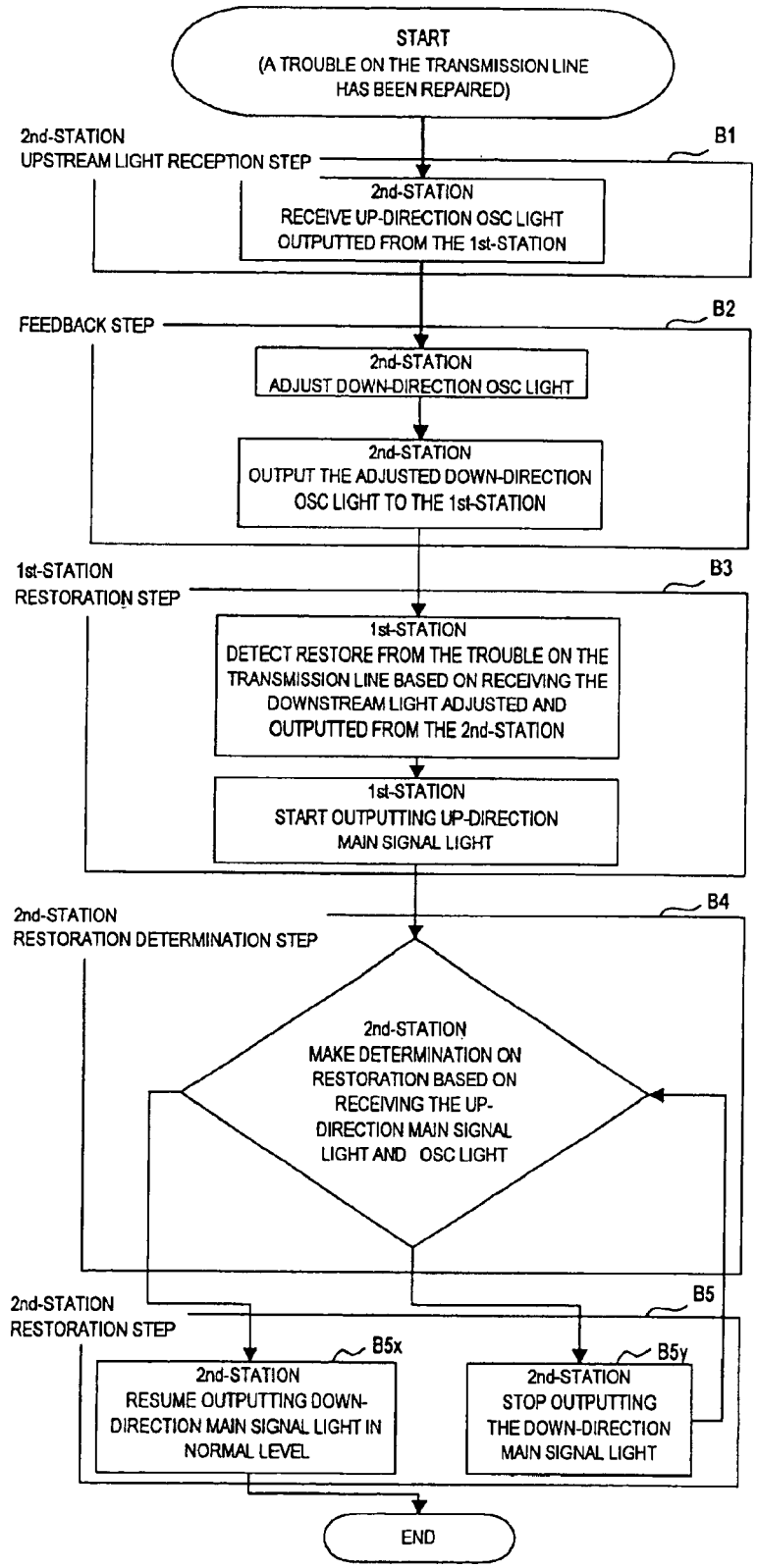
FIG. 5 is a flow chart useful for explaining a restoration method according to the first embodiment of the invention.

Secondly, a description will be given hereinbelow of an occurrence of a trouble with reference to FIGS. 3 to 5. FIG. 3 is an illustration for explaining an operation at the occurrence of a trouble according to the first embodiment of the present invention, and FIG. 4 is a flow chart useful for explaining trouble detection according to the first embodiment of the invention.

The optical level control method according to the present invention is of up-direction light including up-direction main signal light and up-direction OSC light and down-direction light including down-direction main signal light and down-direction OSC light between the first and second stations existing on both the sides of a trouble occurrence zone in an optical transmission line.

In FIG. 4, in a step A1, the second station detects a trouble in an optical transmission line by recognizing at least one of an up-direction OSC light level and a control signal included in the up-direction OSC light (second-station trouble detection step).

In a step A2, this second station adjusts and outputs at least one of the down-direction OSC light and the down-direction main signal light on the basis of the detection in the second-station trouble detection step (second-station feedback step).

In a step A3, the first station adjusts and output the up-direction main signal light on the basis of at least one of the down-direction OSC light and the down-direction main signal light adjusted in the second feed back step (first-station up-direction light adjustment step). In addition, in this first-station up-direction light adjustment step, the first station makes detection through the use of two factors of an up-direction main signal light output level and an up-direction OSC light output level.

Concretely, in FIG. 3, assuming that a fiber trouble (indicated by character A) has occurred between the amplifier 30 of the first station and the amplifier 32 of the second station, the transmission of both the up-direction WDM light and the up-direction OSC light is cut off. On the basis of the WDM-LOL detection of the amplifier 32 and the OSC-LOL detection from the first station, the APR control unit 39 inputs an APR control signal to the amplifier 33 and the OSC light transmitting unit 10. This APR control signal causes the WDM light output level of the opposite side transmission amplifier 33 to be lowered and, at the same time, causes an OSC-APR signal to be added to the OSC light.

The amplifier 31 of the first station can recognize a disconnection or break of the optical transmission line 110 on the basis of the WDM-ILD detection and the OSC-APR detection from the second station, while the APR control unit 38 inputs an APR control signal to the amplifier 30 in response to the WDM-ILD and the OSC-APR. This APR control signal causes the amplifier 30 to lower the WDM light output level, thereafter continuously lowering it until the APR control signal disappears. Therefore, this causes a drop of the output level of the WDM light to be outputted from the fiber which has been cut due to the fiber trouble.

On the other hand, when receiving an APR control signal transmitted from the APR control unit 39, the up-direction fiber side OSC light transmitting unit 10 adds the APR control signal to the up-direction OSC light for outputting continuously as OSC-APR signal light.

Thus, in the aforesaid second-station up-direction light cutoff detection step, the second station makes the detection on the basis of the recognition of a down-direction OSC light reception disconnection and the recognition of a down-direction control signal included in the down-direction OSC light.

In this way, it is possible to automatically lower the WDM light level through the above-described series of optical output level control.

In addition, a description will be given hereinbelow of recovery from fiber trouble with reference to FIG. 5. FIG. 5 is a flow chart useful for explaining a restoration method according to the first embodiment of the present invention. The optical level control method according to the invention relates the up-direction light including the up-direction main signal light and the up-direction OSC light and the down-direction light including the down-direction main signal light and the down-direction OSC light in the first station and the second station existing on both sides of a trouble occurrence zone in the optical transmission lines 110, 111.

First, in a step B1, the second station receives an up-direction OSC light output (second-station up-direction light reception step).

Then, in a step B2, the second station adjusts and outputs the down-direction OSC light (feedback step).

Subsequently, in a step B3, the first station detects restoration on the basis of the down-direction OSC light adjusted in the feedback step to start the output of the up-direction main signal light (first-station restoration step). In addition, in this first-station restoration step, the first station detects the restoration on the basis of a threshold signal (WDM-ILD) representative of the fact that the down-direction main signal light level shows a normal level and the restoration (OSC-APR) of the down-direction OSC light.

Following this, in a step B4, the second station determines on the restoration of the up-direction main signal light on the basis of the up-direction main signal light obtained in the first-station restoration step and the up-direction OSC light (second-station restoration determination step).

After this, in a step B5, the second station, when the second-station restoration determination step indicates the restoration, brings the down-direction main signal light back to a normal level and outputs it (step B5x), and when this step indicates no restoration, continues the stop of the output of the down-direction main signal light (step B5y) (second-station restoration step).

Concretely, upon the recovery from the fiber trouble, the second station can obtain reception signals on the OSC light and the WDM light from the first station. First, the up-direction fiber side amplifier 32 in the second station automatically receives the WDM light from the first station and stops the output of the WDM-LOL detection signal to the APR control unit 38 when detecting the release from the WDM-LOL. Although the output level from the amplifier 30 is restrained in the first station owing to the APR control signal, since the output therefrom is not stopped, the second station can automatically receive the WDM light after the recovery from the trouble.

Furthermore, upon the retrieval of the fiber trouble, the up-direction fiber side OSC light receiving unit 11 in the second station automatically receives the up-direction OSC light from the first station, and stops the output of the OSC-LOL detection signal to the APR control unit 38 when detecting the fact of the release from the OSC-LOL.

Although this OSC light acts as the OSC-APR signal in the first station owing to the APR control signal, since the output therefrom is not stopped, the second station can automatically receive the OSC light after the recovery from the trouble.

Still furthermore, upon the detection of both the WDM-LOL restoration and OSC-LOL restoration, the APR control unit 39 cancels the APR control signal. Due to the cancellation of the APR control signal, the WDM light output level of the opposite side transmission amplifier 33 is brought back to the normal level and, at the same time, the cancellation of the OSC-APR takes place.

The amplifier 31 in the first station detects the WDM-ILD restoration and the cancellation of the OSC-APR from the second station, while the APR control unit 39 ceases the APR control signal. The cease of the APR control signal causes the WDM light output level of the amplifier 30 to return to the normal level.

Thus, due to this fiber trouble restoration, the automatic restoration of the WDM light output level between the first and second stations takes place. In addition, due to the cease of the aforesaid two LOL detection signals, the APR control unit 38 stops the APR control signals being outputted to the down-direction fiber side amplifier 33 and OSC light transmitting unit 14, and the down-direction fiber side amplifier 33, which then has received no APR control signal, regains the WDM light output level to the normal level.

On the other hand, the down-direction fiber side OSC light transmitting unit 14, which has received no APR control signal, stops the addition of the APR signal to the OSC light so that the OSC light returns to the normal OSC light.

In addition, the down-direction fiber side amplifier 31, which has received the WDM light branched from the received light, cannot detect the WDM-LOL because of receiving the WDM light brought back to the normal level, thus stopping the output of the WDM-ILD detection signal to the APR control unit 39.

Meanwhile, the down-direction fiber side OSC light receiving unit 11, which has received the OSC light branched from the received light, receives the normal OSC light in which APR is removed from the OSC-APR, thus stopping the output of the OSC-APR detection signal to the APR control unit 39.

In this way, with the control according to this embodiment, in the APR method, in a casein which the reception station detects the reception LOL of the OSC light at the occurrence of a fiber trouble, the amplifier output level to the opposite station is lowered and the APR control signal is given to the opposite station OSC light transmitting unit 14 to lower the opposite station transmission amplifier output level. That is, when the reception station detects both the reception LOL of the OSC light and the reception LOL of the amplifier, control takes place so as to lower the opposite station transmission amplifier output level.

In addition, in this way, as a result of the cease of the aforesaid two detection signals of the WDM-ILD detection signal and the OSC-APR detection signal, the APR control unit 39 stops the output of the APR control signal to the up-direction fiber side amplifier 30 and OSC light transmitting unit 10, which can avoid resuming the automatic restoration in response to the reception of only the OSC light.

Still additionally, in this way, the up-direction fiber side amplifier 30, which has received no APR control signal, regains the WDM light output level to the normal level, while the up-direction fiber side OSC light transmitting unit 10, which has received no APR control signal, stops the addition of the APR control signal to the OSC light, thus bringing the OSC light to the normal OSC light.

Moreover, the above-described series of signal light level control can lower the level of the WDM light leaking (outputted) from the fiber trouble occurrence place A and automatically bring the WDM light level to the normal level at the subsequent recovery from the fiber trouble.

As described above, each of the APR control units 38 and 39 does not cancel the APR control signal when receiving one detection signal, which ensures safe operation of the optical transmission system 200a.

Modified examples of the above-described first embodiment will be described hereinbelow as first to third modifications.

(A1) Description of First Modification of First Embodiment of the Invention

Figure 6:
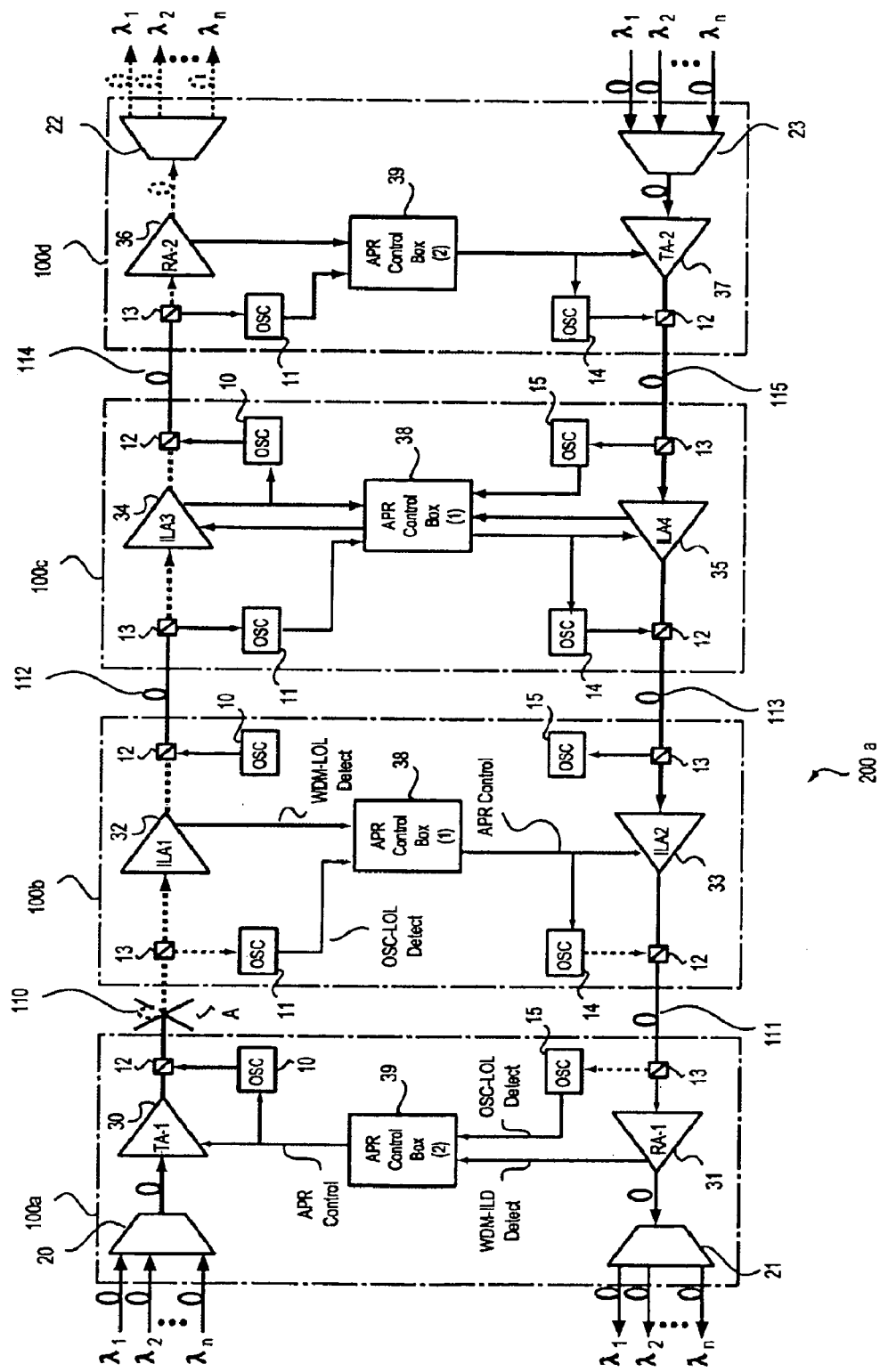
FIG. 6 is an illustration useful for explaining an optical control method according to a first modification of the first embodiment of the invention.

FIG. 6 is an illustration useful for explaining an optical control method according to a first modification of the first embodiment of the present invention. An optical transmission system, designated generally at reference numeral 200a in FIG. 6, is for transmitting wavelength-multiplexed light. The members marked with the same reference numerals as those used above represent the same or corresponding functions, respectively, and the repeated description thereof will be omitted for brevity. In addition, a WDM terminal station 100a, a repeater station 100b, a repeater station 100c and a WDM terminal station 100d are referred to as first to fourth stations, respectively.

In this configuration, assuming that a fiber trouble (indicated by character A) has occurred between an amplifier 30 of the first station and an amplifier 32 of the second station, the amplifier 32 outputs a WDM-LOL detection signal and an OSC-LOL detection signal from the first station to an APR control unit 38.

In addition, in response to these signals, the APR control unit 38 outputs an APR control signal to an opposite side transmission amplifier 33 and OSC light transmitting unit 14. In accordance with this APR control signal, the amplifier 33 stops the transmission of down-direction OSC light concurrently with lowering the WDM light output level.

In the first station, when an amplifier 31 detects WDM-ILD and an OSC light receiving unit 15 detects OSC-LOL from the second station, these detection are communicated to an APR control unit 39. The APR control unit 39 outputs an APR control signal to the amplifier 30 which in turn, lowers the up-direction WDM light output level in accordance with that APR control signal. In consequence, this lowers the output level of the WDM light to be outputted from the fiber which has broken due to the fiber trouble.

Furthermore, at the recovery from the fiber trouble, the second station can receive the up-direction WDM light and up-direction OSC light from the first station, and therefore, the WDM-LOL restoration and the OSC-LOL restoration are obtainable. In addition, the APR control unit 38 in the second station cancels the APR control signal on the basis of the WDM-LOL restoration and the OSC-LOL restoration. Owing to the cancellation of the APR control signal, the APR control unit 38 brings the WDM light output level of the opposite side transmission amplifier 33 and the down-direction OSC light output level back to the normal level.

On the other hand, the amplifier 31 in the first station detects the WDM-ILD and the OSC-LOL restoration from the second station, and inputs detection signals representative of these detection to the APR control unit 39. The APR control unit 39 cancels the APR control signal on the basis of the WDM-ILD restoration and the OSC-LOL restoration. In addition, in response to the cancellation of the APR control signal, the amplifier 30 and the OSC light transmitting unit 10 bring the WDM light output level back to the normal level, respectively.

Accordingly, owing to the recovery from the fiber trouble, the optical output level of the WDM light signal automatically comes to restoration between the first station and the second station.

In this way, when the reception station detects both the reception LOL of the OSC light and the reception LOL of the amplifier, control takes place so that the output of the OSC light to the opposite station is stopped to lower the opposite station transmission amplifier output level.

As described above, since the APR control units 38 and 39 cancel their APR control signals only when receiving the two-system detection signals, the operation of the optical transmission system 200a is achievable more safely.

(A2) Description of Second Modification of First Embodiment of the Invention

This modification is on a method in which each of a first station and a second station implements control through the use of only OSC light, instead of both WDM light and OSC light.

Figure 7:
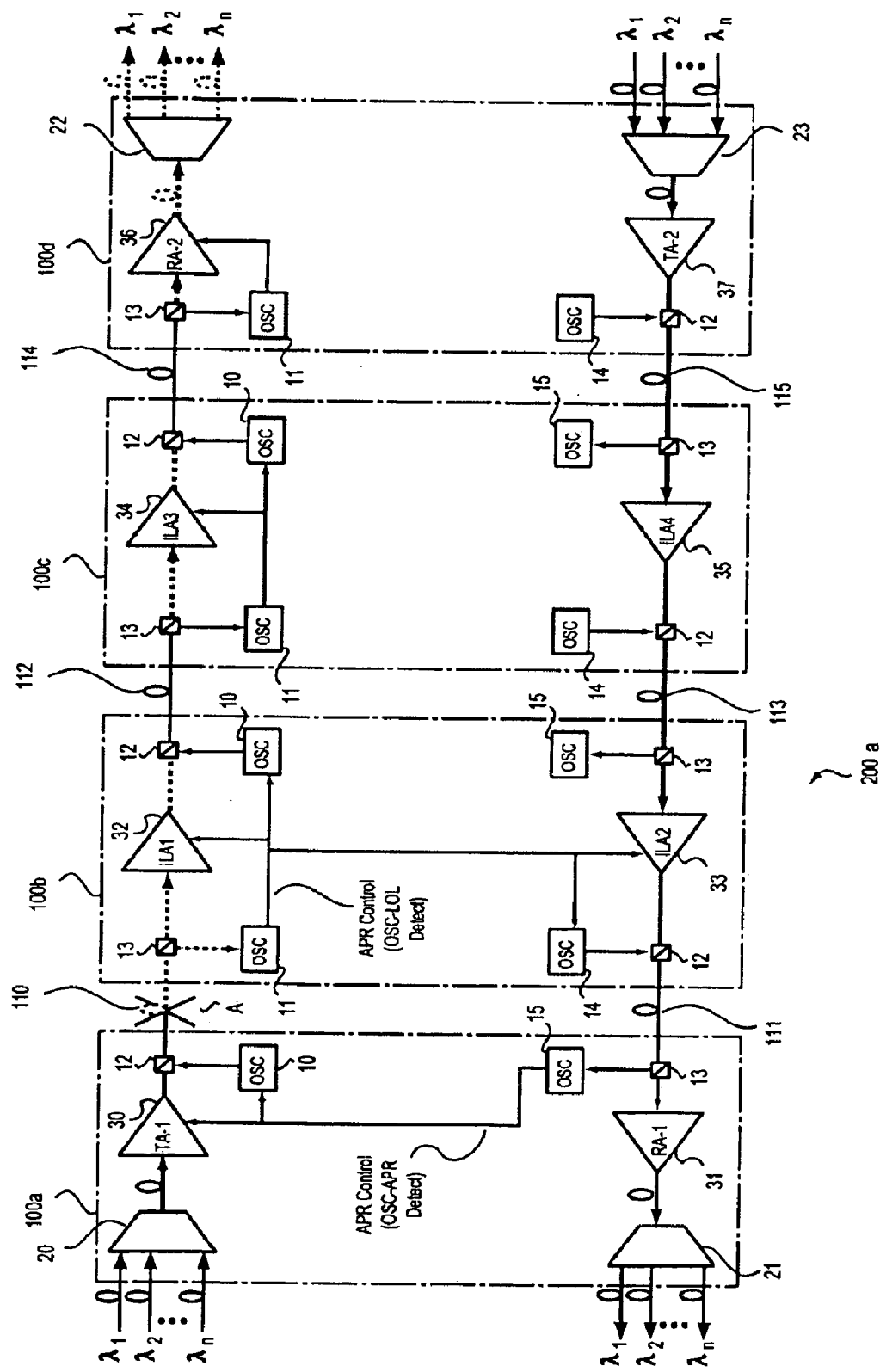
FIG. 7 is an illustration useful for explaining an optical control method according to a second modification of the first embodiment of the invention.

FIG. 7 is an illustration useful for explaining an optical control method according to a second modification of the first embodiment of the present invention. In FIG. 7, an optical transmission system, designated generally at reference numeral 200a, is for transmitting wavelength-multiplexed light. The members marked with the same reference numerals as those used above represent the same or corresponding functions, respectively, and the repeated description thereof will be omitted for brevity. A WDM terminal station 100a, a repeater station 100b, a repeater station 100c and a WDM terminal station 100d are referred to as first to fourth stations, respectively. In the illustration, dotted lines on the downstream of a trouble occurrence place represent fiber broken conditions, while solid lines denote light transmission conditions. The optical output of each station is made independently.

Incidentally, since the control depends upon only OSC light, the APR control units 38 and 39 described in the first embodiment and the first modification thereof are not provided in the configuration according to this modification.

In this configuration, let it be assumed that a fiber trouble (indicated by character A) has occurred in an amplifier 30 of the first station and an amplifier 32 of the second station.

In this situation, the second station cannot receive the up-direction OSC light from the first station, thereby detecting input cutoff (OSC-LOL). In addition, the second station adds an APR control signal (OSC-APR) to the down-direction OSC light concurrently with lowering the WDM light output level of an opposite side transmission amplifier 33.

Meanwhile, in the first station, an OSC light receiving unit 15 detects the OSC-APR from the second station, and outputs an APR control signal to the amplifier 30 and further to an OSC light transmitting unit 10, which lowers the WDM light output level of the amplifier 30, thus lowering the output level of the WDM light to be outputted from the fiber which has broken due to the fiber trouble.

Accordingly, in the optical level control method according to the present invention, the second station recognizes no reception of the up-direction OSC light, thereby detecting a trouble in an optical transmission line (second-station trouble detection step).

Moreover, the second station, on the basis of the detection in the second-station trouble detection step, adjusts the down-direction OSC light (adds OSC-APR) and outputs the adjusted light (feedback step).

Still moreover, the first station, on the basis of the down-direction OSC light adjusted in the feedback step, adjusts (lowers) the up-direction main signal light and outputs the adjusted light (first-station up-direction light adjustment step).

On the recovery from the fiber trouble, the second station can receive the up-direction OSC light from the first station, and hence, detects the OSC-LOL restoration, thus canceling the OSC-APR included in the down-direction light concurrently with bringing the WDM light output level of the opposite side transmission amplifier 33 to the normal level.

On the other hand, the first station detects the fact that the OSC-APR is removed from the down-direction OSC light outputted from the second station, and brings the WDM light output level of the amplifier 30 back to the normal level.

In connection with this recovery from the fiber trouble, the automatic restoration of the optical output level of the WDM light signal takes place between the first station and the second station.

That is, the second station detects the control signal (OSC-LOL restoration) on an optical level included in the up-direction OSC light, thereby bringing the up-direction WDM light back to the normal level before outputting (second-station restoration step).

In addition, the second station adjusts the down-direction OSC light (cancels the OSC-APR) before outputting (feedback step).

Following this, the first station detects the restoration on the basis of the down-direction OSC light adjusted in the feedback step to start the output of the up-direction main signal light (first-station restoration step).

Since the control is implemented through the use of the OSC in place of the WDM light output level as described above, complicated operations such as setting of a threshold value becomes eliminable.

(A3) Description of Third Modification of First Embodiment of the Invention

Likewise, this modification is on a method in which each of first and second stations executes control through the use of only OSC light.

Figure 8:
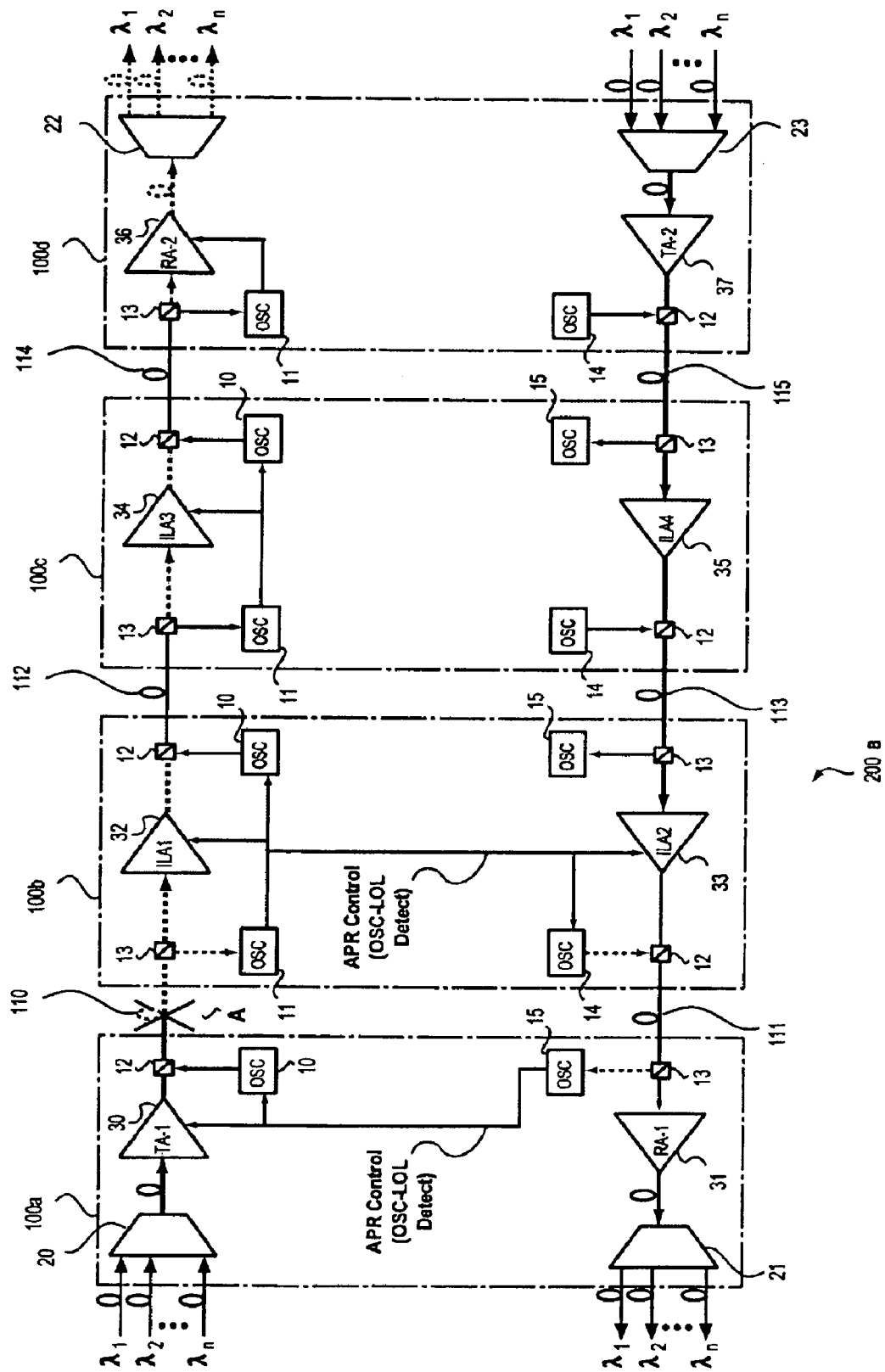
FIG. 8 is an illustration useful for explaining an optical control method according to a third modification of the first embodiment of the invention.

FIG. 8 is an illustration useful for explaining an optical control method according to a third modification of the first embodiment of the present invention. In FIG. 8, an optical transmission system, denoted at 200a, is for transmission of wavelength-multiplexed light. The members marked with the same reference numerals as those used above represent the same or similar functions, respectively, and the repeated description thereof will be omitted for brevity. In addition, a WDM terminal station 100*a*, a repeater station 100*b*, a repeater station 100*c* and a WDM terminal station 100*d* are referred to as first to fourth stations, respectively. Still additionally, in the illustration, dotted lines represent light outputted conditions while solid lines represent light cutoff conditions.

In this configuration, assuming that a fiber trouble (indicated at A) has occurred between an amplifier 30 of a first station and an amplifier 32 of a second station, the second station detects OSC-LOL from the first station, and stops the down-direction OSC light transmission output simultaneously with lowering the WDM light output level of an opposite side transmission amplifier 33.

In addition, the first station detects OSC-LOL from the second station, and lowers the WDM light output level of the amplifier 30, thereby lowering the WDM light output level to be outputted from the fiber broken due to the fiber trouble.

Therefore, in the optical control method according to the present invention, the second station detects a trouble in an optical transmission line by recognizing the up-direction OSC light reception disconnection (second-station trouble detection step), while the second station adds OSC-APR to the down-direction OSC light on the basis of the detection in the second-station trouble detection step and outputs it (feedback step), and even the first station lowers and outputs the up-direction main signal light on the basis of the down-direction OSC light adjusted in the feedback step (first-station up-direction light adjustment step).

On the recovery from the fiber trouble, the reception of the up-direction OSC light is attainable from the first station; therefore, on the basis of the detection of the OSC-LOL restoration, the WDM light output level of the opposite side transmission amplifier 33 is brought back to the normal level and, at the same time, the OSC light transmission output is returned to the normal level. In addition, since the WDM light output level is brought back to the normal level on the basis of the detection of the OSC-LOL restoration from the second station, as a result of the recovery from the fiber trouble, the automatic restoration of the optical output level of the WDM light signal takes place between the first and second stations.

Thus, in the optical level control method according to the present invention, the second station detects a control signal (OSC-LOL restoration) on an optical level included in the up-direction OSC light and returns the up-direction WDM light to the normal level at outputting (second-station restoration step), while the second station adjusts the down-direction OSC light (cancels the OSC-APR) and outputs the adjusted OSC light (feedback step), and even the first station detects the restoration on the basis of the down-direction OSC light adjusted in the feedback step to start the output of the up-direction main signal light (first-station restoration step).

In this way, the control is implemented such that the OSC light output to an opposed station is stopped to lower the transmission amplifier output level in the opposed station.

Accordingly, since the control is executed using the OSC light in place of the WDM light output level, it is possible to eliminate the complicated work such as setting of a threshold value, and further to accomplish safer operation of the optical transmission system 200*a*.

(B) Description of Second Embodiment of the Invention

This embodiment employs an ALS method as the laser safety control manner. This ALS method is such that its pertaining station stops the up-direction WDM light output when the downstream side detects WDM-LOL so that the downstream stations successively detect the WDM-LOL, that is, the WDM-LOL is communicated stepwise to the downstream stations. Finally, the last WDM terminal station 110*d* in the downstream direction stops the output of an opposite side amplifier 37 when detecting the WDM-LOL.

Figure 9:
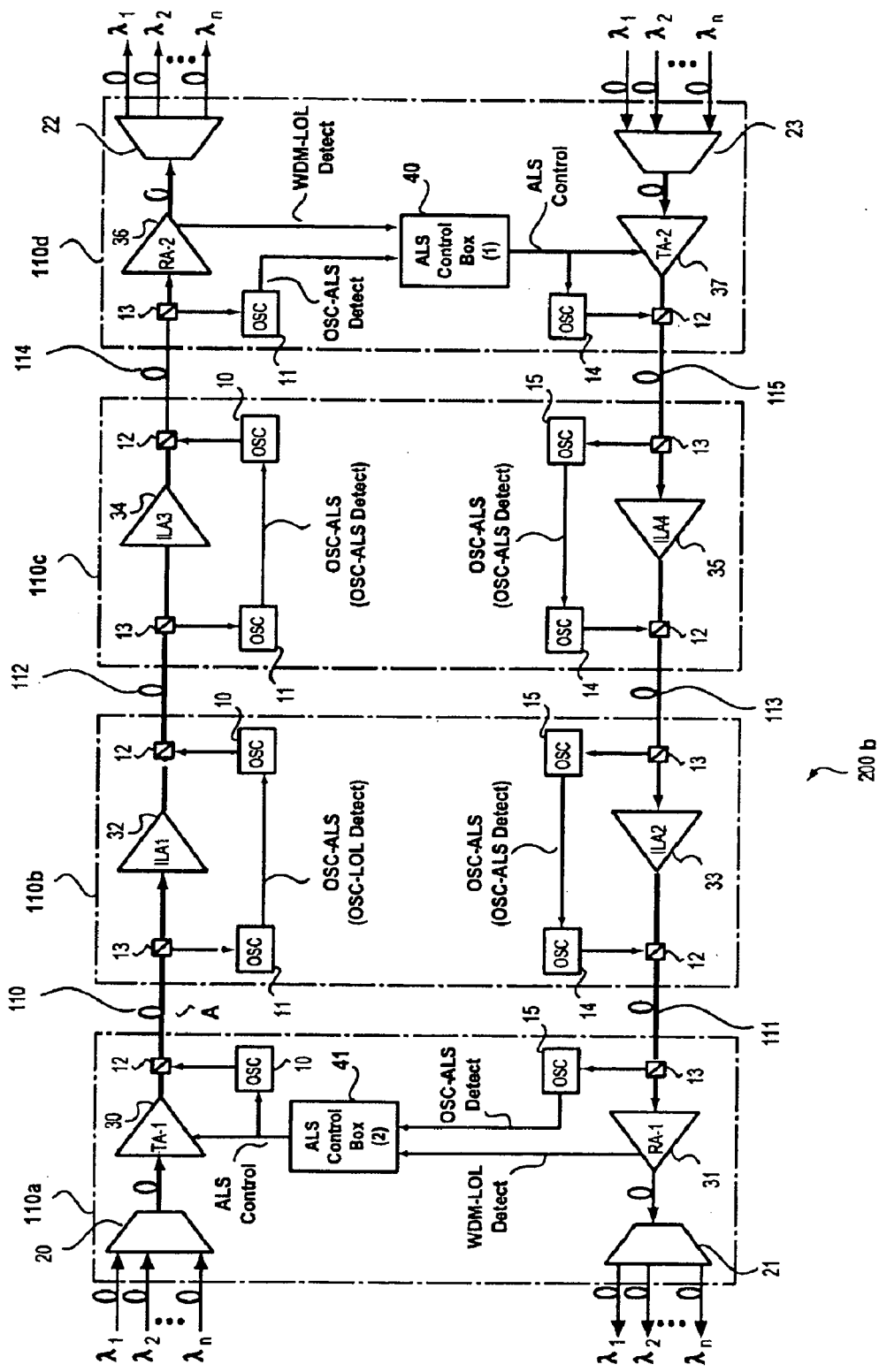
FIG. 9 is an illustration of a configuration of an optical transmission system according to a second embodiment of the invention.

FIG. 9 is an illustration of a configuration of an optical transmission system according to the second embodiment of the present invention. In FIG. 9, an optical transmission system, denoted at 200*b*, is for transmission of wavelength-multiplexed light, and is made up of WDM terminal stations 110*a* and 110*d*, repeater stations 110*b* and 110*c*, optical transmission lines 110, 112 and 114, and optical transmission lines 111, 113 and 115. The members marked with the same reference numerals as those used above represent the same or similar functions, respectively, and the repeated description thereof will be omitted for simplicity. In addition, in the illustration, solid lines signify light cutoff conditions.

Furthermore, in FIG. 9, the WDM terminal station 110*a* is for wavelength-multiplexing light respectively having a plurality of different wavelengths ($\lambda_1$ to $\lambda_n$) to output the wavelength-multiplexed WDM light and OSC light to the optical transmission line 110, and further for branching the down-direction light outputted from the repeater station 110*b* to demultiplex one branched WDM light for outputting light respectively having wavelengths ($\lambda_1$ to $\lambda_n$), while demodulating the other branched OSC light. This WDM terminal station 110*a* is almost the same as the above-mentioned WDM terminal station 100*a*, where the aforesaid APR control unit 39 is replaced with an ALS control unit (ALS control box (2)) 41.

This ALS control unit 41 is connected to an OSC light receiving unit 15, an amplifier 31, an OSC light transmitting unit 10 and an amplifier 30, and is for adding a predetermined control signal to up-direction light on the basis of a control signal included in down-direction light.

In this case, an ALS control signal signifies a signal for communicating a stop of WDM light to a downstream station of the optical transmission system 200*a*. In addition, the WDM light output of its pertaining station is stopped on the basis of detection of the fact that an optical amplifier on the downstream side of a trouble occurrence place cannot receive WDM light (WDM-LOL). Still additionally, adding the ALS control signal to a normal OSC light makes an OSC-ALS signal light.

The ALS control unit 41 receives two types of signals of an OSC-ALS detection signal outputted from the OSC light receiving unit 15 and a WDM-LOL detection signal outputted from the amplifier 31 to, for example, AND these signals, thereby detecting a break of an optical transmission line.

Furthermore, the repeater station 110*b* is connected through fibers to the WDM terminal station 110*a* for receiving and linearly amplifying the up-direction light outputted from the WDM terminal station 110*a* to output the amplified up-direction light to the optical transmission line 112, and further for receiving and linearly amplifying the down-direction light outputted from the repeater station 110*c* to output the amplified down-direction light to the optical transmission line 111.

The difference of this repeater station 10b from the repeater station 100*b* of the first embodiment is that a pair of up-direction side OSC light receiving unit 11 and OSC light transmitting unit 10 and a pair of down-direction side OSC light receiving unit 15 and OSC light transmitting unit 12 are independent of each other. Thus, in the repeater station 110b, even if a trouble occurrence is detected on the basis of the reception of up-direction light, the output level of the opposite side transmission amplifier 33 of its pertaining station is not adjusted, but being controlled by the down-direction light transmitted from the WDM terminal station 110d.

Likewise, the repeater station 110c, being almost similar to the repeater station 110b, is connected through fibers to the repeater station 110b, and is for receiving and linearly amplifying the up-direction light outputted from the repeater station 110b to output the amplified up-direction light to the optical transmission line 114, and further for receiving and linearly amplifying the down-direction light outputted from the WDM terminal station 110d to output the amplified down-direction light to the optical transmission line 113.

Furthermore, the WDM terminal station 110d is for wavelength-multiplexing light respectively having a plurality of different wavelengths ($\lambda_1$ to $\lambda_n$) to output the wavelength-multiplexed WDM light and OSC light to the optical transmission line 115, and further for branching the up-direction light outputted from the repeater station 110c to demultiplex one branched WDM light for outputting light respectively having wavelengths ($\lambda_1$ to $\lambda_n$) while demodulating the other branched OSC light.

Figure 10:
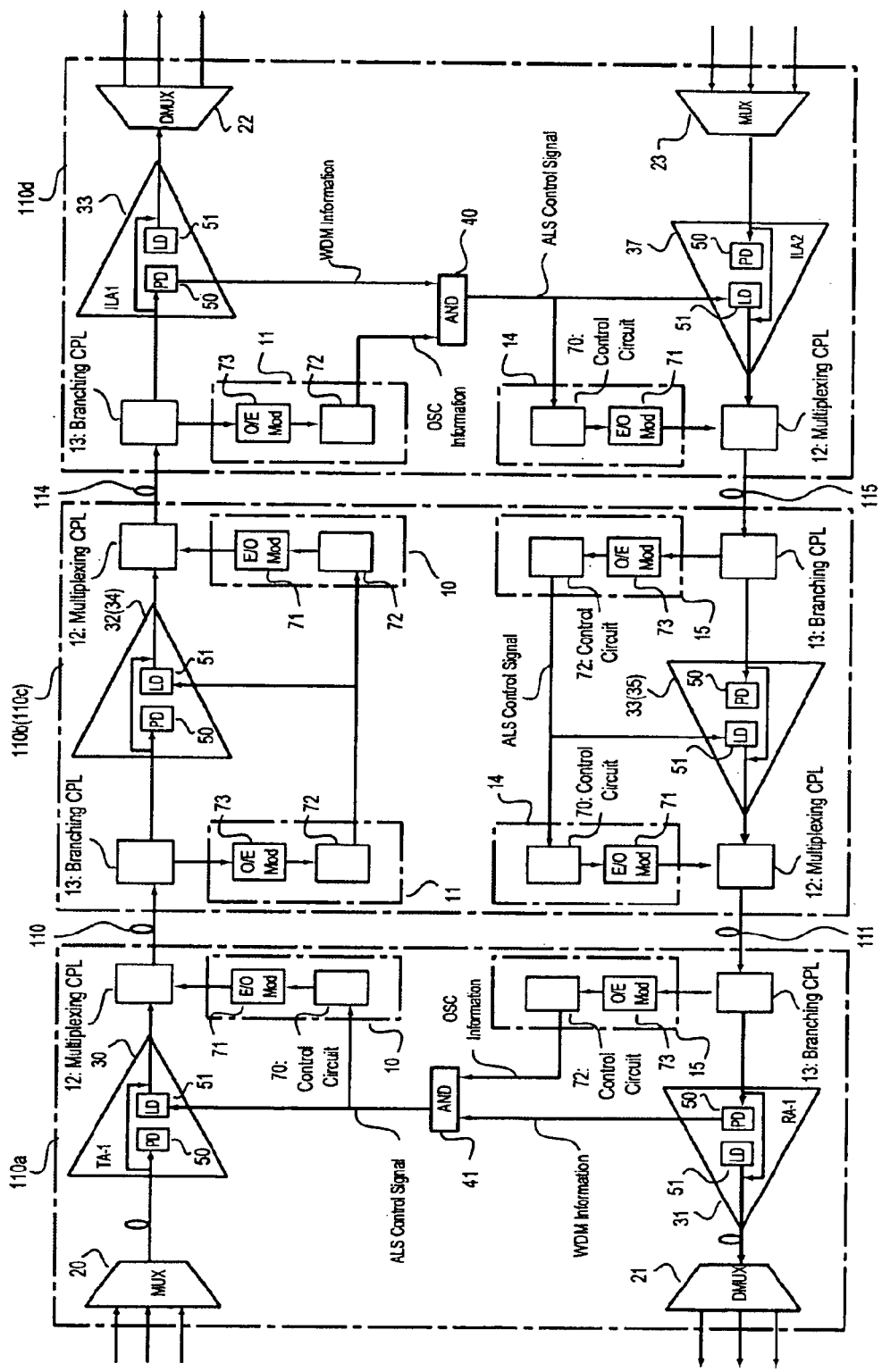
FIG. 10 is a block diagram showing three stations according to the second embodiment of the invention.

FIG. 10 is a block diagram showing three stations in the second embodiment of the present invention, where the same reference numerals as those used above represent the same or similar functions, respectively.

In FIG. 10, the OSC light receiving unit 15 of the WDM terminal station 110a inputs information (OSC information) on OSC light to the ALS control unit 41. In this embodiment, the OSC information signifies an OSC-ALS detection signal. Moreover, the amplifier 31 is made to input, to the ALS control unit 41, a WDM-LOL detection signal as information (WDM information) on a reception level of WDM light.

In addition, the ALS control unit 41 receives two types of signals: an OSC-ALS detection signal outputted from the OSC light receiving unit 15 and a WDM-LOL detection signal outputted from the amplifier 31, to, for example, AND these signals, there by detecting a break of an optical transmission line.

Furthermore, the OSC light receiving unit 15 of the repeater station 110b shown in FIG. 10 extracts an ALS control signal to communicate this ALS control signal to the OSC light transmitting unit 14 and the amplifier 33. Incidentally, the repeater station 110c has the same configuration as that of the repeater station 110b, and the repeated description thereof will be omitted for simplicity.

Still furthermore, the OSC light receiving unit 11 of the WDM terminal station 110d shown in FIG. 10 inputs information (OSC information) on OSC light to an ALS control unit 40. This OSC information is also an OSC-ALS detection signal. Moreover, the amplifier 33 inputs, to the ALS control unit 40, a WDM-LOL detection signal as information (WDM information) on a reception level of WDM light.

In addition, the ALS control unit 40 receives two types of signals: an OSC-ALS detection signal outputted from the OSC light receiving unit 11 and a WDM-LOL detection signal outputted from the amplifier 33, to, for example, AND these signals, thereby detecting a break of an optical transmission line.

Thus, in the up-direction in FIG. 10, in a case in which the optical transmission line 110 is in the normal condition, the up-direction comprising the OSC light and the wavelength-multiplexed WDM light produced in the WDM terminal station 110a is branched into WDM light and OSC light in a branching unit 13 of the repeater station 110b.

Then, a control signal in the OSC light is detected in the OSC light receiving unit 11 and extracted therefrom, and again inputted to the OSC light transmitting unit 10. On the other hand, the WDM light is amplified in the amplifier 32 and outputted therefrom so that the multiplexer 12 multiplexes the WDM light from the amplifier 32 and OSC light from the OSC light transmitting unit 10 to output the multiplexed WDM light to the optical transmission line 114.

Following this, in the repeater station 110c, the outputted up-direction light is inputted to the WDM terminal station 110d after processed in like manner in the repeater station 110b.

In the branching unit 13 of the WDM terminal station 110d, the up-direction light is separated into WDM light and OSC light, with the OSC light being received by the OSC light receiving unit 11 while the WDM light being amplified in the amplifier 33 and then outputted through a demultiplexing unit 22.

In addition, the OSC information from the OSC light receiving unit 11 and the WDM information from the amplifier 33 are ANDed in the ALS control unit 40, and the AND result is outputted to the OSC light transmitting unit 14 and the amplifier 37.

Meanwhile, the down-direction light is processed as with the up-direction light.

Accordingly, likewise, the output of each of the amplifiers 37 and 30 comes to stop only when both of the WDM information and the OSC information are inputted to each of the ALS control units 40 and 41, which provides protection from easy stop of this optical transmission system 200a.

Figure 11:
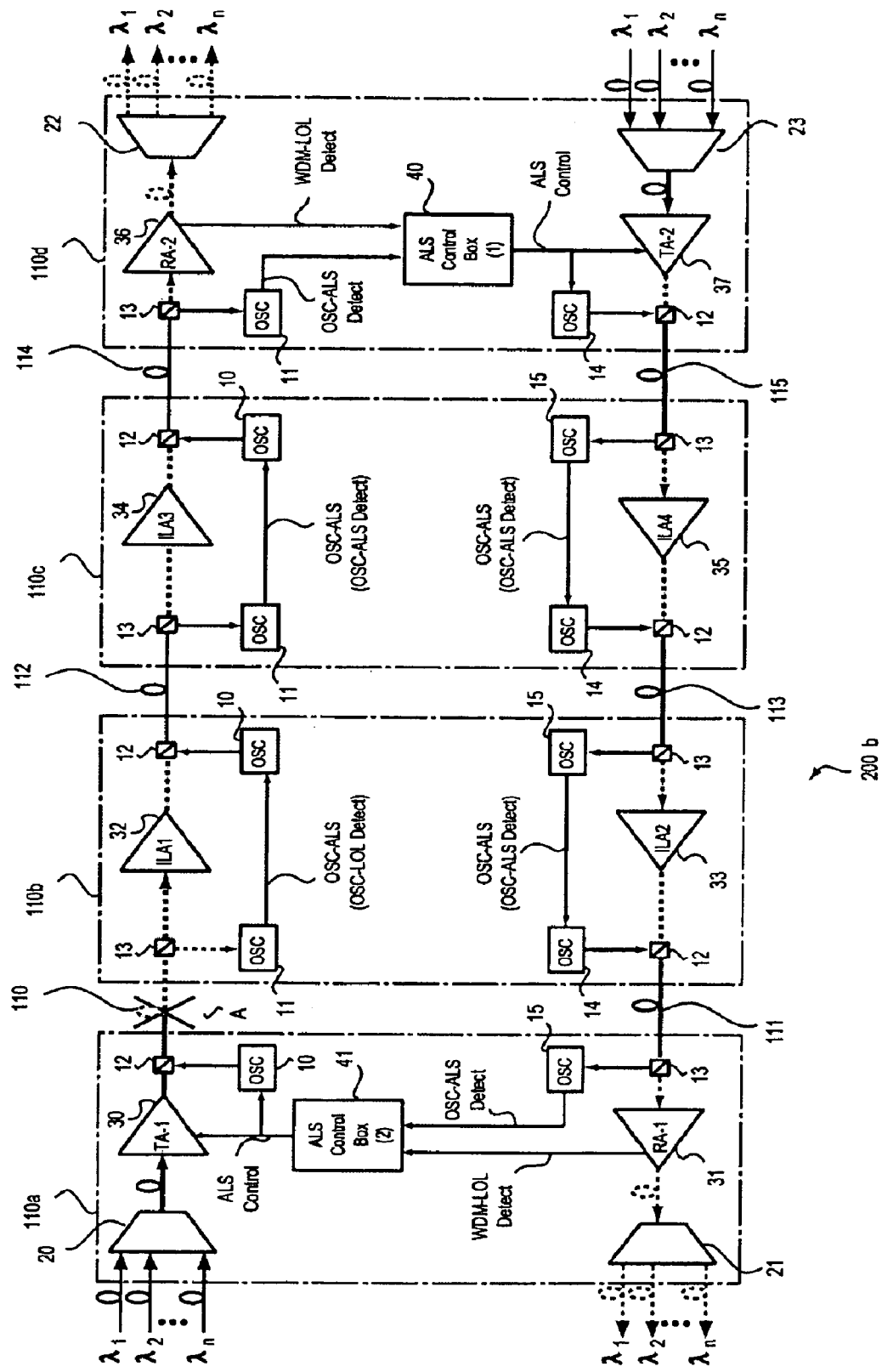
FIG. 11 is an illustration useful for explaining an operation at the occurrence of a trouble according to the second embodiment of the invention.
Figure 12:
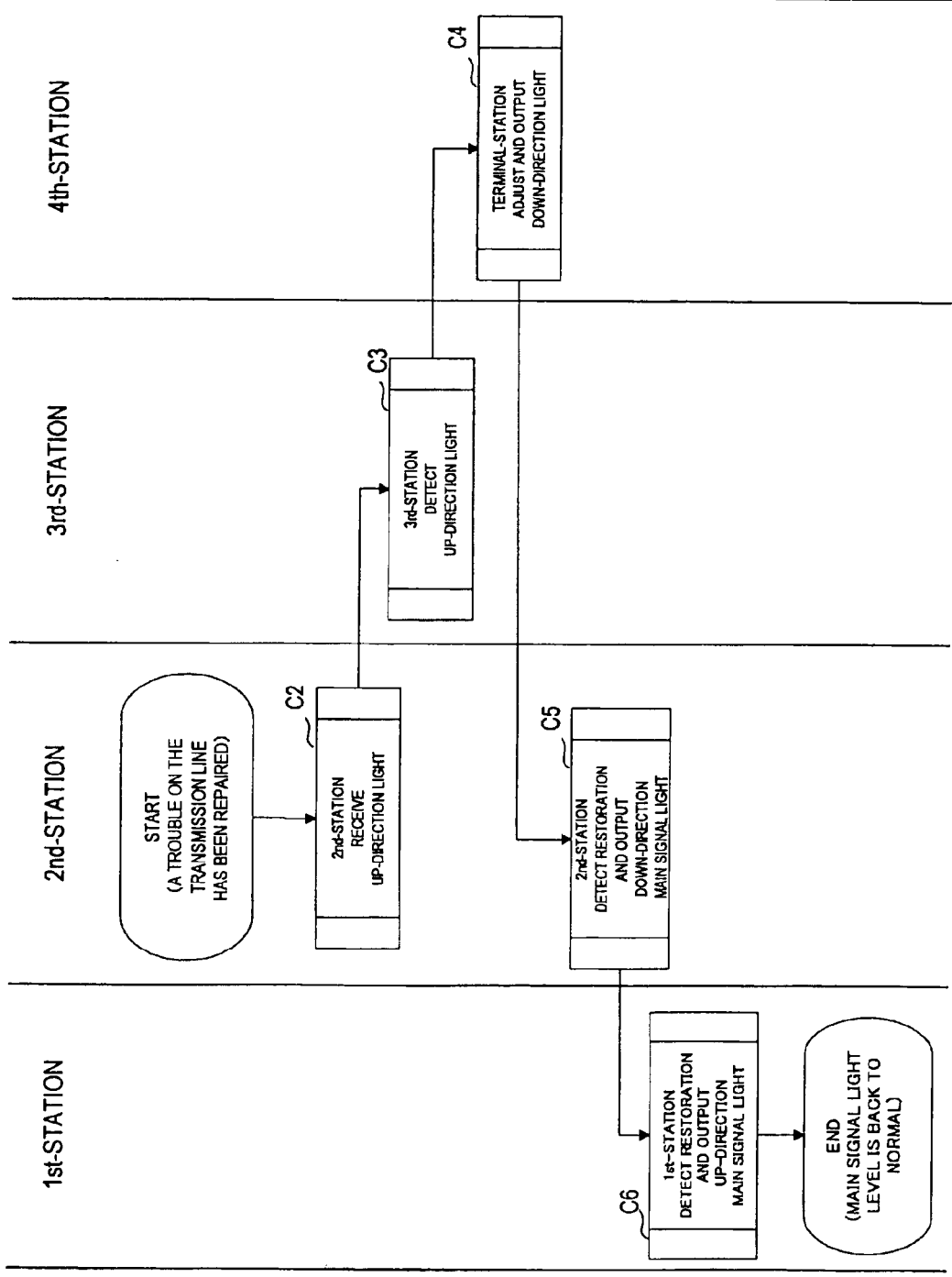
FIG. 12 is a flow chart useful for explaining a restoration method according to the second embodiment of the invention.

Referring to FIGS. 11 and 12, a detailed description will be given hereinbelow of an optical control method according to this embodiment involving a trouble detection method and a restoration method, based on the above-described configuration.

FIG. 11 is an illustration useful for explaining an operation at occurrence of a trouble according to the second embodiment of the present invention. Likewise, in the following description, a WDM terminal station 110a, a repeater station 110b, a repeater station 110c and a WDM terminal station 110d are referred to as first to fourth stations, respectively. In addition, in the illustration, dotted lines represent light outputted conditions and solid lines denote light cutoff conditions.

A trouble detection at occurrence of a trouble is similar to the contents of the above-described first embodiment (see FIG. 4). Concretely, in FIG. 11, assuming that a fiber trouble (indicated at A) has occurred between the amplifier 30 of the first station and the amplifier 32 of the second station, the amplifier 32 detects OSC-LOL from the first station, and stops ILA1-WDM light output (WDM light output of the amplifier 32) to the amplifier 34 of the third station, and further adds OSC-ALS to the up-direction OSC light.

Similarly, the third station detects the OSC-ALS from the second station, and stops the ILA3-WDM light output (WDM light output of the amplifier 34) to the fourth station, and further adds the OSC-ALS to the up-direction OSC light.

The amplifier 36 of the fourth station detects both the WDM-LOL and OSC-ALS from the third station, while the ALS control unit 40 receives these WDM-LOL and OSC-ALS to an ALS control signal to each of the opposite side transmission amplifier 37 and the OSC light transmitting unit 14.

In addition, when receiving this ALS control signal, the amplifier 37 stops the down-direction WDM light output, and when receiving it, the OSC light transmitting unit 14 adds the OSC-ALS to the down-direction OSC light.

The third station detects the OSC-ALS from the fourth station and stops the ILA4-WDM light output (WDM light output of the amplifier 35) to the second station, and further adds the OSC-ALS to the down-direction OSC light. The second station operates in like manner.

In the first station, the amplifier 31 detects the WDM-LOL, while the OSC light receiving unit 15 detects the OSC-ALS from the second station. In addition, the ALS control unit 41 outputs the ALS control signal to the amplifier 30 on the basis of these WDM-LOL and the OSC-ALS. This ALS control signal causes the amplifier 30 to stop the WDM light output, thereby stopping the WDM light output to be outputted from a fiber broken due to the fiber trouble.

Secondly, referring to FIG. 12, a description will be given hereinbelow of the recovery from the fiber trouble. FIG. 12 is a flow chart useful for describing a restoration method according to the second embodiment of the present invention.

The optical level control method according to the present invention is of up-direction light including up-direction main signal light and up-direction OSC light and down-direction light including down-direction main signal light and down-direction OSC light in the first and second stations existing on both sides of a trouble occurrence zone in an optical transmission line.

First of all, in a step C2, the second station receives up-direction OSC light output (second-station up-direction light reception step).

Subsequently, in a step C3, an up-direction downstream station on the downstream of the second station in the up-direction detects the restoration on the basis of the up-direction OSC light output from the previous-stage station (up-direction downstream station up-direction light detection step). In this case, the up-direction downstream station signifies, for example, the third station, and the previous-stage station signifies the second station.

Following this, in a step C4, the up-direction downstream station adjusts and outputs the down-direction main signal light and the down-direction OSC light on the basis of the detection in the up-direction downstream station up-direction light detection step (up-direction downstream station return step).

In addition, in this up-direction downstream station return step, the up-direction downstream station detects the restoration on the basis of the down-direction main signal light output and a control signal on an optical level included in the down-direction OSC light and outputs the down-direction OSC light.

Thereafter, in a step C5, the second station detects the restoration on the basis of the adjustment in the up-direction downstream station return step to bring the down-direction main signal light back to the normal level, and further adds the control signal on the optical level included in the down-direction OSC light for producing a control signal added output (second-station down-direction main signal light output step).

Then, in a step C6, the first station detects the restoration on the basis of the down-direction OSC light adjusted in the second-station down-direction main signal light output step and starts the up-direction main signal light output (first-station restoration step). Moreover, in this first-station restoration step, the first station detects the restoration on the basis of the cancellation of an automatic light cutoff signal (ALS) serving as a control signal indicative of cutoff of an optical output and the output of the down-direction main signal light, and removes the automatic light cutoff signal to bring the up-direction main signal light back to the normal level for outputting the up-direction main signal light with the normal level.

Concretely, the second station detects the OSC-LOL restoration from the acquisition of the up-direction OSC light from the first station, and resumes the output of the ILA1-WDM light to the third station and, at the same time, removes the OSC-ALS from the up-direction OSC light.

The third station conducts similar operations, and in the fourth station, the amplifier 36 detects the WDM-LOL restoration and the OSC light receiving unit 11 detects the OSC-ALS removal from the third station, with the detection signals thereof being inputted to the ALS control unit 40. The ALS control unit 40 uses, for example, the AND of both the WDM-LOL restoration and OSC-ALS restoration for canceling the ALS control signal only when both are inputted thereto.

The cancellation of the ALS control signal brings the WDM light output level of the opposite side transmission amplifier 37 back to the normal level and causes the removal of the OSC-ALS in the down-direction OSC light.

Moreover, the third station detects the OSC-ALS removal from the fourth station and bring the ILA4-WDM light output level to the normal level. The second station conducts similar operations.

Furthermore, in the first station, the amplifier 31 detects the WDM-LOL restoration, and the OSC light receiving unit 15 detects the OSC-ALS removal from the second station, with detection signals thereof being inputted to the ALS control unit 41.

In addition, the ALS control unit 41 uses, for example, the AND of the WDM-LOL restoration and the OSC-ALS restoration to cancel the ALS control signal only when both are inputted thereto.

In this way, the opposite transmission side amplifier output is stopped in a manner that the amplifier reception LOL detection condition is added in the transmission final (terminal) station and the opposite station transmission side.

In addition, in this way, when the WDM light output level of the amplifier 30 is brought back to the normal level and on the recovery from the fiber trouble, the optical output level of the WDM light signal from the first station to the fourth station is restored automatically. Therefore, it is possible to maintain the safety to the operators in the system operation.

As described above, in a case in which fiber trouble has occurred at two or more places, even if only one trouble has reached recovery, the safe automatic restoration is achievable.

(B1) Description of First Modification of Second Embodiment of the Invention

Also in this modification, according to the ALS method, WDM-LOL is successively detected in downstream stations to be communicated stepwise thereto.

Figure 13:
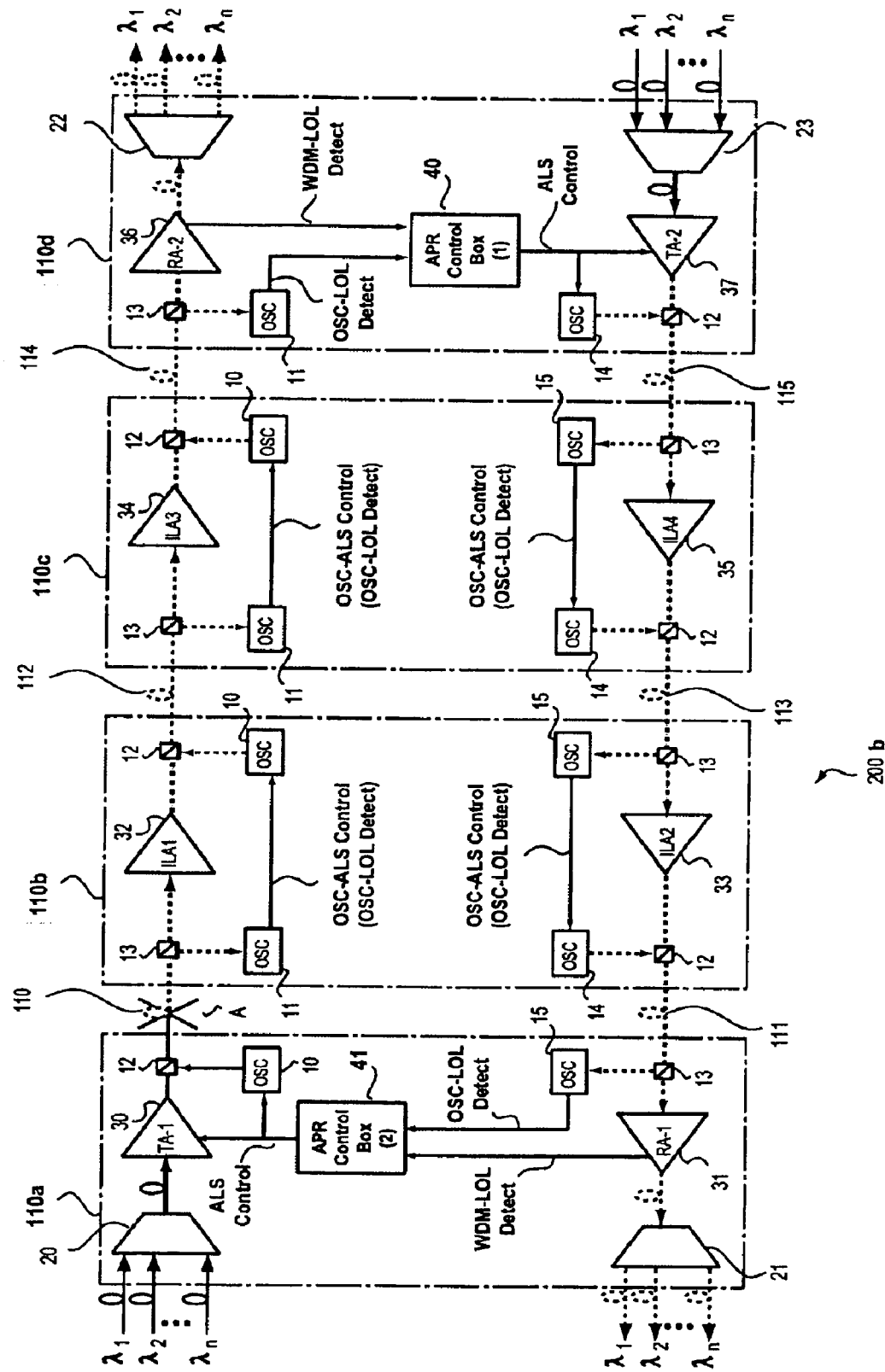
FIG. 13 is an illustration useful for explaining an optical control method according to a first modification of the second embodiment of the invention.

FIG. 13 is an illustration of an optical control method according to a first modification of the second embodiment of the present invention. In FIG. 13, an optical transmission system, designated generally at 200*b*, is for transmission of wavelength-multiplexed light, and the members marked with the same reference numerals as those used above exhibit the same or corresponding functions, respectively, and hence, the repeated description thereof will be omitted for brevity. In addition, a WDM terminal station 110*a*, a repeater station 110*b*, a repeater station 110*c* and a WDM terminal station 110*d* are referred to as first to fourth stations, respectively. Still additionally, in the illustration, dotted lines represent light outputted conditions, while solid lines denote light cutoff conditions.

In this configuration, assuming that a fiber trouble (indicated at A) has occurred between an amplifier 30 of the first station and an amplifier 32 of the second station, the amplifier 32 detects OSC-LOL from the first station and stops up-direction OSC light output and ILA1-WDM light output to the third station.

In like manner, the third station detects OSC-LOL from the second station and stops both up-direction OSC light output and ILA3-WDM light output to the fourth station.

Furthermore, the fourth station detects the WDM-LOL through its own amplifier 36 and detects OSC-LOL from the third station, while an ALS control unit 40 supplies an ALS control signal to an opposite side transmission amplifier 37 and an OSC light transmitting unit 14 on the basis of the WDM-LOL and the OSC-LOL. This ALS control signal introduces stop of both the down-direction WDM light output of the amplifier 37 and down-direction OSC light output of the OSC light transmitting unit 14.

The third station detects OSC-LOL from the fourth station and stops ILA4-WDM light output to the second station while ceasing OSC light output. The second station conducts like operations.

In the first station, upon detection of WDM-LOL by an amplifier 31 and detection of OSC-LOL from the second station by an OSC light transmitting unit 15, an ALS control unit 41 supplies an ALS control signal to the amplifier 30 on the basis of these WDM-LOL and OSC-LOL. Then, the amplifier 30 stops its up-direction WDM light output in accordance with the ALS control signal, thereby ceasing the up-direction WDM light output from the fiber broken due to the fiber trouble.

At the time of the recovery from the fiber trouble, the second station can detect OSC-LOL restoration because of receiving the up-direction OSC light from the first station so that each of the OSC-LOL light output level and ILA1-WDM light output level to the third station goes back to the normal level. Like operations are also conducted in the third station.

In the fourth station, upon the detection of the WDM-LOL restoration by the amplifier 36 and the OSC-LOL restoration from the third station by the OSC light receiving unit 11, the ALS control unit 40 cancels the ALS control signal on the basis of the WDM-LOL restoration and the OSC-LOL restoration. Accordingly, in the up-direction downstream station up-direction light detection step, the up-direction downstream station is made to detect the restoration on the basis of the up-direction main signal light output and the up-direction OSC light output.

By the cancellation of the ALS control signal, the ALS control unit 40 brings each of the WDM light output level of the opposite side transmission amplifier 37 and the OSC-LOL light output level back to the normal level.

The third station detects the OSC-LOL restoration from the fourth station, which causes the ILA4-WDM light output level to go back to the normal level. Like operations are also conducted in the second station.

The first station detects the WDM-LOL restoration through the use of the amplifier 31 and detects the OSC-LOL restoration from the second station through the use of the OSC light receiving unit 15, while the ALS control unit 41 cancels the ALS control signal on the basis of the WDM-LOL restoration and the OSC-LOL restoration.

This cancellation of the ALS control signal causes the WDM light output level of the amplifier 30 to go back to the normal level. Owing to the recovery from the fiber trouble, the automatic restoration of the optical output level of the WDM light signal takes place between the first station to the fourth station.

In this way, by adding the amplifier reception LOL detection conditions in the transmission final station and the opposite transmission side, the control is executed in stopping the output from the opposite side transmission amplifier.

In addition, as mentioned above, the WDM light output level of the amplifier 30 is brought back to the normal level, and the optical output level of the WDM light signal from the first station to the fourth station is restored automatically at the recovery from the fiber trouble. Accordingly, the safety of operators is maintainable in the system operations or the like.

(B2) Description of Second Modification of Second Embodiment of the Invention

Figure 14:
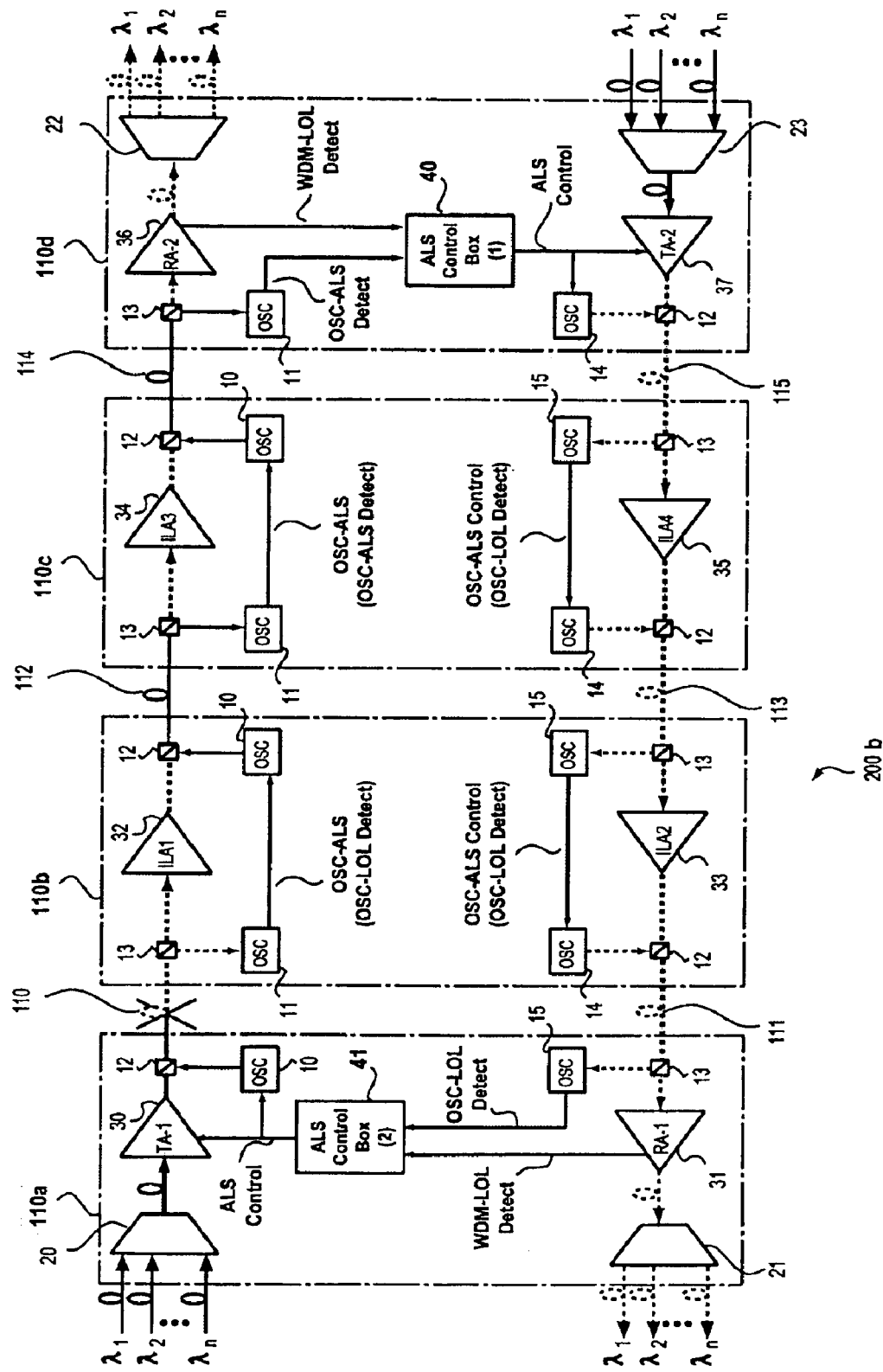
FIG. 14 is an illustration useful for explaining an optical control method according to a second modification of the second embodiment of the invention.

FIG. 14 is an illustration useful for explaining an optical control method according to a second modification of the second embodiment of the present invention. In FIG. 14, an optical transmission system, designated generally at 200b, is for transmission of wavelength-multiplexed light. The members marked with the same reference numerals as those used above exhibit the same or corresponding functions, respectively, and the repeated description thereof will be omitted for brevity. In the illustration, a WDM terminal station 110a, a repeater station 110b, a repeater station 110c and a WDM terminal station 110d are referred to as first to fourth stations, respectively. In addition, dotted lines represent light outputted conditions while solid lines denote light cutoff conditions.

In this configuration, assuming that a fiber trouble (indicated at A) has occurred between an amplifier 30 of the first station and an amplifier 32 of the second station, the amplifier 32 detects OSC-LOL from the first station and stops the ILA1-WDM light output to the third station while adding OSC-ALS to up-direction OSC light.

In like manner, the third station detects the OSC-ALS from the second station and stops the ILA3-WDM light output to the fourth station while adding OSC-ALS to the up-direction OSC light.

The fourth station detects the WDM-LOL through an amplifier 36 and detects the OSC-ALS from the third station through the use of an OSC light receiving unit 11. On the basis of these WDM-LOL and OSC-ALS, an ALS control unit 40 gives an ALS control signal to an opposite side transmission amplifier 37 and to an OSC light transmitting unit 14. This ALS control signal sets up the stop of the WDM light output of the amplifier 37 and the up-direction OSC light output.

The third station detects the OSC-ALS from the fourth station and stops each of the OSC light output and ILA4-WDM light output to the second station. Similar operations are also conducted in the second station.

In the first station, when detecting the WDM-LOL through an amplifier 31 and detecting the OSC-LOL from the second station through an OSC light receiving unit 15, an ALS control unit 41 outputs an ALS control signal to an amplifier 30 on the basis of the WDM-LOL and the OSC-LOL. In accordance with this ALS control signal, the WDM light output of the amplifier 30 is stopped, thereby ceasing the WDM light output from the fiber broken due to the fiber trouble.

Upon the recovery from the fiber trouble, the second station can obtain the up-direction OSC light from the first station so that the OSC-LOL restoration is detectable, thus stopping the ILA1-WDM light output to the third station and removing the OSC-ALS from the up-direction OSC light. Similar operations are also conducted in the third station.

In the fourth station, when the amplifier 36 detects the WDM-LOL restoration and the OSC light receiving unit 11 detects the OSC-ALS removal from the third station, the ALS control unit 40 cancels the ALS control signal on the basis of the WDM-LOL restoration and the OSC-ALS restoration. On the basis of the cancellation of the ALS control signal, each of the WDM light output level of the opposite side transmission amplifier 37 and the down-direction OSC light output is brought back to the normal level.

Accordingly, in the up-direction downstream station up-direction light detection step, the downstream station detects the restoration on the basis of the up-direction main signal light and the cancellation of the automatic light cutoff signal representative of the cutoff of an optical output included in the down-direction OSC light outputted from the up-direction downstream side, and in the up-direction down-stream station return step, the up-direction downstream station brings each of the down-direction main signal light level and the down-direction OSC light level to the normal level and outputs it after the up-direction downstream station detection step.

The third station detects the OSC-LOL restoration from the fourth station, thereby bringing the ILA4-WDM light level and the down-direction OSC light output level to the normal levels. Similar operations are also conducted in the second station.

The first station detects the WDM-LOL restoration through the use of the amplifier 31 and detects the OSC-LOL restoration from the second station through the use of the OSC light receiving unit 15. In addition, the ALS control unit 41 cancels the ALS control signal on the basis of these WDM-LOL restoration and OSC-LOL restoration, with the cancellation of this ALS control signal bringing the up-direction WDM light output level of the amplifier 30 back to the normal level. Owing to the recovery from the fiber trouble, the automatic restoration of the optical output level of the WDM light signal takes place between the first station and the fourth station.

In this way, by adding the amplifier reception LOL detection conditions in the transmission final station and the opposite transmission side, the control is executed to stop the output from the opposite side transmission amplifier.

In addition, as mentioned above, the WDM light output level of the amplifier 30 is brought back to the normal level, and the optical output level of the WDM light signal from the first station to the fourth station is restored automatically at the recovery from the fiber trouble. Accordingly, the safety of operators is maintainable in the system operations or the like.

(B3) Description of Third Modification of Second Embodiment of the Invention

Figure 15:
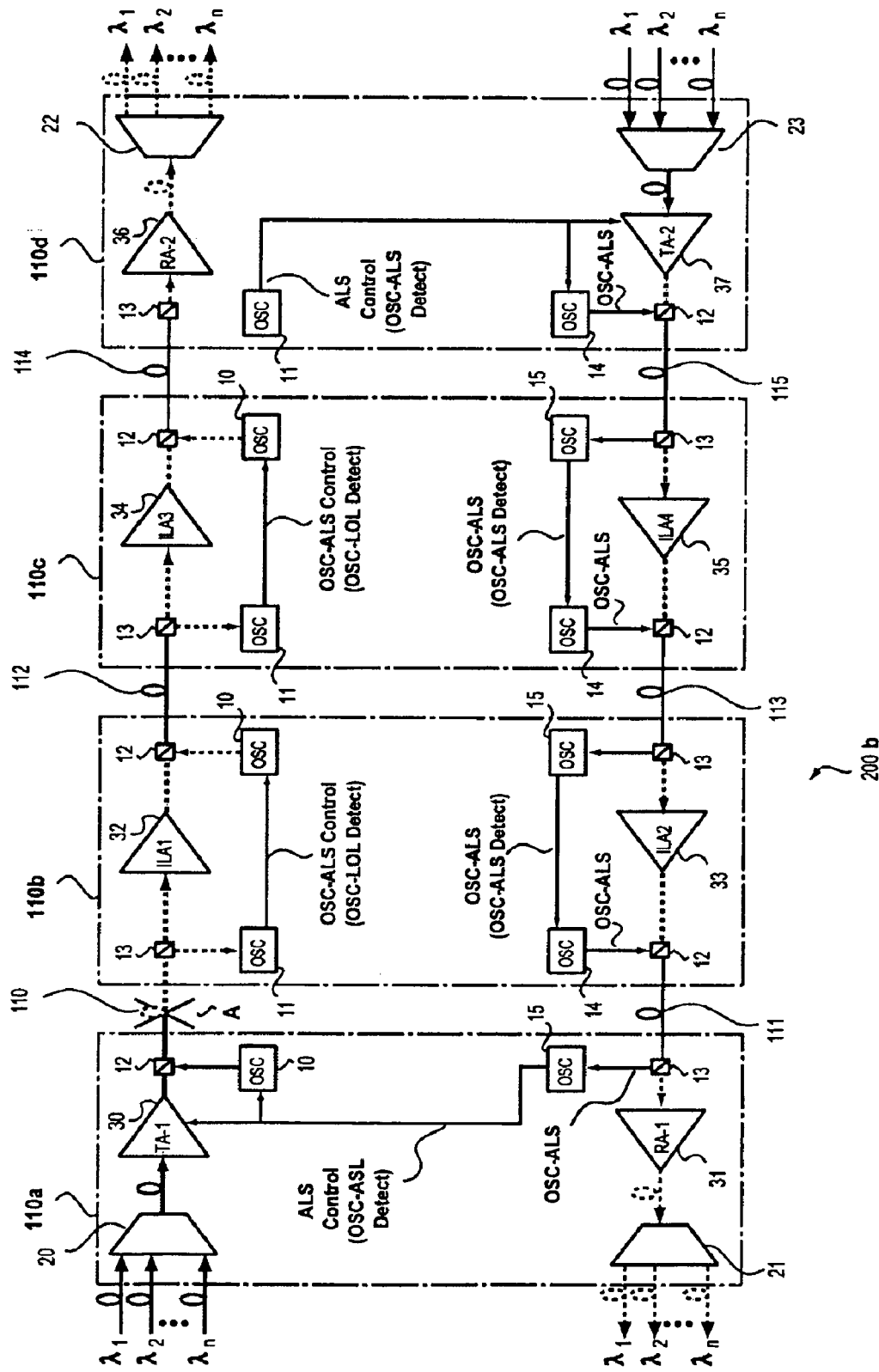
FIG. 15 is an illustration useful for explaining an optical control method according to a third modification of the second embodiment of the invention.

FIG. 15 is an illustration useful for explaining an optical control method according to a third modification of the second embodiment of the present invention. In FIG. 15, an optical transmission system, designated generally at 200b, is for transmission of wavelength-multiplexed light. The members marked with the same reference numerals as those used above exhibit the same or corresponding functions, respectively, and the repeated description thereof will be omitted for brevity.

In this configuration, assuming that a fiber trouble (indicated at A) has occurred between an amplifier 30 of the first station and an amplifier 32 of the second station, the amplifier 32 detects OSC-LOL from the first station and stops the up-direction OSC light output and ILA1-WDM light output to the third station.

In like manner, the third station detects the OSC-LOL from the second station and stops both the up-direction OSC light output and ILA3-WDM light output to the fourth station. The fourth station detects the OSC-LOL from the third station and stops the WDM light output of an opposite side transmission amplifier 37 while adding OSC-ALS to the down-direction OSC light.

On the basis of detection of the OSC-ALS from the fourth station, the third station stops the ILA3-WDM light output to the second station, and adds the OSC-ALS to the down-direction OSC light. Similar operations are also conducted in the second station, and the first station detects the OSC-ALS from the second station and stops the WDM light output of the amplifier 30, thereby ceasing the WDM light output from the fiber broken due to the fiber trouble.

Upon the recovery from the fiber trouble, the second station can obtain the up-direction OSC light from the first station to allow detection of the OSC-LOL restoration, thus bringing each of the ILA1-WDM light output level and the up-direction OSC light transmission output level to the third station back to the normal level. Similar operations are also conducted in the third station, and the fourth station detects the OSC-LOL restoration from the third station, and brings the WDM light output level of the opposite side transmission amplifier 37 back to the normal level while removing the OSC-ALS.

The third station detects the OSC-ALS removal from the fourth station and brings the ILA4-WDM light output level to the normal level. Similar operations are also conducted in the second station, and the first station detects the OSC-ALS removal from the second station and brings the WDM light output level of the amplifier 30 back to the normal level.

Accordingly, in the up-direction downstream station up-direction light detection step, the downstream station detects the restoration on the basis of the up-direction main signal light and the cancellation of the automatic light cutoff signal indicative of the cutoff of an optical output included in the up-direction OSC light, and in the up-direction downstream station return step, the up-direction downstream station cancels the automatic light cutoff signal and outputs the down-direction OSC light.

Owing to the recovery from the fiber trouble, the automatic restoration of the optical output level of the WDM light signal takes place between the first station and the fourth station.

In this way, in the ALS method, when the reception station detects the OSC light reception LOL at the occurrence of the fiber trouble, the transmission output of the OSC light to the next repeater (downstream) station is stopped to cease the opposite station transmission amplifier output.

In addition, as mentioned above, the WDM light output level of the amplifier 30 is brought back to the normal level, and the optical output level of the WDM light signal from the first station to the fourth station is restored automatically at the recovery from the fiber trouble. Accordingly, the safety of operators is maintainable in the system operations or the like.

(B4) Description of Fourth Modification of Second Embodiment of the invention

Figure 16:
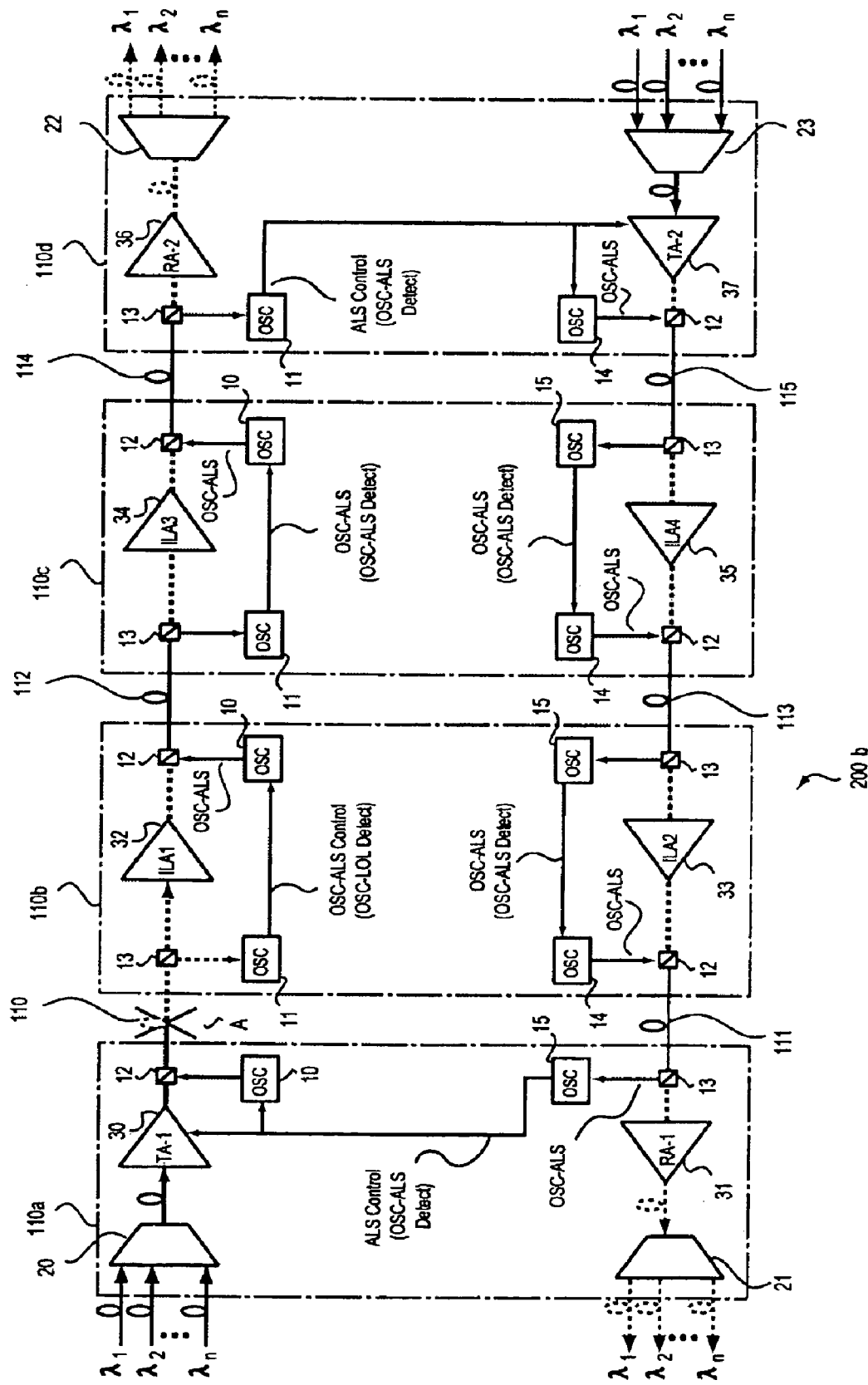
FIG. 16 is an illustration useful for explaining an optical control method according to a fourth modification of the second embodiment of the invention.

FIG. 16 is an illustration useful for explaining an optical control method according to a fourth modification of the second embodiment of the present invention. In FIG. 16, an optical transmission system, designated generally at 200b, is for transmission of wavelength-multiplexed light. The members marked with the same reference numerals as those used above exhibit the same or corresponding functions, respectively, and the repeated description thereof will be omitted for brevity.

In this configuration, assuming that a fiber trouble (indicated at A) has occurred between an amplifier 30 of the first station and an amplifier 32 of the second station, the amplifier 32 detects OSC-LOL from the first station and stops the ILA1-WDM light output to the third station while adding OSC-ALS to the up-direction OSC light. In like manner, the third station detects the OSC-ALS from the second station and stops the ILA3-WDM light output to the fourth station while adding OSC-ALS to the up-direction OSC light.

The fourth station detects the OSC-ALS from the third station, and stops the WDM light output of an opposite side transmission amplifier 37 while adding the OSC-ALS. The third station detects the OSC-ALS from the fourth station, and stops the ILA4-WDM light output to the second station and further adds the OSC-ALS to the down-direction OSC light. Similar operations are also conducted in the second station.

The first station detects the OSC-ALS from the second station and stops the WDM light output of the amplifier 30, thereby ceasing the WDM light output from the fiber broken due to the fiber trouble.

Upon the recovery from the fiber trouble, the second station can obtain the up-direction OSC light from the first station so that the OSC-LOL restoration is detectable, thus bringing the ILA1-WDM light output to the third station back to the original level and removing the OSC-ALS from the up-direction OSC light. Similar operations are also conducted in the third station.

The fourth station detects the OSC-ALS removal from the third station, thus bringing the WDM light output level of the opposite side transmission amplifier 37 back to the normal level and removing the OSC-ALS. The third station detects the OSC-ALS removal from the fourth station, and brings the ILA4-WDM light output level back to the normal level. Similar operations are also conducted in the second station.

The first station detects the OSC-ALS removal from the second station, and brings the WDM light output level of the amplifier 30 back to the normal level. Owing to the recovery from the fiber trouble, the automatic restoration of the optical output level of the WDM light signal takes place between the first station and the fourth station.

In this way, when the reception station detects the reception LOL of the OSC light, the ALS control signal is added to the OSC light transmission output to the next repeater station, thereby implementing control to stop the opposite station transmission amplifier output. Accordingly, the safety of operators is maintainable in the system operations or the like.

(B5) Description of Fifth Modification of Second Embodiment of the invention

Figure 17:
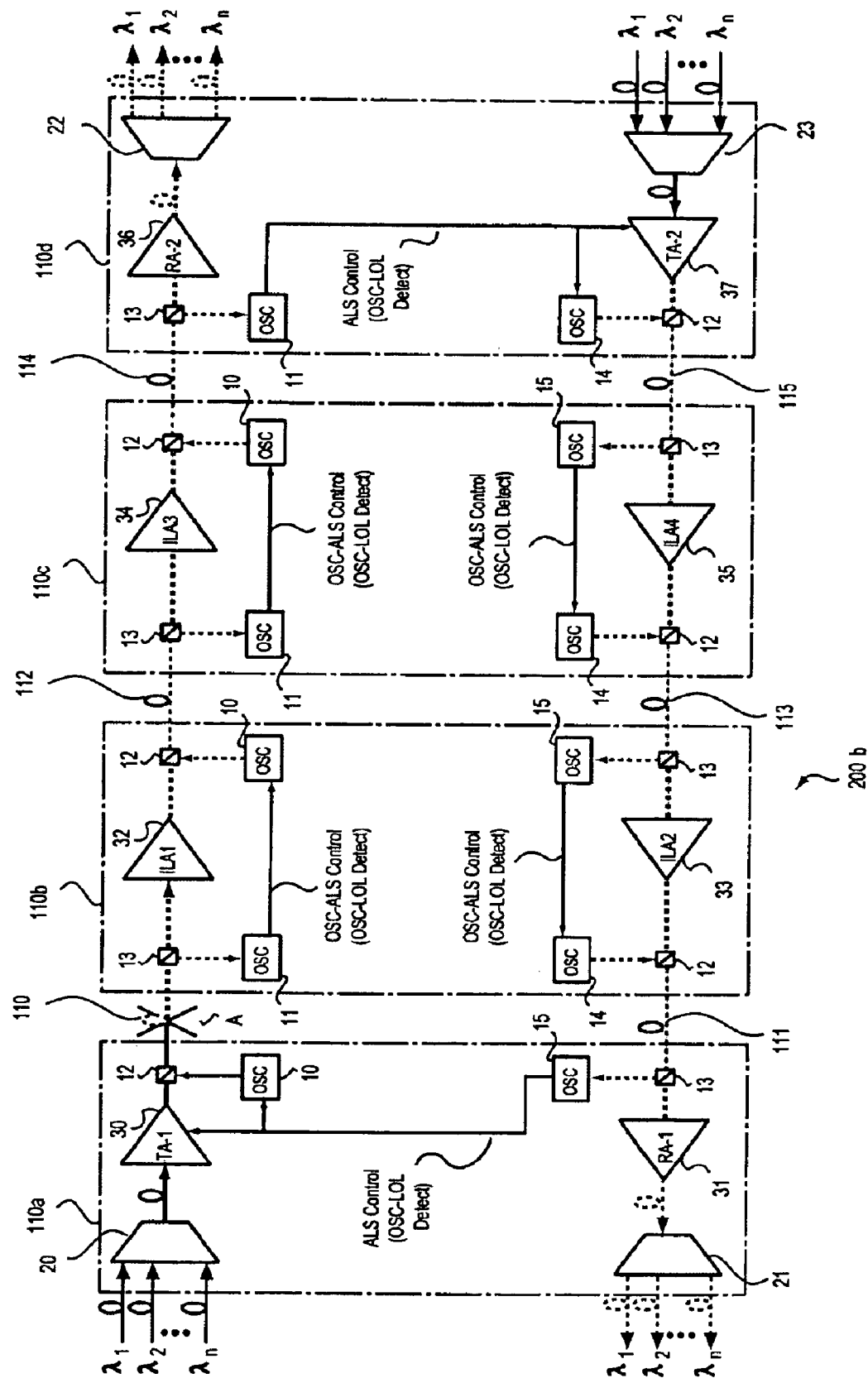
FIG. 17 is an illustration useful for explaining an optical control method according to a fifth modification of the second embodiment of the invention.

FIG. 17 is an illustration useful for explaining an optical control method according to a fifth modification of the second embodiment of the present invention. In FIG. 17, an optical transmission system, designated generally at 200b, is for transmission of wavelength-multiplexed light. The members marked with the same reference numerals as those used above exhibit the same or corresponding functions, respectively, and the repeated description thereof will be omitted for brevity.

In this configuration, assuming that a fiber trouble (indicated at A) has occurred between an amplifier 30 of the first station and an amplifier 32 of the second station, the amplifier 32 detects OSC-LOL from the first station and stops the up-direction OSC light output and ILA1-WDM light output to the third station. In like manner, the third station detects the OSC-LOL from the second station and stops both the up-direction OSC light output and ILA3-WDM light output to the fourth station.

The fourth station detects the OSC-LOL from the third station and stops the WDM light output of an opposite side transmission amplifier 37 and the down-direction OSC light. On the basis of detection of the OSC-LOL from the fourth station, the third station stops the ILA4-WDM light output to the second station, and further stops the down-direction OSC light. Similar operations are also conducted in the second station, and the first station detects the OSC-LOL from the second station and stops the WDM light output of the amplifier 30, thereby ceasing the WDM light output from the fiber broken due to the fiber trouble.

Upon the recovery from the fiber trouble, the second station can obtain the up-direction OSC light from the first station to allow detection of the OSC-LOL restoration, thus bringing each of the up-direction OSC light output level and ILA3-WDM light output level to the third station back to the normal level. Similar operations are also conducted in the third station, and the fourth station detects the OSC-LOL restoration from the third station, and brings the WDM light output level of the opposite side transmission amplifier 37 and the down-direction OSC light output level back to the normal level.

The third station detects the OSC-LOL restoration from the fourth station and brings the ILA4-WDM light output level to the normal level. Similar operations are also conducted in the second station, and the first station detects the OSC-LOL restoration from the second station and brings the WDM light output level of the amplifier 30 back to the normal level. Owing to the recovery from the fiber trouble, the automatic restoration of the optical output level of the WDM light signal takes place between the first station and the fourth station.

In this way, the transmission output of the OSC light is stopped in the transmission final station to cease the opposite station transmission amplifier output. Accordingly, the safety of operators is maintainable in the system operations or the like.

(B6) Description of Sixth Modification of Second Embodiment of the Invention

Figure 18:
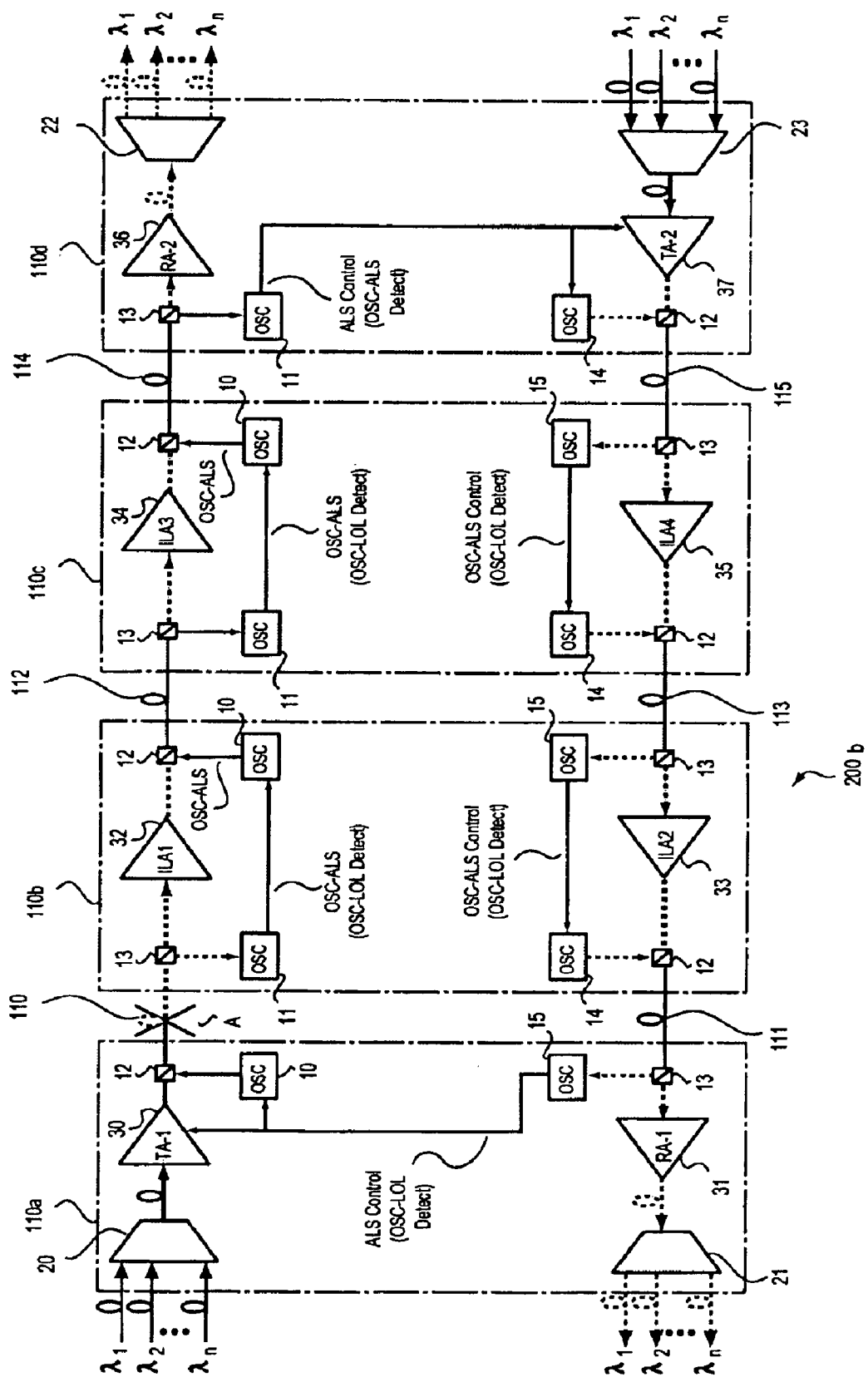
FIG. 18 is an illustration useful for explaining an optical control method according to a sixth modification of the second embodiment of the invention.

FIG. 18 is an illustration useful for explaining an optical control method according to a sixth modification of the second embodiment of the present invention. In FIG. 18, an optical transmission system, designated generally at 200b, is for transmission of wavelength-multiplexed light. The members marked with the same reference numerals as those used above exhibit the same or corresponding functions, respectively, and the repeated description thereof will be omitted for brevity.

In this configuration, assuming that a fiber trouble (indicated at A) has occurred between an amplifier 30 of the first station and an amplifier 32 of the second station, the amplifier 32 detects OSC-LOL from the first station and stops the ILA1-WDM light output to the third station while adding OSC-ALS to the up-direction OSC light. In like manner, the third station detects the OSC-ALS from the second station and stops the ILA3-WDM light output to the fourth station while adding OSC-ALS to the up-direction OSC light.

The fourth station detects the OSC-ALS from the third station, and stops the WDM light output of an opposite side transmission amplifier 37 and further stops the down-direction OSC light output. The third station detects the OSC-LOL from the fourth station, and stops the ILA4-WDM light output to the second station and further stops the down-direction OSC light output. Similar operations are also conducted in the second station. The first station detects the OSC-LOL from the second station and stops the WDM light output of the amplifier 30, thereby ceasing the WDM light output from the fiber broken due to the fiber trouble.

Upon the recovery from the fiber trouble, the second station can obtain the up-direction OSC light from the first station so that the OSC-LOL restoration is detectable, thus resuming the ILA3-WDM light output to the third station and removing the OSC-ALS from the up-direction OSC light. Similar operations are also conducted in the third station, and the fourth station detects the OSC-ALS removal from the third station, thus bringing each of the WDM light output level of the opposite side transmission amplifier 37 and the OSC light output level back to the normal level.

The third station detects the OSC-LOL restoration from the fourth station, and brings the ILA4-WDM light output level back to the normal level. Similar operations are also conducted in the second station, the first station detects the OSC-LOL restoration from the second station, and brings the WDM light output level of the amplifier 30 back to the normal level. Owing to the recovery from the fiber trouble, the automatic restoration of the optical output level of the WDM light signal takes place between the first station and the fourth station.

In this way, the control is implemented such that the opposite station transmission amplifier output stops in response to the stop of the OSC light transmission output in the transmission final station. Accordingly, the safety of operators is maintainable in the system operations or the like.

(B7) Description of Seventh Modification of Second Embodiment of the Invention

Figure 19:
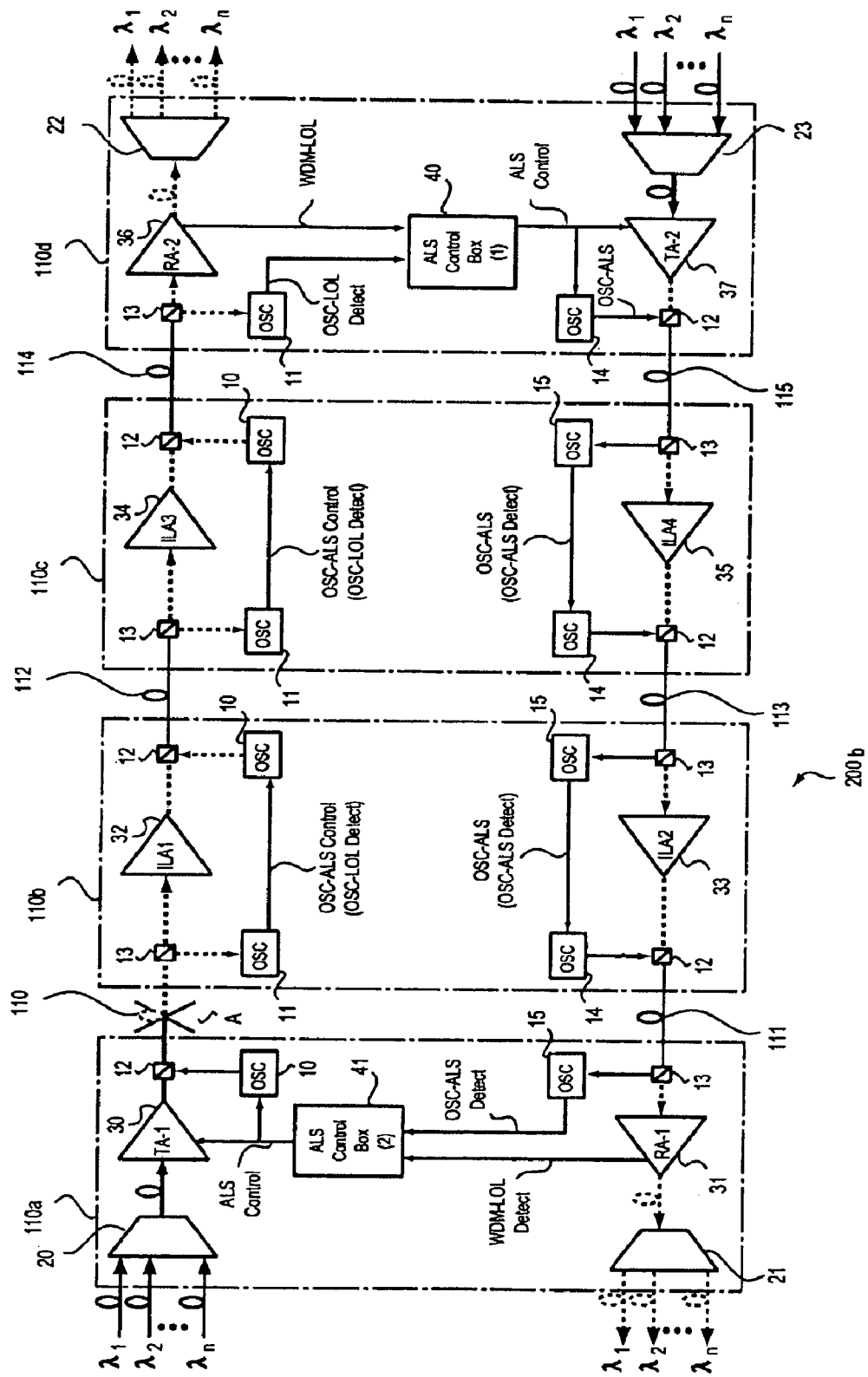
FIG. 19 is an illustration useful for explaining an optical control method according to a seventh modification of the second embodiment of the invention.

FIG. 19 is an illustration useful for explaining an optical control method according to a seventh modification of the second embodiment of the present invention. In FIG. 19, an optical transmission system, designated generally at 200b, is for transmission of wavelength-multiplexed light. The members marked with the same reference numerals as those used above exhibit the same or corresponding functions, respectively, and the repeated description thereof will be omitted for brevity.

In this configuration, assuming that a fiber trouble (indicated at A) has occurred between an amplifier 30 of the first station and an amplifier 32 of the second station, the amplifier 32 detects OSC-LOL from the first station and stops the up-direction OSC light output and ILA1-WDM light output to the third station. In like manner, the third station detects the OSC-LOL from the second station and stops the ILA3-WDM light output to the fourth station and further stops the up-direction OSC light output.

The fourth station detects the WDM-LOL through an amplifier 36 and detects the OSC-LOL from the third station. On the basis of these WDM-LOL and OSC-LOL, an ALS control unit 40 gives an ALS control signal to an amplifier 37 and to an OSC light transmitting unit 14. Upon receipt of this ALS control signal, the opposite side transmission amplifier 37 stops the WDM light output, and the OSC light transmitting unit 14 adds OSC-ALS to the down-direction OSC light.

The third station detects the OSC-ALS from the fourth station and stops the ILA4-WDM light output and OSC light output to the second station, and further adds OSC-ALS to the down-direction OSC light. Similar operations are also conducted in the second station, and the first station detects the WDM-LOL through an amplifier 31 and detects the OSC-ALS from the second station through an OSC light receiving unit 15. An ALS control unit 41 outputs an ALS control signal to an amplifier 30 on the basis of the WDM-LOL and the OSC-LOL. In accordance with this ALS control signal, the WDM light output of the amplifier 30 comes to a stop, thereby ceasing the WDM light output from the fiber broken due to the fiber trouble.

Upon the recovery from the fiber trouble, the second station can obtain the up-direction OSC light from the first station so that the OSC-LOL restoration is detectable, thus bringing the ILA1-WDM light output to the third station and the up-direction OSC light output level. Similar operations are also conducted in the third station.

The fourth station detects the WDM-LOL restoration through the amplifier 36 and further detects the OSC-LOL restoration from the third station through the use of the OSC light receiving unit 11. The ALS control unit 40 cancels the ALS control signal on the basis of the WDM-LOL restoration and the OSC-LOL restoration. On the basis of the cancellation of the ALS control signal, the WDM light output level of the opposite side transmission amplifier 37 is brought back to the normal level, and the OSC-ALS is removed from the down-direction OSC light.

The third station detects the OSC-ALS removal from the fourth station, thereby bringing the ILA4-WDM light level to the normal level. Similar operations are also conducted in the second station, and the first station detects the WDM-LOL restoration through the use of the amplifier 31 and detects the OSC-ALS removal from the second station through the use of the OSC light receiving unit 15. In addition, the ALS control unit 41 cancels the ALS control signal on the basis of these WDM-LOL restoration and OSC-ALS removal, with the cancellation of this ALS control signal bringing the WDM light output level of the amplifier 30 back to the normal level. Owing to the recovery from the fiber trouble, the automatic restoration of the optical output level of the WDM light signal takes place between the first station and the fourth station.

In this way, by adding the amplifier reception LOL detection conditions in the transmission final station and the opposite transmission side, the control is executed to stop the output from the opposite side transmission amplifier. Accordingly, the safety of operators is maintainable in the system operations or the like.

(C) Description of Third Embodiment of the Invention

This embodiment employs an APSD method as the laser safety control method, and when detecting WDM-LOL, an amplifier of a repeater station on the downstream side of a trouble occurrence place is made to stop the WDM light output of a down-direction opposite amplifier. In this APSD method, as with the ALS method, a stop of the WDM light output takes place only in a zone in which a fiber trouble has occurred, without spreading to the next station.

Figure 20:
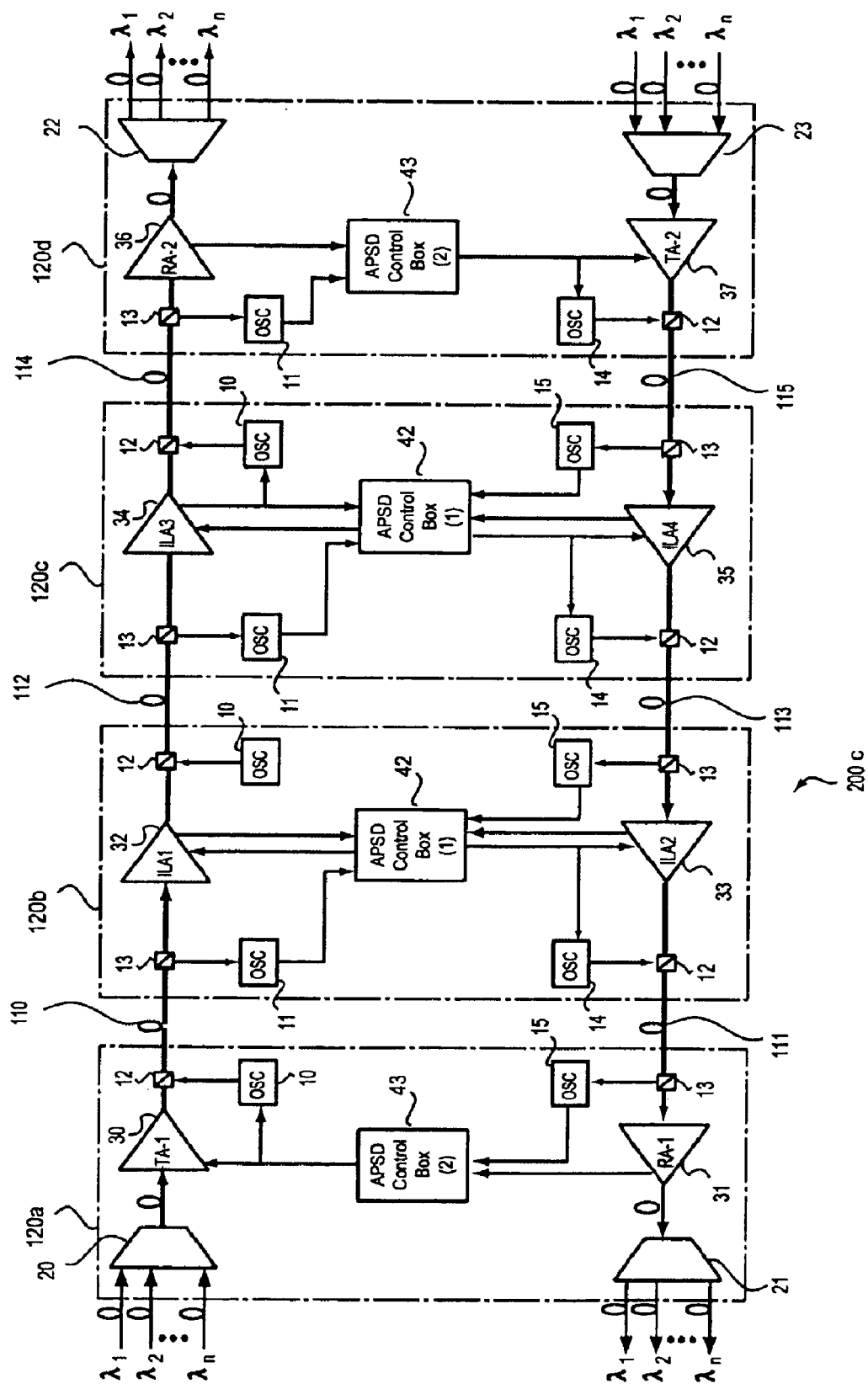
FIG. 20 is an illustration of a configuration of an optical transmission system according to a third embodiment of the invention.

FIG. 20 is an illustration of a configuration of an optical transmission system according to a third embodiment of the present invention. In FIG. 20, an optical transmission system, designated generally at reference numeral 200c, is for transmission of wavelength-multiplexed light, and is made up of WDM terminal stations 120a and 120d, repeater stations 120b and 120c, optical transmission lines 110, 112 and 114, and optical transmission lines 111, 113 and 115. In the illustration, the members marked with the same reference numerals as those used above represent the same or corresponding functions, respectively, and the repeated description thereof will be omitted for simplicity. In addition, dotted lines represent light outputted conditions while solid lines signify light cutoff conditions.

In FIG. 20, the WDM terminal station 120a is for wavelength-multiplexing light respectively having a plurality of different wavelengths ($\lambda_1$ to $\lambda_n$) to output the wavelength-multiplexed WDM light and OSC light to the optical transmission line 110, and further for branching down-direction light outputted from the repeater station 120b to demultiplex the branched WDM light for outputting light respectively having the wavelengths ($\lambda_1$ to $\lambda_n$) and further to demodulate the other branched OSC light. This WDM terminal station 120a is almost identical to the WDM terminal station 100a in the first embodiment except that an APSD control unit (APSD control box (2)) 43 is provided in place of the aforesaid APR control unit 39.

Moreover, in the third embodiment, the details of the WDM terminal station 120a are almost identical in configuration to the WDM terminal station 100a described in the first embodiment (see FIG. 2).

The APSD control unit 43 is connected to an OSC light receiving unit 15, an amplifier 31, an OSC light transmitting unit 10 and an amplifier 30 for adding a predetermined control signal to up-direction light on the basis of a control signal included in down-direction light.

In this case, the APSD control signal is a signal for informing a downstream station in the optical transmission system 200c of a stop of a WDM light output. An optical amplifier of a station on the downstream side of a trouble occurrence place detects the fact of the failure of reception of WDM light (WDM-LOL), and stops its own WDM light output. Adding the APSD control signal to the ordinary OSC light produces OSC-APSD signal light.

In addition, the APSD control unit 43 receives two kinds of signals of an OSC-APSD detection signal outputted from the OSC light receiving unit 15 and a WDM-LOL detection signal outputted from the amplifier 31 to, for example, AND these signals, thereby detecting a break of an optical transmission line.

Furthermore, the repeater station 120b is connected through fibers to the WDM terminal station 120a for receiving and linearly amplifying the up-direction light outputted from the WDM terminal station 120a to output the amplified up-direction light to the optical transmission line 112, and further for receiving and linearly amplifying the down-direction light outputted from the repeater station 120c to output the amplified down-direction light to the optical transmission line 111. This repeater station 120b is almost identical to the repeater station 100b in the first embodiment.

Still furthermore, the repeater station 120c is almost identical to the repeater station 120b, and is connected through fibers to the repeater station 120b for receiving and linearly amplifying the up-direction light outputted from the repeater station 120b to output the amplified up-direction light to the optical transmission line 114, and further for receiving and linearly amplifying the down-direction light outputted from the WDM terminal station 120d to out put the amplified down-direction light to the optical transmission line 113.

Moreover, the WDM terminal station 120d is for wavelength-multiplexing light respectively having a plurality of different wavelengths ($\lambda_1$ to $\lambda_n$) to output the wavelength-multiplexed WDM light and OSC light to the optical transmission line 115, and further for branching the up-direction light outputted from the repeater station 120c to demultiplex the branched WDM light for outputting light respectively having the wavelengths ($\lambda_1$ to $\lambda_n$), while demodulating the other branched OSC light.

Figure 21:
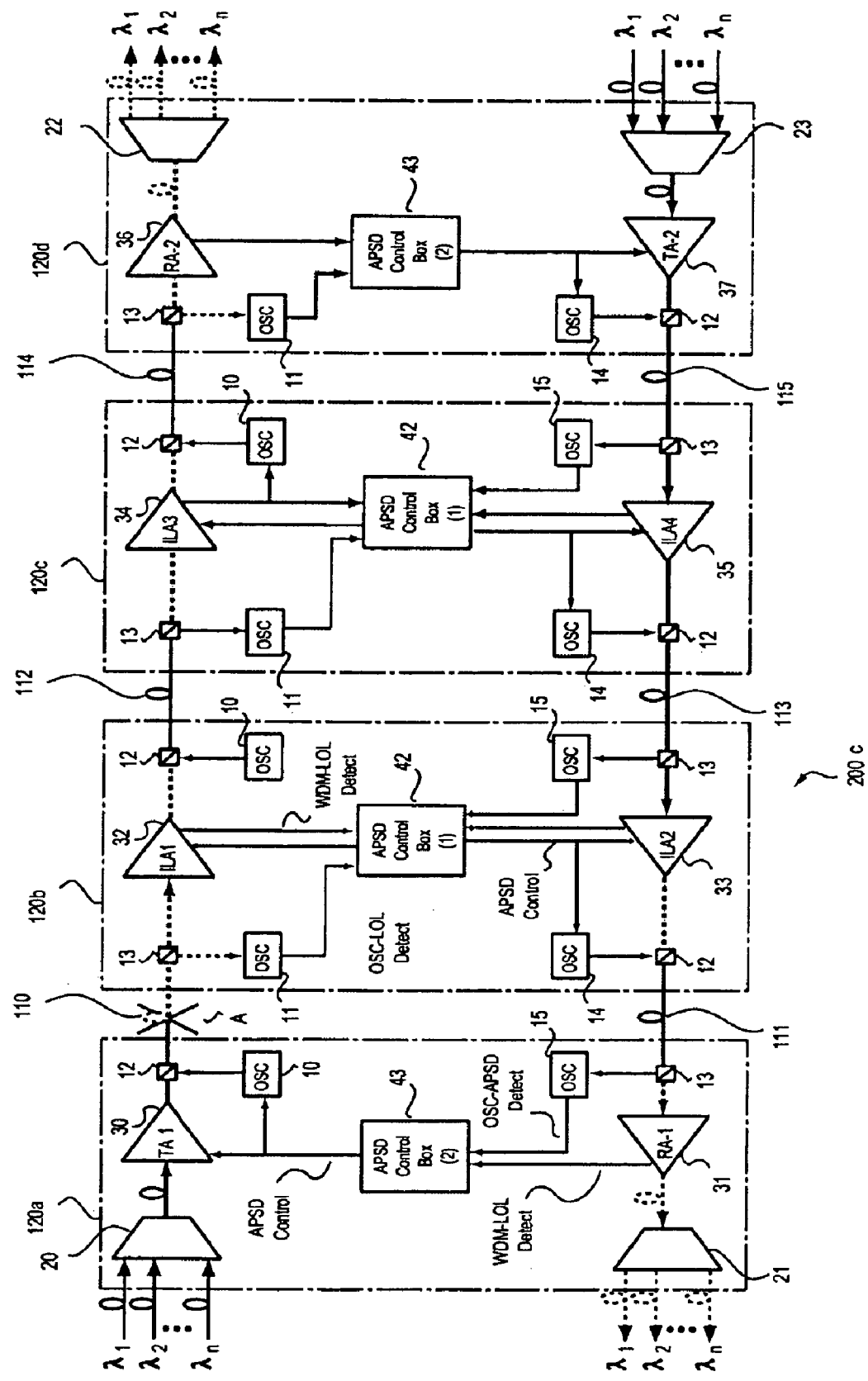
FIG. 21 is an illustration useful for explaining an optical control method according to the third embodiment of the invention.

Referring to FIG. 21, a detailed description will be given hereinbelow of an optical level control method according to this embodiment involving a trouble detection method and a restoration method based upon the above-described configuration. In the illustration, the WDM terminal station 120a, the repeater station 120b, the repeater station 120c and the WDM terminal station 120d are referred to as first to fourth stations, respectively. In addition, the dotted lines represent light outputted conditions while solid lines signify light cutoff conditions.

FIG. 21 is an illustration useful for explaining an optical control method according to the third embodiment of the present invention. The trouble detection in this embodiment is the same as the contents described above in the first embodiment (see FIG. 3). Concretely, in FIG. 21, assuming that a fiber trouble (indicated at A) has occurred between an amplifier 30 of the first station and an amplifier 32 of the second station, the second station detects WDM-LOL through the amplifier 32 and detects OSC-LOL from the first station, and an APSD control unit 42 thereof outputs an APSD control signal to each of an amplifier 33 and an OSC light transmitting unit 14 on the basis of these WDM-LOL and OSC-LOL. In addition, this APSD control signal makes the opposite side transmission amplifier 33 stop the WDM light output and, at the same time, causes the addition of OSC-APSD to the up-direction OSC light.

In the first station, an amplifier 31 detects WDM-ILD and further detects the OSC-APSD from the second station, and the APSD control unit 43 issues an APSD control signal to the amplifier 30 on the basis of the WDM-ILD and the OSC-APSD. This APSD control signal introduces a stop of the WDM light output from the amplifier 30, thereby ceasing the WDM light output to be outputted from the fiber broken due to the fiber trouble.

Upon the recovery from the fiber trouble, the second station can obtain the up-direction OSC light and WDM light from the first station for detecting the WDM-LOL restoration and the OSC-LOL restoration, while the APSD control unit 43 cancels the APSD control signal on the basis of the WDM-LOL restoration and the OSC-LOL restoration. This cancellation of the APSD control signal causes the WDM light output level of the opposite side transmission amplifier 33 to be brought back to the normal level, and leads to the removal of the OSC-APSD.

That is, the optical level control method according to the present invention is of the up-direction light including the up-direction main signal light and the up-direction OSC light and the down-direction light including the down-direction main signal light and the down-direction OSC light in the first and second stations existing on both sides of a trouble occurrence zone in an optical transmission line 110.

First, the second station receives at least the up-direction OSC light output and outputs the down-direction main signal light (second-station restoration step), and the second station adjusts and outputs the down-direction OSC light (second feedback step), and further the first station detects the restoration on the basis of the down-direction OSC light adjusted in the second feedback step, then starting the output of the up-direction main signal light (first-station restoration step).

In the first station, the amplifier 31 detects the WDM-ILD, and further detects the OSC-LOL restoration from the second station and even detects the removal of the APSD control signal included in the down-direction OSC light. Thus, the aforesaid second-station restoration step is made such that the second station detects the restoration on the basis of the down-direction OSC light restoration of the outputted down-direction OSC light and the up-direction main signal light output in the first station, and further removes an automatic power cutoff signal (APSD) included in the down-direction OSC light.

Furthermore, the APSD control unit 43 cancels the APSD control signal on the basis of these WDM-ILD restoration and OSC-APSD removal. Thus, the first-station restoration step is made such that the first station detects the restoration on the basis of a threshold signal (WDM-ILD) indicative of the fact that the down-direction main signal light shows a normal level and the removal of an automatic power cutoff signal (APSD).

In accordance with the cancellation of this control signal, the first station brings the WDM light output level of the amplifier 30 back to the normal level, and owing to the recovery from the fiber trouble, the automatic restoration of the optical output level of the WDM light signal takes place between the first and second stations.

In this way, in the APSD method, when detecting the reception LOL of the OSC light, the reception station stops the amplifier output to the opposite station and gives the APSD control signal to the OSC light transmitting unit 14 to the opposite station to stop the opposite station transmission amplifier output.

In addition, in this way, when the reception station detects both the OSC light reception LOL and amplifier reception LOL, the control is executed to stop the opposite station transmission amplifier output. In consequence, the safety of the workers is maintainable in the system operations or the like.

As described above, in a case in which a fiber trouble has occurred at two or more places, even if only one place has reached restoration, this configuration enables safe automatic restoration.

(C1) Description of First Modification of Third Embodiment of the Invention

Figure 22:
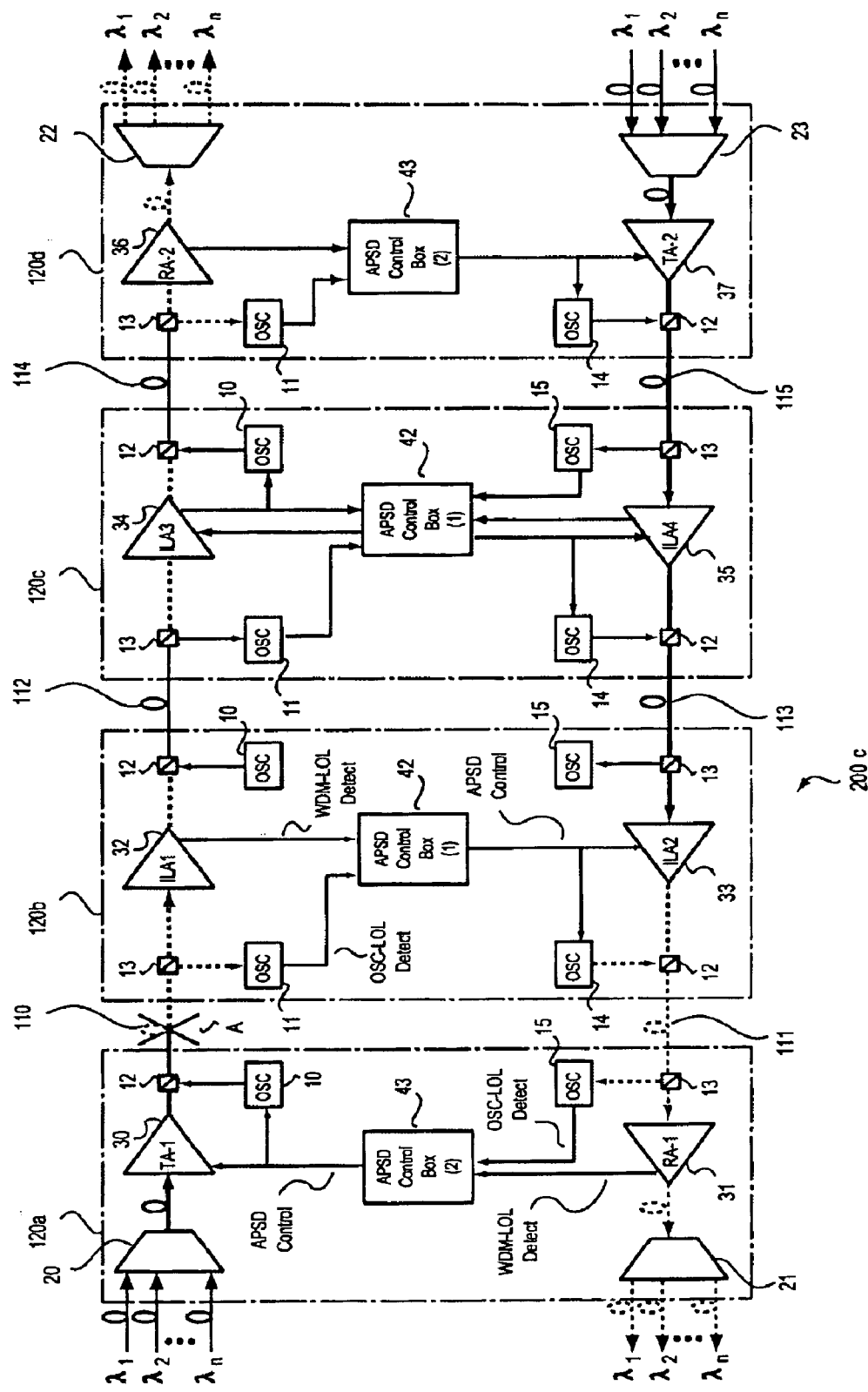
FIG. 22 is an illustration useful for explaining an optical control method according to a first modification of the third embodiment of the invention.

FIG. 22 is an illustration useful for explaining an optical control method according to a first modification of the third embodiment of the present invention. In FIG. 22, an optical transmission system, designated generally at reference numeral 200c, is for transmission of wavelength-multiplexed light. In the illustration, the members marked with the same reference numerals as those used above represent the same or corresponding functions, respectively, and the repeated description thereof will be omitted for simplicity.

In this configuration, assuming that a fiber trouble (indicated at A) has occurred between an amplifier 30 of the first station and an amplifier 32 of the second station, in response to WDM-LOL detection and OSC-LOL detection from the first station, an APSD control unit 42 issues an APSD control signal to an amplifier 33 and an OSC light transmitting unit 14 on the basis of the WDM-LOL and the OSC-LOL. In accordance with this APSD control signal, the WDM light output of the opposite side transmission amplifier 33 stops and the down-direction OSC light output stops simultaneously.

In the first station, an amplifier 31 detects WDM-ILD and an OSC light receiving unit 15 detects OSC-LOL from the second station. An APSD control unit 43 issues an APSD control signal to the amplifier 30 on the basis of these WDM-ILD and OSC-LOL. This APSD control signal causes a drop of the WDM light output of the amplifier 30, thereby stopping the WDM light output from the fiber broken due to the fiber trouble.

Upon the recovery from the fiber trouble, the second station can obtain the WDM light and the up-direction OSC light from the first station and, hence, detects the WDM-LOL restoration and the OSC-LOL restoration, while the APSD control unit 42 cancels the APSD control signal on the basis of the restoration of the WDM-LOL and the OSC-LOL.

In accordance with the cancellation of the APSD control signal, the WDM light output level of the opposite side transmission amplifier 33 and the OSC light transmission output level are restored to the normal level. The amplifier 31 of the first station detects WDM-ILD and further detects the OSC-LOL restoration from the second station, while the APSD control unit 43 cancels the APSD control signal on the basis of the WDM-ILD restoration and the OSC-LOL restoration. In accordance with the cancellation of the APSD control signal, the WDM light output level of the amplifier 30 goes back to the normal level. Thus, owing to the recovery from the fiber trouble, the automatic restoration of the optical output level of the WDM light signal takes place in the first and second stations.

In this way, when the reception station detects both the OSC light reception LOL and amplifier reception LOL, the control is executed to stop the opposite station transmission amplifier output by ceasing the output of the OSC light to the opposite station. In consequence, the safety of the workers is maintainable in the system operations or the like.

(C2) Description of Second Modification of Third Embodiment of the Invention

Figure 23:
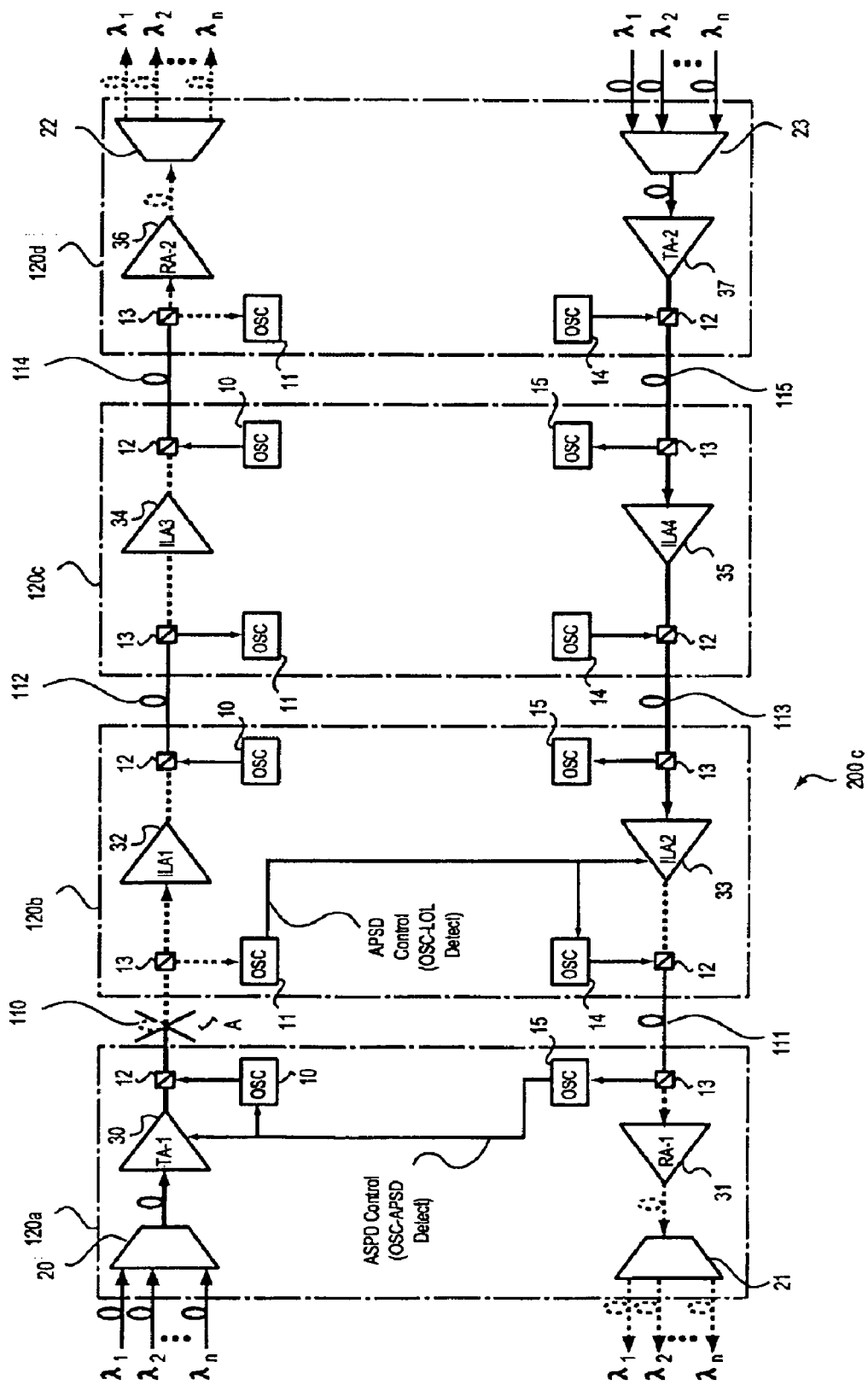
FIG. 23 is an illustration useful for explaining an optical control method according to a second modification of the third embodiment of the invention.

FIG. 23 is an illustration useful for explaining an optical control method according to a second modification of the third embodiment of the present invention. In FIG. 23, an optical transmission system, designated generally at reference numeral 200c, is for transmission of wavelength-multiplexed light. In the illustration, the members marked with the same reference numerals as those used above represent the same or corresponding functions, respectively, and the repeated description thereof will be omitted for simplicity.

In this configuration, assuming that a fiber trouble (indicated at A) has occurred between an amplifier 30 of the first station and an amplifier 32 of the second station, the second station detects the reception of the up-direction OSC light from the first station and input cutoff (OSC-LOL), and ceases the WDM light output of an opposite side transmission amplifier 33 concurrently with giving an APSD control signal (OSC-APSD) to an OSC light transmitting unit 14. The first station detects the OSC-APSD from the second station and ceases the WDM light output of the amplifier 30, which stops the WDM light output from the fiber broken due to the fiber trouble.

Upon the recovery from the fiber trouble, the second station can obtain the up-direction OSC light from the first station and, hence, detects the OSC-LOL restoration, and brings the WDM light output level of the opposite side transmission amplifier 33 back to the normal level and, at the same time, removes the OSC-APSD. In addition, the first station detects the OSC-APSD removal from the second station, and brings the WDM light output level of the amplifier 30 back to the normal level. Owing to the recovery from the fiber trouble, the automatic restoration of the optical output level of the WDM light signal takes place in the first and second stations. In consequence, the safety of the workers is maintainable in the system operations or the like.

(C3) Description of Third Modification of Third Embodiment of the Invention

Figure 24:
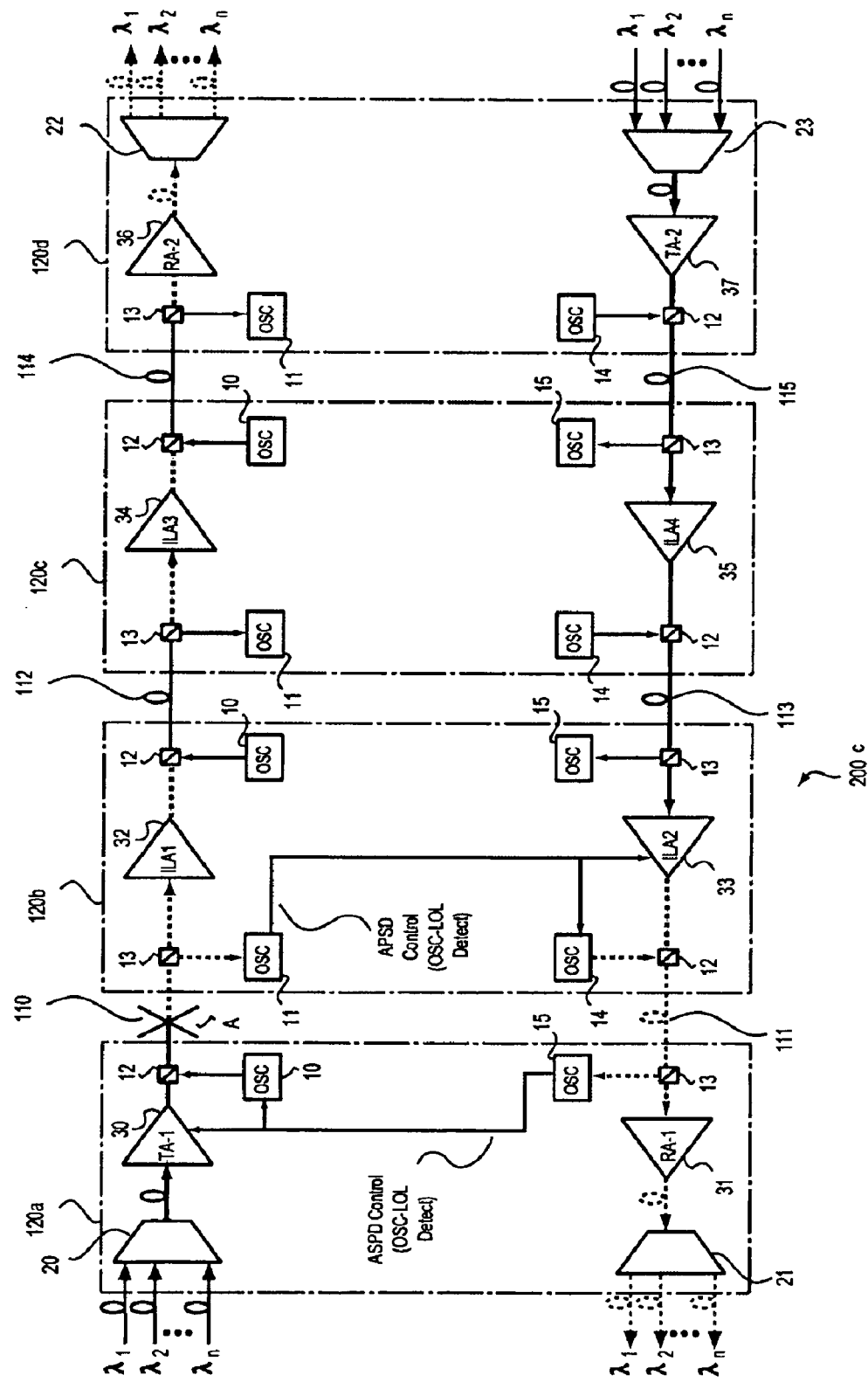
FIG. 24 is an illustration useful for explaining an optical control method according to a third modification of the third embodiment of the invention.
Figure 25:
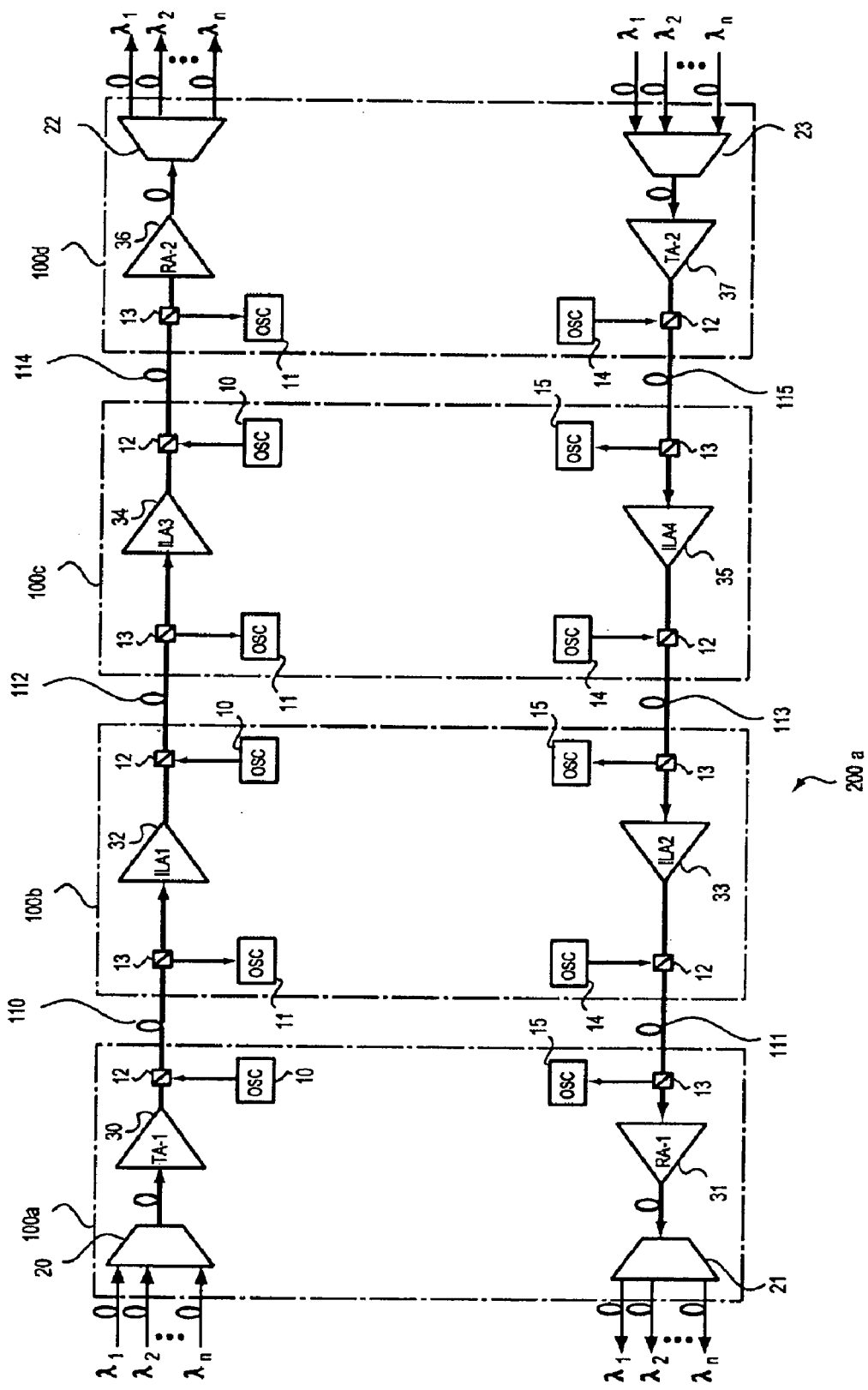
FIG. 25 is an illustration of a configuration of an optical transmission system.
Figure 26:
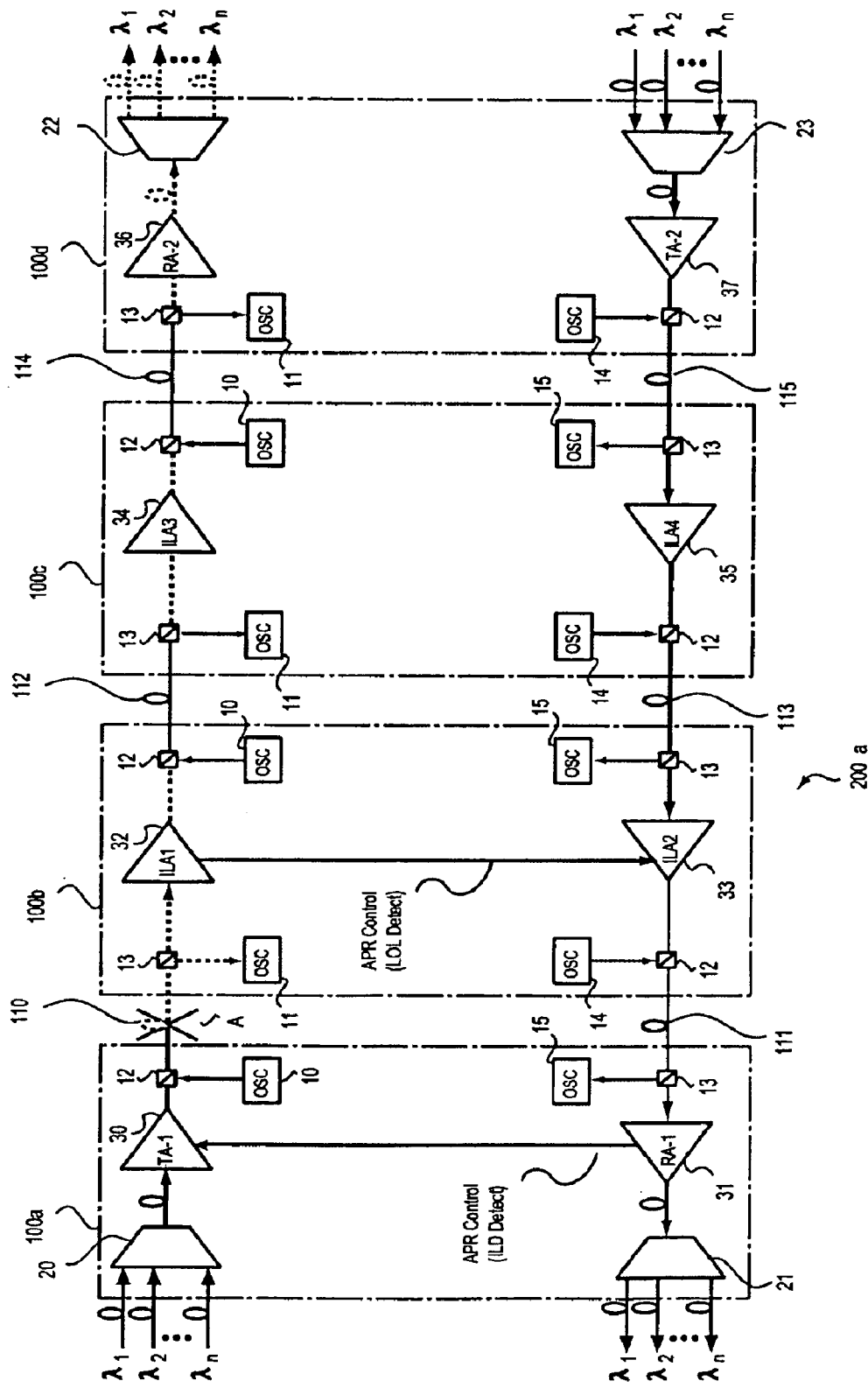
FIG. 26 is an illustration for describing an APR method.
Figure 27:
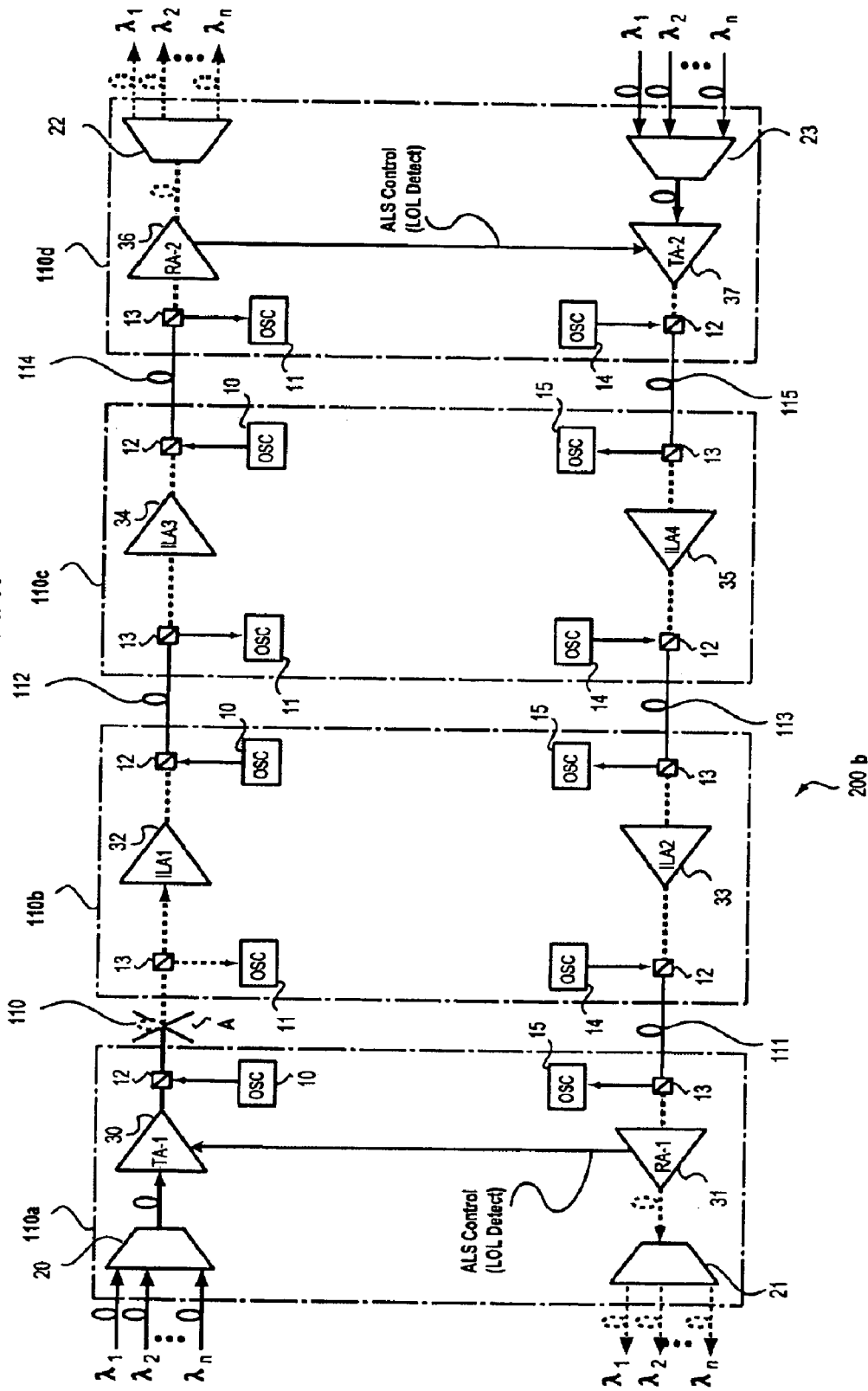
FIG. 27 is an illustration for describing an ALS method.
Figure 28:
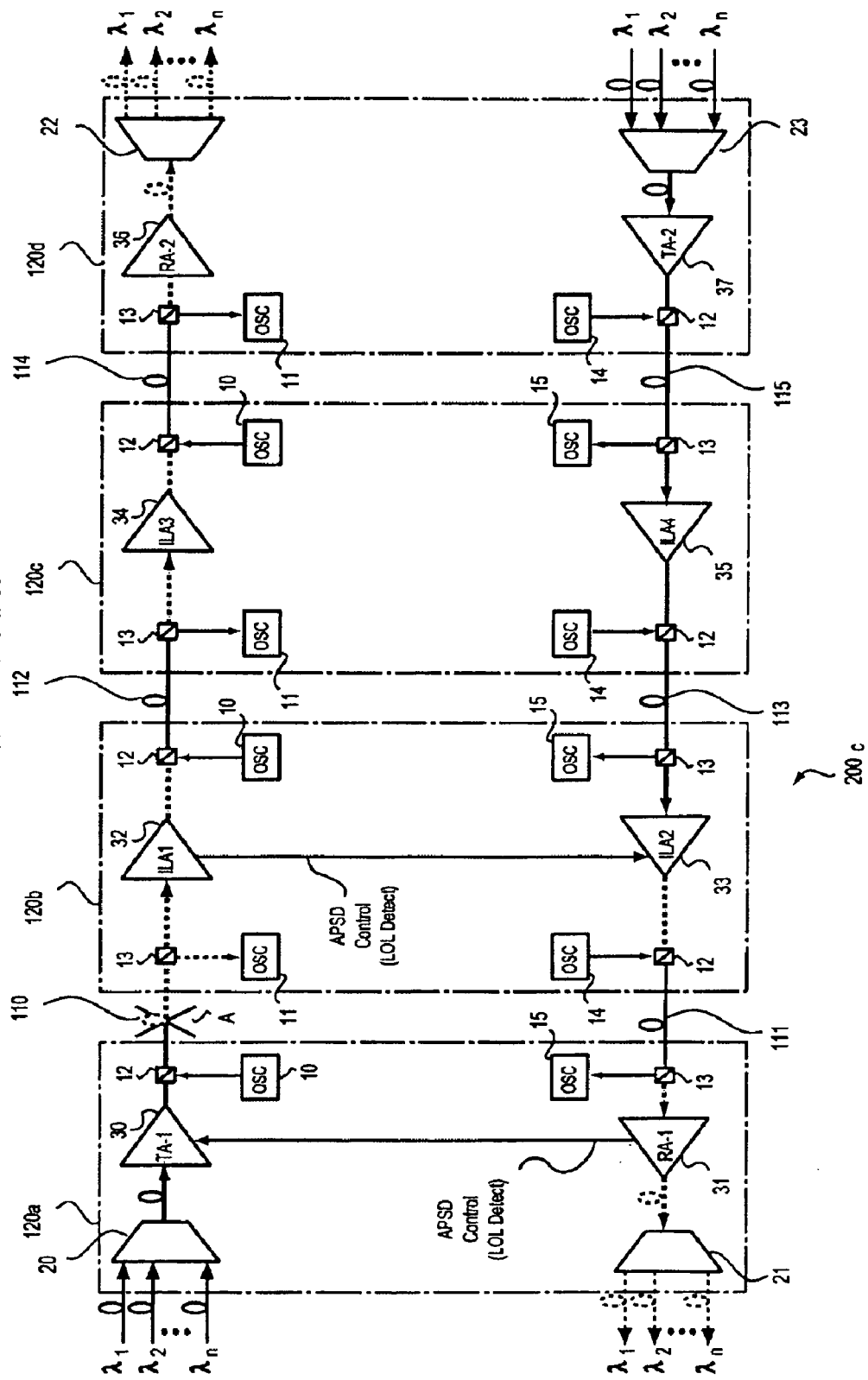
FIG. 28 is an illustration for describing an APSD method.

FIG. 24 is an illustration useful for explaining an optical control method according to a third modification of the third embodiment of the present invention. In FIG. 24, an optical transmission system, designated generally at reference numeral 200c, is for transmission of wavelength-multiplexed light. In the illustration, the members marked with the same reference numerals as those used above represent the same or corresponding functions, respectively, and the repeated description thereof will be omitted for simplicity.

In this configuration, assuming that a fiber trouble (indicated at A) has occurred between an amplifier 30 of the first station and an amplifier 32 of the second station, the second station detects OSC-LOL from the first station, and ceases the WDM light output of an opposite side transmission amplifier 33 concurrently with stopping the up-direction OSC light output. The first station detects the OSC-LOL from the second station and ceases the WDM light output of the amplifier 30, which stops the WDM light output from the fiber broken due to the fiber trouble.

Upon the recovery from the fiber trouble, the second station can obtain the up-direction OSC light from the first station and, hence, detects the OSC-LOL restoration, and brings the WDM light output level of the opposite side transmission amplifier 33 back to the normal level and, at the same time, brings the down-direction OSC light output level back to the normal level. In addition, the first station detects the OSC-LOL restoration from the second station, and brings the WDM light output level of the amplifier 30 back to the normal level. Owing to the recovery from the fiber trouble, the automatic restoration of the optical output level of the WDM light signal takes place in the first and second stations.

In this way, the control is implemented to stop the opposite station transmission amplifier output by stopping the OSC light output to the opposite station. Inconsequence, the safety of the workers is maintainable in the system operations or the like.

(D) Others

Although in the description of the restoration operations in the above-described first to third embodiments the OSC light has not been cut off, it is also possible that this OSC light is cut off in one side of the first and second stations, or is cut off in both sides thereof.

That is, in the case of no cutoff of the OSC light, the operational procedure is taken as follows (1-1) to (1-10) as mentioned above.

(1-1) A fiber trouble occurs between an upstream station and a downstream station (down-direction line).

(1-2) The downstream station detects the reception failure of WDM light (WDM-LOL).

(1-3) The downstream station detects the reception failure of OSC light (OSC-LOL).

(1-4) On the basis of the two kinds of LOL detection, only the WDM light output in the up-direction line is cut off or reduced.

(1-5) The retrieval of the trouble occurrence place reaches completion.

(1-6) The OSC light reception in the downstream station becomes feasible.

(1-7) In the downstream station, the WDM light in the up-direction line is restored automatically.

(1-8) In the downstream station, a WDM light output restoration request is given on the basis of information included in the OSC light.

(1-9) A transmission amplifier resumes the WDM light output on the basis of the OSC information.

(1-10) In consequence, the signal output in the down-direction line resumes.

Furthermore, in a case in which OSC light is transmitted in a state cut off only in one side, the operational procedure is as follows (2-1) to (2-9).

(2-1) A fiber trouble occurs between an upstream station and a downstream station (down-direction line).

(2-2) The downstream station detects the reception failure of WDM light (WDM-LOL).

(2-3) The downstream station detects the reception failure of OSC light (OSC-LOL).

(2-4) On the basis of the two kinds of LOL detection, both the WDM light output and OSC light output in the up-direction line are cut off or reduced.

(2-5) As a result of this, only the WDM light output in the down-direction line is cut off.

(2-6) The retrieval of the trouble occurrence place reaches completion.

(2-7) The reception of the OSC light in the downstream station becomes feasible.

(2-8) The downstream station automatically resumes both the WDM light output and OSC light output in the up-direction line.

(2-9) In consequence, the signal output in the down-direction line comes to restoration.

Still furthermore, in a case in which OSC light is transmitted in a state cut off in both sides, the operational procedure is as follows (3-1) to (3-9).

(3-1) A fiber trouble occurs between an upstream station and a downstream station (down-direction line).

(3-2) The downstream station detects the reception failure of WDM light (WDM-LOL).

(3—3) The downstream station detects the reception failure of OSC light (OSC-LOL).

(3-4) On the basis of the two kinds of LOL detection, both the WDM light output and OSC light output in the up-direction line are cut off or reduced.

(3-5) As a result of this, the overall output of the WDM light and the OSC light in the down-direction line are cut off.

(3-6) The retrieval of the trouble occurrence place reaches completion.

(3-7) The reception of the OSC light in the downstream station becomes feasible.

(3-8) The downstream station automatically resumes both the WDM light output and OSC light output in the up-direction line.

(3-9) In consequence, the signal output in the down-direction line comes to restoration.

It should be understood that the present invention is not limited to the above-described embodiments and modifications, and that it is intended to cover all changes and modifications of the embodiments of the invention herein which do not constitute departures from the spirit and scope of the invention.

For example, although the aforesaid APR control unit 39 employs AND computation, it is also acceptable to instead use another logic circuit or use another logic requiring input of necessary signals.

In addition, the aforesaid definition of up-direction and down-direction is for convenience only, and even if a different definition thereof is taken, the superiority of the present invention is naturally maintainable.

In the second embodiment, although the WDM terminal station 120d is selected as the up-direction downstream station, the APSD control signal return function is not limited to the WDM terminal station, but it is also achievable in another station needed on design and existing on an optical transmission line.

Incidentally, the WDM terminal stations 100a and 100d, the repeater stations 100b and 100c and others are sometimes referred to as NE (Network Elements).

In addition, FIGS. 14 to 24, dotted lines represent light outputted conditions while solid lines denote light cutoff conditions.

What is claimed is:

1. An optical level control method of handling up-direction light including up-direction main signal light and up-direction sub-signal light different in wavelength from the up-direction main signal light and down-direction light including down-direction main signal light and down-direction sub-signal light different in wavelength from the down-direction main signal light in first and second stations existing on both sides of a trouble occurrence zone in an optical transmission line, said method comprising:

a second-station up-direction light reception step in which said second station receives an output of said up-direction sub-signal light;

a feedback step in which said second station adjusts said down-direction sub-signal light to output the adjusted down-direction sub-signal light;

a first-station restoration step in which said first station detects restoration on the basis of a control signal included in said down-direction sub-signal light, and an output power of said down-direction sub-signal light adjusted in said feedback step to start an output of said up-direction main signal light, by a logic computation in accordance with both the down-direction sub-signal light and the control signal;

a second-station restoration determination step in which said second station determines on restoration of said up-direction main signal light on the basis of said up-direction sub-signal light and said up-direction main signal light obtained in said first-station restoration step; and a second-station restoration step in which said second station brings said down-direction main signal light back to a predetermined level when the decision in said second-station restoration determination step shows the restoration and outputs said down-direction main signal light brought back to said predetermined level, and continues a stop of an output of said down-direction main signal light when the decision in said second-station restoration determination step shows no restoration.

2. An optical level control method of handling up-direction light including up-direction main signal light and up-direction sub-signal light different in wavelength from the up-direction main signal light and down-direction light including down-direction main signal light and down-direction sub-signal light different in wavelength from the down-direction main signal light in first and second stations existing on both sides of a trouble occurrence zone in an optical transmission line, said method comprising:

a second-station up-direction light reception step in which said second station receives an output of said up-direction sub-signal light;

an up-direction downstream station up-direction light detection step in which an up-direction downstream station existing on the up-direction downstream side of said second station detects restoration on the basis of an output of said up-direction sub-signal light from a previous-stage station;

an up-direction downstream station return step in which said up-direction downstream station adjusts and outputs at least one of said up-direction main signal light, said up-direction sub-signal light, said down-direction main signal light and said down-direction sub-signal light on the basis of the detection in said up-direction downstream station up-direction light detection step;

a second-station down-direction main signal light output step in which said second station detects restoration on the basis of the adjustment in said up-direction downstream station return step for bringing said down-direction main signal light back to a predetermined level to output said down-direction main signal light with said predetermined level and further adds a control signal on an optical level included in said down-direction sub-signal light for producing a control signal added output; and a first-station restoration step in which said first station detects restoration on the basis of a control signal included in said down-direction sub-signal light, and an output power of said down-direction sub-signal light adjusted in said second-station down-direction main signal light output step to start an output of said up-direction main signal light, by a logic computation in accordance with both the down-direction sub-signal light and the control signal.

3. An optical level control method according to claim 2, wherein said first-station restoration step is made such that said first station employs, as said control signal, an automatic power cutoff signal for a notice of optical output cutoff, included in said down-direction sub-signal light.

4. An optical level control method according to claim 2, wherein said first-station restoration step is made such that said first station detects the restoration on the basis of removal of an automatic level drop signal serving as said control signal indicative of a drop of an optical level and a threshold signal indicative of a level of said down-direction main signal light being a predetermined level.

5. An optical level control method according to claim 2, wherein said first-station restoration step is made such that said first station detects the restoration on the basis of removal of an automatic light cutoff signal serving as a control signal indicative of cutoff of an optical output and an output of said down-direction main signal light, and further removes said automatic light cutoff signal to bring said up-direction main signal light back to a predetermined level for outputting said up-direction main signal light with said predetermined level.

6. An optical level control method according to claim 2, wherein said first-station restoration step is made such that said first station detects the restoration on the basis of a threshold signal indicative of a level of said down-direction main signal light being a predetermined level and restoration of said down-direction sub-signal light.

7. An optical level control method according to claim 2, wherein said up-direction downstream station up-direction light detection step is made such that said up-direction downstream station detects the restoration on the basis of an output of said up-direction main signal light and an output of said up-direction sub-signal light.

8. An optical level control method according to claim 2, wherein said up-direction downstream station up-direction light detection step is made such that said up-direction downstream station detects the restoration on the basis of an output of said up-direction main signal light and an automatic light cutoff signal indicative of cutoff of an optical output, included in said down-direction sub-signal light outputted from the up-direction downstream side, and said up-direction downstream station return step is made such that said up-direction downstream station brings each of levels of said down-direction main signal light and said down-direction sub-signal light back to a predetermined level to output each of said down-direction main signal light with said predetermined level and said down-direction sub-signal light with said predetermined level after the execution of said up-direction downstream station detection step.

9. An optical level control method according to claim 2, wherein said up-direction downstream station up-direction light detection step is made such that said up-direction downstream station detects the restoration on the basis of an output of said up-direction main signal light and removal of an automatic light cutoff signal for a notice of cutoff of an optical output, from said up-direction sub-signal light, and said up-direction downstream station return step is made such that said up-direction downstream station removes said automatic light cutoff signal and outputs said down-direction sub-signal light.

10. An optical level control method according to claim 2, wherein said up-direction downstream station return step is made such that said up-direction downstream station detects the restoration on the basis of an output of the down-direction main signal light and a control signal on an optical level included in the down-direction sub-signal light, and outputs the down-direction sub-signal light.

11. An optical level control method of handling up-direction light including up-direction main signal light and up-direction sub-signal light and down-direction light including down-direction main signal light different in wavelength from the up-direction main signal light and down-direction light including down-direction main signal light and down-direction sub-signal light different in wavelength from the down-direction main signal light in first and second stations existing on both sides of a trouble occurrence zone in an optical transmission line, said method comprising:

a second-station trouble detection step in which said second station detects a trouble in said optical transmission line by recognizing (a) at least one of reception cutoff of said down-direction sub-signal light outputted from an up-direction downstream station provided on the up-direction downstream side of said second station and (b) a down-direction control signal included in said down-direction sub-signal light, by a logic computation in accordance with both said one of reception cutoff of said down-direction sub-signal light and said down-direction control signal;

a second feedback step in which said second station adjusts at least one of said down-direction sub-signal light and said down-direction main signal light on the basis of the detection in said second-station trouble detection step to output the adjusted light; and a first-station up-direction light adjustment step in which said first station adjusts said up-direction main signal light on the basis of at least one of said down-direction sub-signal light and said down-direction main signal light adjusted in said second feedback step to output the adjusted up-direction main signal light.

12. An optical level control method according to claim 11, wherein said first-station up-direction light adjustment step is made such that said first station adjusts said up-direction main signal light to output said up-direction main signal light through the use of at least two of said up-direction control signal, an output level of said up-direction main signal light and an output level of said up-direction sub-signal light.

13. An optical level control method of handling up-direction light including up-direction main signal light and up-direction sub-signal light different in wavelength from the up-direction main signal light and down-direction light including down-direction main signal light and down-direction sub-signal light different in wavelength from the down-direction main signal light in first and second stations existing on both sides of a trouble occurrence zone in an optical transmission line, said method comprising:

a second-station restoration step in which said second station including steps of:

detecting restoration on the basis of down-direction sub-signal light restoration included in said down-direction sub-signal light outputted and an output of said up-direction main signal light in said first station, by a logic computation in accordance with both said down-direction sub-signal light and said control signal; and removing an automatic power cutoff signal included in said down-direction sub-signal right a second feedback step in which said second station adjusts said down-direction sub-signal light to output the adjusted down-direction sub-signal light; and a first-station restoration step in which said first station detects the restoration on the basis of said down-direction sub-signal light adjusted in said second feedback step to start an output of said up-direction main signal light.

14. An optical level control method according to claim 13, wherein said first-station restoration step is made such that said first station detects the restoration on the basis of a threshold signal indicative of a level of said down-direction main signal light being a predetermined level and removal of an automatic power cutoff signal.

15. An optical level control method of handling up-direction light including up-direction main signal light and up-direction sub-signal light different in wavelength from the up-direction main signal light and down-direction light main signal light and down-direction light including down direction sub-signal light different in wavelength from the down-direction main signal light in first and second stations existing on both sides of a trouble occurrence zone in an optical transmission line, said method comprising:

a second-station restoration step in which said second station detects one of a control signal on an optical level included in said up-direction sub-signal light and cutoff of said up-direction sub-signal light to bring at least said up-direction main signal light back to a predetermined level for outputting said up-direction main signal light with said predetermined level, by a logic computation in accordance with both said down-direction sub-signal light and said control signal;

a feedback step in which said second station adjusts said down-direction sub-signal light to output the adjusted down-direction sub-signal light; and a first-station restoration step in which said first station detects restoration on the basis of said down-direction sub-signal light adjusted in the feedback step for starting an output of said up-direction main signal light.

16. An apparatus comprising:

first and second stations connected by a first optical transmission line on which the first station transmits an up-direction main signal light and an up-direction sub-signal light to the second station, and a second optical transmission line on which the second station transmits a down-direction main signal light and a down-direction sub-signal light to the first station, wherein the first station adjusts the transmitted up-direction main signal light and the transmitted up-direction sub-signal light in accordance with both the transmitted down-direction main signal light and the transmitted down-direction sub-signal light as received by the first station to thereby adjust for an abnormality in the first transmission line, and the second station adjusts the transmitted down-direction main signal light and the transmitted down-direction sub-signal light in accordance with both the transmitted up-direction main signal light and the transmitted up-direction sub-signal light as received by the second station, to thereby adjust for an abnormality in the second optical transmission line, said first station detects restoration on the basis of a control signal on an optical level included in the down-direction sub-signal light, and an output power of the down-direction sub-signal light adjusted by the second station to start an output of the up-direction main signal light, by a logic computation in accordance with both the down-direction sub-signal light and the control signal.

17. An apparatus as in claim 16, wherein the first station performs an optical output level down or an optical output cease of the up-direction main signal light, to thereby adjust the up-direction main signal light in accordance with both the transmitted down-direction main signal light and the transmitted down-direction sub-signal light as received by the first station, and thereby adjust for an abnormality in the first optical transmission line.

18. An apparatus as in claim 17, wherein the second station performs an optical output level down or an optical output cease of the down-direction main signal light, to thereby adjust the down-direction main signal light in accordance with both the transmitted up-direction main signal light and the transmitted up-direction sub-signal light as received by the second station, and thereby adjust for an abnormality in the second optical transmission line.

19. An apparatus as in claim 17, wherein, after the first station performs an optical output level down or an optical output cease of the up-direction main signal light, and the transmitted down-direction main signal light and the transmitted down-direction sub-signal light as received by the first station indicates a restoration of the first optical transmission line, the first station restores the up-direction main signal light to a normal level.

20. An apparatus as in claim 16, wherein the second station performs an optical output level down or an optical output cease of the down-direction main signal light, to thereby adjust the down-direction main signal light in accordance with both the transmitted up-direction main signal light and the transmitted up-direction sub-signal light as received by the second station, and thereby adjust for an abnormality in the second optical transmission line.

21. An apparatus as in claim 20, wherein, after the second station performs an optical output level down or an optical output cease of the down-direction main signal light, and the transmitted up-direction main signal light and the transmitted up-direction sub-signal light as received by the second station indicates a restoration of the second optical transmission line, the second station restores the down-direction main signal light to a normal level.

22. An apparatus comprising:
first and second stations connected by a first optical transmission line on which the first station transmits an up-direction main signal light and an up-direction sub-signal light to the second station, and a second optical transmission line on which the second station transmits a down-direction main signal light and a down-direction sub-signal light to the first station;
means for adjusting the transmitted up-direction main signal light and the transmitted up-direction sub-signal light by the first station in accordance with both the transmitted down-direction main signal light and the transmitted down-direction sub-signal light as received by the first station to thereby adjust for an abnormality in the first transmission line;
means for adjusting the transmitted down-direction main signal light and the transmitted down-direction sub-signal light by the second station in accordance with both the transmitted up-direction main signal light and the transmitted up-direction sub-signal light as received by the second station, to thereby adjust for an abnormality in the second optical transmission line; and
means for detecting restoration by the first station on the basis of a control signal included in the down-direction sub-signal light and an output power of the down-direction sub-signal light adjusted by the second station to start an output of the up-direction main signal light, by a logical computation in accordance with both the down-direction sub-signal light and the control signal.

23. An apparatus comprising:
first and second stations connected by a first optical transmission line on which the first station transmits an up-direction main signal light and an up-direction sub-signal light to the second station, and a second optical transmission line on which the second station transmits a down-direction main signal light and a down-direction sub-signal light to the first station, wherein
the first station performs an optical output level down or an optical output cease of the up-direction main signal light in accordance with both the transmitted down-direction main signal light and the transmitted down-direction sub-signal light as received by the first station, to thereby adjust for an abnormality in the first optical transmission line,
the second station performs an optical output level down or an optical output cease of the down-direction main signal light in accordance with both the transmitted up-direction main signal light and the transmitted up-direction sub-signal light as received by the second station, to thereby adjust for an abnormality in the second optical transmission line, and
the first station detects restoration on the basis of a control signal included in the down-direction sub-signal light and an output power of the down-direction sub-signal light adjusted by the second station to start an output of the up-direction main signal light, by a logic computation in accordance with both the down-direction sub-signal light and the control signal.

24. An apparatus comprising:
first and second stations connected by a first optical transmission line on which the first station transmits an up-direction main signal light and an up-direction sub-signal light to the second station, and a second optical transmission line on which the second station transmits a down-direction main signal light and a down-direction sub-signal light to the first station;
means for performing an optical output level down or an optical output cease of the up-direction main signal light by the first station in accordance with both the transmitted down-direction main signal light and the transmitted down-direction sub-signal light as received by the first station, to thereby adjust for an abnormality in the first optical transmission line; and means for performing an optical output level down or an optical output cease of the down-direction main signal light by the second station in accordance with both the transmitted up-direction main signal light and the transmitted up-direction sub-signal light as received by the second station, to thereby adjust for an abnormality in the second optical transmission line,
means for detecting restoration by the first station on the basis of a control signal included in the down-direction sub-signal light and an output power of the down-direction sub-signal light adjusted by the second station to start an output of the up-direction main signal light, by a logic computation in accordance with both the down-direction sub-signal light and the control signal.

* * * * *